(12) United States Patent
Purcell et al.

(10) Patent No.: US 12,723,538 B2
(45) Date of Patent: Sep. 1, 2026

(54) AIR COOLING SYSTEMS FOR SNOWMOBILES

(71) Applicant: Arctic Cat Inc., Thief River Falls, MN (US)

(72) Inventors: Lucas Grant Purcell, Thief River Falls, MN (US); Erick John Halvorson, Albany, MN (US); Guy L. Sibilleau, Roseau, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 19/243,292

(22) Filed: Jun. 19, 2025

(65) Prior Publication Data

US 2026/0002499 A1 Jan. 1, 2026

Related U.S. Application Data

(60) Provisional application No. 63/666,200, filed on Jun. 30, 2024.

(51) Int. Cl.

| | |
|---|---|
| ***F02B 29/04*** | (2006.01) |
| ***B60K 13/02*** | (2006.01) |
| ***B60K 13/04*** | (2006.01) |
| ***F01N 13/18*** | (2010.01) |
| ***F02M 31/20*** | (2006.01) |
| ***F02M 35/10*** | (2006.01) |
| ***F02M 35/16*** | (2006.01) |

(Continued)

(52) U.S. Cl.
CPC .......... *F02B 29/0431* (2013.01); *B60K 13/02* (2013.01); *B60K 13/04* (2013.01); *F01N 13/1805* (2013.01); *F02B 29/0425* (2013.01); *F02M 31/20* (2013.01); *F02M 35/10157* (2013.01); *F02M 35/162* (2013.01); *B62M 2027/023* (2013.01); *F01N 2340/04* (2013.01); *F01N 2340/06* (2013.01); *F01N 2590/00* (2013.01); *F01P 2060/02* (2013.01); *F02B 37/00* (2013.01)

(58) Field of Classification Search
CPC .............. F01P 2060/02; F02B 29/0425; F02B 29/0431; F02M 35/162; B62M 2027/023
See application file for complete search history.

(56) References Cited

U.S. PATENT DOCUMENTS

| | | | |
|---|---|---|---|
| 6,551,155 | B2 | 4/2003 | Lecours et al. |
| 6,561,297 | B2 | 5/2003 | Yatagai et al. |
| 6,651,765 | B1 | 11/2003 | Weinzierl |

(Continued)

*Primary Examiner* — Jonathan R Matthias
(74) *Attorney, Agent, or Firm* — Billion & Armitage

(57) ABSTRACT

An air cooling system for a snowmobile having a forward frame assembly defining an engine bay, an engine positioned in the engine bay and a turbocharger positioned outboard of the engine bay. The air cooling system includes an intercooler in downstream fluid communication with the turbocharger. The intercooler is configured to cool compressed air from the turbocharger. An air channel is positioned forward of the intercooler. The air channel has a lower wall and a pair of oppositely disposed side walls that direct ambient ram air into the intercooler such that heat transfers from the compressed air to the ambient ram air in the intercooler, thereby cooling the compressed air and increasing the density of the compressed air before the compressed air enters the engine.

18 Claims, 38 Drawing Sheets

(51) Int. Cl.

*B62M 27/02* (2006.01)
*F02B 37/00* (2006.01)

(56) References Cited

U.S. PATENT DOCUMENTS 6,681,724 B1 1/2004 Berg
6,695,087 B2 2/2004 Fournier et al.
6,745,862 B2 6/2004 Morii et al.
6,823,960 B2 11/2004 Shimizu et al.
6,904,990 B2 6/2005 Etou
6,923,287 B2 8/2005 Morii
6,926,107 B2 8/2005 Nishijima
6,941,924 B2 9/2005 Morii et al.
6,942,052 B1 9/2005 Blakely
6,966,395 B2 11/2005 Schuehmacher et al.
7,032,561 B2 4/2006 Morii et al.
7,036,619 B2 5/2006 Yatagai et al.
7,083,024 B2 8/2006 Bergman et al.
7,104,352 B2 9/2006 Weinzierl
7,140,463 B2 11/2006 Morii et al.
7,152,706 B2 12/2006 Pichler et al.
7,198,127 B2 4/2007 Yatagai et al.
7,255,068 B2 8/2007 Ashida
7,264,075 B2 9/2007 Schuemacher et al.
7,303,037 B2 12/2007 Yatagai et al.
7,353,898 B1 4/2008 Bates, Jr.
7,353,899 B2 4/2008 Abe et al.
7,353,901 B2 4/2008 Abe et al.
7,377,348 B2 5/2008 Girouard et al.
7,451,846 B2 11/2008 Wubbolts et al.
7,472,771 B2 1/2009 Yatagai et al.
7,591,332 B1 9/2009 Bates, Jr.
7,913,785 B2 3/2011 Korsumaki et al.
8,528,683 B2 9/2013 Beavis et al.
8,567,546 B2 10/2013 Berg et al.
8,763,745 B2 7/2014 Nagao et al.
9,428,232 B2 8/2016 Ripley et al.
9,688,354 B2 6/2017 Nagao et al.
9,809,195 B2 11/2017 Giese et al.
10,144,486 B2 12/2018 Yasuda et al.
10,215,083 B2 2/2019 Vezina et al.
10,300,989 B2 5/2019 Vezina
10,406,910 B2 9/2019 Vezina et al.
10,450,968 B2 10/2019 Bernier et al.
10,513,970 B2 12/2019 Vezina et al.
10,766,573 B2 9/2020 Vezina et al.
10,800,490 B2 10/2020 Foxhall et al.
11,027,794 B2 6/2021 Vigen
11,248,727 B2 2/2022 Caron-L'Ecuyer et al.
11,286,019 B2 3/2022 Hedlund et al.
11,352,935 B2 6/2022 Buchwitz et al.
11,524,569 B2 12/2022 Vezina et al.
11,788,432 B2 10/2023 Zimney et al.
11,859,525 B2 1/2024 Hlava
2002/0084125 A1* 7/2002 Scheumacher ........ B62M 27/02 180/190
2004/0188159 A1* 9/2004 Yatagai ..................... F01P 1/06 180/182
2007/0193800 A1* 8/2007 Yatagai .................. B62M 27/02 180/182
2008/0277184 A1 11/2008 Marleau
2019/0055862 A1* 2/2019 Fuhrman ................... F01P 3/20
2019/0063304 A1* 2/2019 Lefebvre ................ B62M 29/00
2021/0053652 A1 2/2021 Fuchs et al.
2021/0362807 A1 11/2021 Hedlund et al.
2022/0212754 A1 7/2022 Stock et al.
2022/0349339 A1 11/2022 Schuehmacher et al.
2023/0257014 A1 8/2023 Moldaschel et al.

* cited by examiner 14m
58a
14o
14p
14q
14s
14n
14y
14r
26e
14e
14i
26c
26b
26o
14t
26a
14a
26
26n
26d
14g
14
14c
16a 14
14d
100
128
108
126
110
14b
102
30
104
VP
114e
106
114d
114
118
122
14m
14o
14p
14u
14n
14w
14z
14f
14v
14x
14j
124
14h
16b 14m
14o
14p
118
116
114
106
114d
14q
14n
14s
14e
14y
112
30
14r
102
14t
14a
14i
100
110
126
14g
128
14
14c
16a 14m
14o
14p
14q
14n
14s
14e
14i
14y
200
30
14r
14t
204
14a
208b
208
14g
14
14c
16a 14
14d
130
316
310
314
14h
16b
312
322
306
14b
308
304
300
328
330
14x
14j
14z
14v
14f
14f
14n
14u
14m
14o
14p
14w 314
314a
310
314b
316
300
310
324
312b
312
330
318
312a
306
308
304
326
328
332
320
322

AIR COOLING SYSTEMS FOR SNOWMOBILES

CROSS-REFERENCE TO RELATED APPLICATIONS

The present application claims the benefit of U.S. Provisional Application No. 63/666,200, filed Jun. 30, 2024 the entire contents of which is incorporated by reference herein for all purposes.

TECHNICAL FIELD OF THE DISCLOSURE

The present disclosure relates, in general, to snowmobiles having a turbocharged four-stroke internal combustion engine and, in particular, to air intake systems, exhaust systems and cooling systems for use with turbocharged four-stroke internal combustion engines on snowmobiles.

BACKGROUND

Snowmobiles are popular land vehicles used for transportation and recreation in cold and snowy conditions. Certain snowmobiles are designed for specific applications such as trail, utility, mountain, race and crossover applications, to name a few. Snowmobiles typically include a chassis that supports various components of the snowmobile such as an engine, a transmission and a ground-engaging endless drive track disposed in a longitudinally extending tunnel. The engine and transmission power the drive track to enable ground propulsion for the vehicle. A rider controls the operation of the snowmobile using a steering system including a handlebar assembly that is operatively linked to a pair of ski assemblies that provides flotation for the front of the snowmobile over the snow.

The engine used in conventional snowmobiles is typically a naturally aspirated two-stroke internal combustion engine due to the compact size and efficient design of such engines. While such two-stroke engines have a high power-to-weight ratio, they typically have low fuel efficiency, generate high noise levels and produce undesirable pollution due to the direct mixing of fuel and oil. Naturally aspirated four-stroke internal combustion engines, on the other hand, have higher fuel efficiency, produce less noise, generate lower emissions and have a simplified refueling process, which not only reduces the cost and environmental impact of operations, but also enhances the enjoyment of the riding experience. It has been found, however, that to produce the same power, four-stroke engines must generally be larger and heavier than two-stroke engines. One way to increase the power of a four-stroke engine without increasing the size is by adding a forced induction system to the engine such as a turbocharger.

SUMMARY

In a first aspect, the present disclosure is directed to a cooling system for a snowmobile having an engine and a turbocharger. The cooling system includes a pump in upstream fluid communication with the engine and the turbocharger. A coolant distribution assembly is coupled to and positioned outboard of the engine. The coolant distribution assembly includes first and second thermostat chambers and a vapor tank. The first thermostat chamber is in downstream fluid communication with the engine and the vapor tank. The first thermostat chamber is selectively in upstream fluid communication with the second thermostat chamber and the pump. The vapor tank is in downstream fluid communication with the turbocharger. A heat exchanger assembly is in downstream fluid communication with the second thermostat chamber and in upstream fluid communication with the pump. The pump, the coolant distribution assembly and the heat exchanger assembly form a cooling circuit for circulating a coolant through the engine and the turbocharger.

In certain embodiments, the engine may be a four-stroke engine. In some embodiments, the pump may be integrally formed with the engine. In certain embodiments, at least a portion of the coolant distribution assembly may be positioned above the engine and above the turbocharger. In some embodiments, at least a portion of the coolant distribution assembly may be positioned aft of the turbocharger. In certain embodiments, at least a portion of the coolant distribution assembly may be positioned inboard of the turbocharger. In some embodiments, the second thermostat chamber may be positioned above the first thermostat chamber. In certain embodiments, the second thermostat chamber may include a filler cap that is positioned at an uppermost location of the cooling system. In some embodiments, the first and second thermostat chambers may be positioned aft of the vapor tank.

In certain embodiments, the first thermostat chamber may include a primary inlet in downstream fluid communication with an outlet of the engine, the first thermostat chamber may include a bypass outlet in upstream fluid communication with the pump and/or the second thermostat chamber may include a primary outlet in upstream fluid communication with the heat exchanger assembly. In such embodiments, the outlet of the engine may be positioned on an aft side of the engine, the primary inlet may be positioned on an aft side of the first thermostat chamber, the primary outlet may be positioned on an aft side of the second thermostat chamber and/or the bypass outlet may be positioned on a bottom end of the first thermostat chamber. In some embodiments, the vapor tank may have an inlet that is in downstream fluid communication with the turbocharger with the inlet positioned above the turbocharger. In certain embodiments, the vapor tank may have an outlet that is in upstream fluid communication with a secondary inlet of the first thermostat chamber with the outlet of the vapor tank positioned forward and above the secondary inlet of the first thermostat chamber. In some embodiments, the first thermostat chamber may be configured to be in upstream fluid communication with the pump during a warmup phase of engine operations and in upstream fluid communication with the second thermostat chamber after the warmup phase of engine operations is complete. In certain embodiments, a mounting bracket may couple the coolant distribution assembly to the engine. In some embodiments, the heat exchanger assembly may include first and second tunnel heat exchangers positioned in series.

In a second aspect, the present disclosure is directed to a snowmobile that has a chassis including a forward frame assembly and a tunnel extending aftwardly from the forward frame assembly with the forward frame assembly defining an engine bay. An engine is coupled to the forward frame assembly and is positioned in the engine bay. A turbocharger is operably coupled to the engine and is positioned outboard of the engine bay relative to a first lateral side of the engine. A pump is in upstream fluid communication with the engine and the turbocharger. A coolant distribution assembly is coupled to the engine. The coolant distribution assembly includes first and second thermostat chambers and a vapor tank. The first thermostat chamber is in downstream fluid communication with the engine and the vapor tank. The first thermostat chamber is selectively in upstream fluid communication with the second thermostat chamber and the pump. The vapor tank is in downstream fluid communication with the turbocharger. A heat exchanger assembly is in downstream fluid communication with the second thermostat chamber and in upstream fluid communication with the pump. The pump, the coolant distribution assembly and the heat exchanger assembly form a cooling circuit for circulating a coolant through the engine and the turbocharger. The coolant distribution assembly is positioned outboard of the engine bay relative to the first lateral side of the engine.

In certain embodiments, the engine may be a four-stroke engine. In some embodiments, the turbocharger may be coupled to the forward frame assembly. In certain embodiments, the heat exchanger assembly may include an arcuate heat exchanger coupled to a forward end of the tunnel and a longitudinal heat exchanger positioned in an upper portion of the tunnel.

In a third aspect, the present disclosure is directed to an air cooling system for a snowmobile having a forward frame assembly defining an engine bay, an engine positioned in the engine bay and a turbocharger positioned outboard of the engine bay. The air cooling system includes an intercooler in downstream fluid communication with the turbocharger. The intercooler is configured to cool compressed air from the turbocharger. An air channel is positioned forward of the intercooler. The air channel has a lower wall and a pair of oppositely disposed side walls that direct ambient ram air into the intercooler such that heat transfers from the compressed air to the ambient ram air in the intercooler, thereby cooling the compressed air and increasing the density of the compressed air before the compressed air enters the engine.

In certain embodiments, the intercooler and the air channel may be positioned above and coupled to a nose portion of the forward frame assembly. In some embodiments, the intercooler and the air channel may be positioned forward of the engine bay and/or forward of the turbocharger. In certain embodiments, the side walls of the air channel may be substantially vertically oriented and/or substantially parallel with each other. In some embodiments, the side walls of the air channel may extend above the top of the intercooler. In certain embodiments, the intercooler may be tilted forward by a forward tilt angle such that an upper portion of the intercooler is forward of a lower portion of the intercooler. In such embodiments, each of the side walls of the air channel may have an aft surface that is tilted forward by the forward tilt angle such that upper portions of the aft surfaces are forward of lower portions of the aft surfaces. In some embodiments, the lower wall may have a contoured surface configured to accommodate a snowmobile component. In certain embodiments, one of the side walls may include an opening configured to receive a snowmobile component. In some embodiments, an air grill may be positioned at least partially forward of and at least partially above the air channel with the air grill having a plurality of veins that direct the ambient ram air aftwardly and downwardly into the air channel and toward the intercooler. In such embodiments, the intercooler may be positioned at least partially below the air grill.

In a fourth aspect, the present disclosure is directed to an air intake system for a snowmobile having a forward frame assembly defining an engine bay and an engine positioned in the engine bay. The air intake system includes an airbox having an air inlet configured to receive ambient air. An air filter assembly is in downstream fluid communication with the airbox and is positioned forward of the engine bay. The air filter assembly is configured to filter the ambient air from the airbox. A turbocharger is in downstream fluid communication with the air filter assembly and is positioned outboard of a first side of the engine bay. The turbocharger is configured to compress the ambient air from the air filter assembly. An intercooler is in downstream fluid communication with the turbocharger and is positioned forward of the engine bay. The intercooler is configured to cool the compressed air from the turbocharger. A throttle valve assembly is in downstream fluid communication with the intercooler and is positioned outboard of a second side of the engine bay that is opposite of the first side of the engine bay. The throttle valve assembly is configured to regulate airflow from the intercooler to the engine. A manifold assembly is in downstream fluid communication with the throttle valve assembly and is in upstream fluid communication with the engine. An air channel is positioned forward of the intercooler. The air channel has a lower wall and a pair of oppositely disposed side walls that direct ambient ram air into the intercooler such that heat transfers from the compressed air to the ambient ram air in the intercooler, thereby cooling the compressed air and increasing the density of the compressed air before the compressed air enters the engine.

In certain embodiments, an air grill is positioned at least partially forward of and at least partially above the air channel. The air grill may have a plurality of veins that direct the ambient ram air aftwardly and downwardly into the air channel and toward the intercooler. In some embodiments, the airbox may be positioned above and forward of at least a portion of the engine. In certain embodiments, the air filter assembly may be positioned between the engine and the intercooler. In some embodiments, the manifold assembly may be positioned at least partially above and at least partially aft of the engine.

In a fifth aspect, the present disclosure is directed to a snowmobile having a forward frame assembly defining an engine bay. An engine is positioned in the engine bay. A turbocharger is coupled to the forward frame assembly and is positioned outboard of the engine bay. An intercooler is in downstream fluid communication with the turbocharger. The intercooler is configured to cool compressed air from the turbocharger. An air channel is positioned forward of the intercooler. The air channel has a lower wall and a pair of oppositely disposed side walls that direct ambient ram air into the intercooler such that heat transfers from the compressed air to the ambient ram air in the intercooler, thereby cooling the compressed air and increasing the density of the compressed air before the compressed air enters the engine.

In certain embodiments, an air grill may be positioned at least partially forward of and at least partially above the air channel. In some embodiments, the air grill may have a plurality of veins that direct the ambient ram air aftwardly and downwardly into the air channel and toward the intercooler. In certain embodiments, a front bumper and a headlight assembly may be coupled to the forward frame assembly with the air grill positioned between the front bumper and the headlight assembly. In some embodiments, the engine may be a four-stroke engine.

In a sixth aspect, the present disclosure is directed to an air intake system for a snowmobile having a forward frame assembly. The air intake system includes an airbox having an inlet configured to receive ambient air and an outlet. The airbox is coupled to a forward side of the forward frame assembly. An air filter assembly is in downstream fluid communication with the airbox. The air filter assembly has an inlet that is coupled to the outlet of the airbox. The inlet of the air filter assembly is at least partially aligned with the inlet of the airbox.

In some embodiments, the inlet of the air filter assembly may be ductlessly coupled to the outlet of the airbox. In certain embodiments, the inlet of the air filter assembly may be fully aligned with the inlet of the airbox. In some embodiments, the forward frame assembly may include first and second forward spars with the airbox coupled to a forward side of the first and second forward spars. In certain embodiments, the airbox has an underside that may include a spar groove that is configured to receive the first forward spar therein. In some embodiments, the snowmobile may include a steering column that is coupled to the forward frame assembly and the underside of the airbox may include a steering column groove that is configured to receive the steering column therein. In certain embodiments, the inlet of the air filter assembly may be forward of the inlet of the airbox. In some embodiments, the inlet of the air filter assembly may be below of the inlet of the airbox. In certain embodiments, the airbox may include a forwardly extending brace with the air filter assembly coupled to the brace.

In a seventh aspect, the present disclosure is directed to a snowmobile that includes a forward frame assembly that defines an engine bay and includes first and second forward spars. An engine is positioned in the engine bay. An airbox has an inlet configured to receive ambient air and an outlet. The airbox is coupled to a forward side of the first and second forward spars. An air filter assembly is in downstream fluid communication with the airbox. The air filter assembly has an inlet coupled to the outlet of the airbox. A turbocharger is positioned outboard of the engine bay and in downstream fluid communication with the air filter assembly. A heat exchanger is positioned forward of the engine bay and in downstream fluid communication with the turbocharger. A throttle valve assembly is positioned outboard of the engine bay and in downstream fluid communication with the heat exchanger. A manifold assembly is in downstream fluid communication with the throttle valve assembly and in upstream fluid communication with the engine. The inlet of the air filter assembly is at least partially aligned with the inlet of the airbox.

In some embodiments, the engine may have a plurality of intake ports positioned on an aft side of the engine and a plurality of exhaust ports positioned on a forward side of the engine. In such embodiments, the airbox may be positioned forward of the intake ports and at least a portion of the airbox may be positioned forward of the exhaust ports. In certain embodiments, the forward frame assembly may include first and second shock mounts with the airbox positioned aft of the first and second shock mounts. In some embodiments, the airbox may be positioned aft of the heat exchanger. In certain embodiments, the heat exchanger may be an intercooler and the airbox may be positioned aft of the intercooler. In some embodiments, the airbox may be positioned at least partially between the intercooler and the manifold assembly. In certain embodiments, the airbox may be positioned at least partially between the air filter assembly and the manifold assembly. In some embodiments, the airbox may be positioned at least partially between the throttle valve assembly and the turbocharger.

In certain embodiments, a compressed air duct may extend from the heat exchanger to the throttle valve assembly such that a forward portion of the compressed air duct is positioned forward of the airbox, an aft portion of the compressed air duct is positioned aft of the airbox and an outboard portion of the compressed air duct is positioned outboard of the airbox. In some embodiments, the airbox may be positioned at least partially outside the engine bay. In certain embodiments, an air path may sequentially include a forward and downward portion from the airbox to the air filter assembly, an outboard and aftward portion from the air filter assembly to the turbocharger, a downward, forward and inboard portion from the turbocharger to the heat exchanger, an outboard, aftward and upward portion from the heat exchanger to the throttle valve assembly and an inboard, aftward and downward portion from the throttle valve assembly through the manifold assembly to the engine.

In an eighth aspect, the present disclosure is directed to an exhaust system for a snowmobile having a forward frame assembly. The exhaust system includes a turbocharger and a muffler rigidly coupled to the turbocharger. A plurality of mounting assemblies couples the turbocharger and the muffler to the forward frame assembly. The plurality of mounting assemblies includes a first mounting assembly and a second mounting assembly. The first mounting assembly includes a first turbocharger bracket rigidly coupled to the turbocharger, a first frame bracket rigidly coupled to the forward frame assembly and a first vibration isolator interposed between the first turbocharger bracket and the first frame bracket. The second mounting assembly includes a second muffler bracket rigidly coupled to the muffler, a second frame bracket rigidly coupled to the forward frame assembly and a second vibration isolator interposed between the second muffler bracket and the second frame bracket. The first and second mounting assemblies inhibit vibrations from transferring from the forward frame assembly to the turbocharger and the muffler.

In some embodiments, the muffler may be rigidly coupled to the turbocharger with a brace. In certain embodiments, the muffler may be rigidly coupled to the turbocharger with an exhaust conduit. In some embodiments, the muffler, the brace and the exhaust conduit may form a weldment. In certain embodiments, the exhaust conduit may include a flange that is bolted to the turbocharger. In some embodiments, the plurality of mounting assemblies may include a third mounting assembly that includes a third muffler bracket rigidly coupled to the muffler, a third frame bracket rigidly coupled to the forward frame assembly and a third vibration isolator interposed between the third muffler bracket and the third frame bracket, thereby inhibiting vibrations from transferring from the forward frame assembly to the turbocharger and the muffler. In certain embodiments, the plurality of mounting assemblies may include a fourth mounting assembly that includes a fourth muffler bracket rigidly coupled to the muffler, a fourth frame bracket rigidly coupled to the forward frame assembly and a fourth vibration isolator interposed between the fourth muffler bracket and the fourth frame bracket, thereby inhibiting vibrations from transferring from the forward frame assembly to the turbocharger and the muffler. In some embodiments, the second and third muffler brackets may be rigidly coupled to an upper portion of the muffler and the fourth muffler bracket may be rigidly coupled to a lower portion of the muffler.

In a nineth aspect, the present disclosure is directed to a snowmobile that includes a forward frame assembly defining an engine bay, a turbocharger and a muffler rigidly coupled to the turbocharger. A plurality of mounting assemblies couples the turbocharger and the muffler to the forward frame assembly. The plurality of mounting assemblies includes a first mounting assembly and a second mounting assembly. The first mounting assembly includes a first turbocharger bracket rigidly coupled to the turbocharger, a first frame bracket rigidly coupled to the forward frame assembly and a first vibration isolator interposed between the first turbocharger bracket and the first frame bracket. The second mounting assembly includes a second muffler bracket rigidly coupled to the muffler, a second frame bracket rigidly coupled to the forward frame assembly and a second vibration isolator interposed between the second muffler bracket and the second frame bracket. The first and second mounting assemblies inhibit vibrations from transferring from the forward frame assembly to the turbocharger and the muffler.

In some embodiments, an engine may be positioned in the engine bay, an exhaust manifold may be coupled to a forward side of the engine and a flexible exhaust conduit may extend from the exhaust manifold to the turbocharger with the flexible exhaust conduit inhibiting vibrations from transferring from the engine to the turbocharger and the muffler. In certain embodiments, the turbocharger and the muffler may be positioned outboard of the engine bay. In some embodiments, the forward frame assembly may include first and second shock mounts with the turbocharger and the muffler positioned aft of the first and second shock mounts. In certain embodiments, the muffler may be rigidly coupled to the turbocharger with a brace. In some embodiments, the muffler may be rigidly coupled to the turbocharger with an exhaust conduit. In certain embodiments, the muffler, the brace and the exhaust conduit may form a weldment. In some embodiments, the exhaust conduit may include a flange that is bolted to the turbocharger.

In certain embodiments, the plurality of mounting assemblies may include a third mounting assembly that includes a third muffler bracket rigidly coupled to the muffler, a third frame bracket rigidly coupled to the forward frame assembly and a third vibration isolator interposed between the third muffler bracket and the third frame bracket, thereby inhibiting vibrations from transferring from the forward frame assembly to the turbocharger and the muffler. In some embodiments, the plurality of mounting assemblies may include a fourth mounting assembly that includes a fourth muffler bracket rigidly coupled to the muffler, a fourth frame bracket rigidly coupled to the forward frame assembly and a fourth vibration isolator interposed between the fourth muffler bracket and the fourth frame bracket, thereby inhibiting vibrations from transferring from the forward frame assembly to the turbocharger and the muffler. In certain embodiments, the forward frame assembly may include a forward spar, an upper beam and a lower beam with the first frame bracket rigidly coupled to the forward spar, the second and third frame brackets rigidly coupled to the upper beam and the fourth frame bracket rigidly coupled to the lower beam. In some embodiments, the second and third muffler brackets may be rigidly coupled to an upper portion of the muffler and the fourth muffler bracket may be rigidly coupled to a lower portion of the muffler.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

Figure 1A:
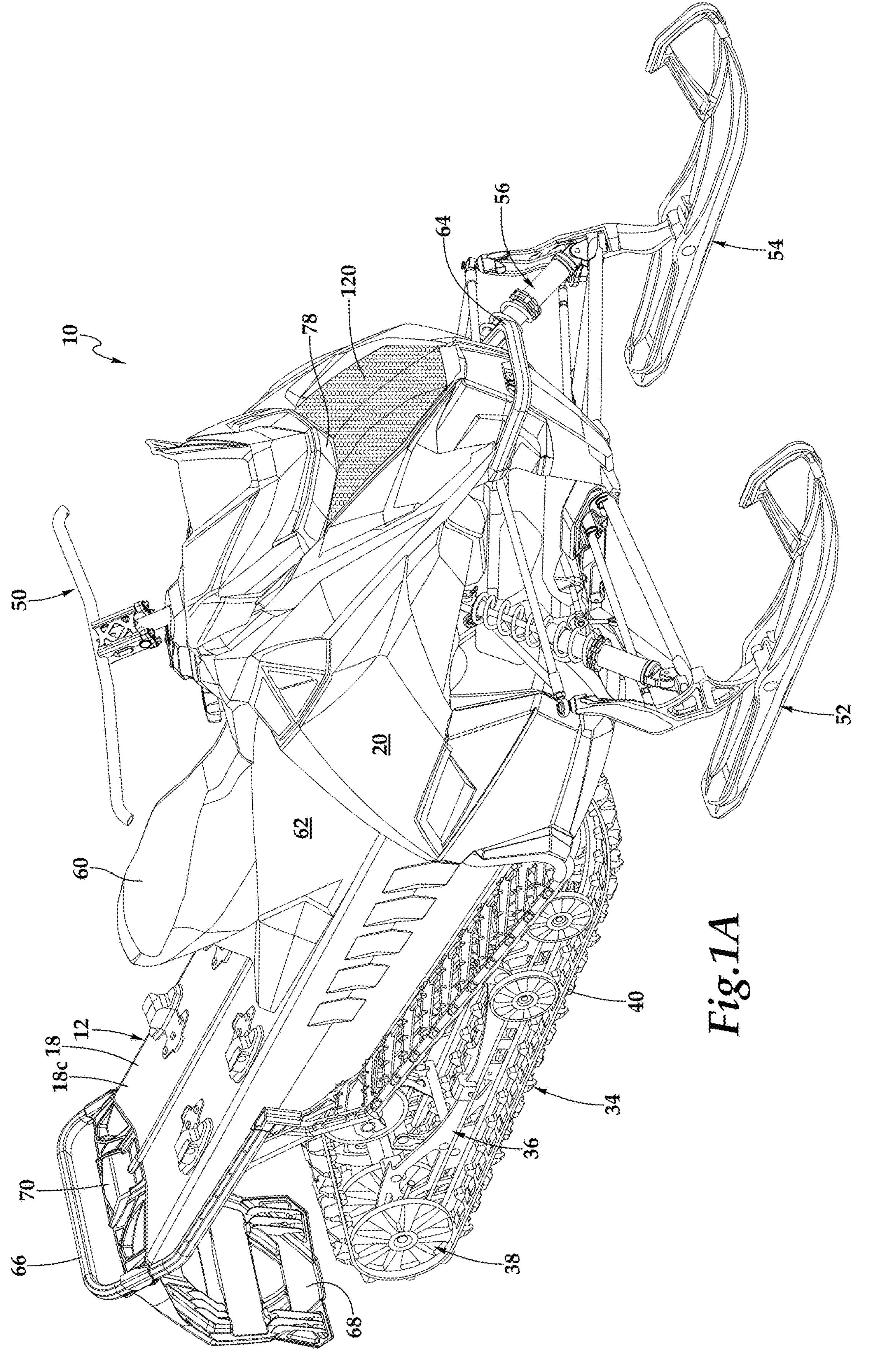
FIGS. 1A-1F are schematic illustrations of a snowmobile having a turbocharged four-stroke internal combustion engine, an air intake system, an exhaust system and a cooling system in accordance with embodiments of the present disclosure.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Referring initially to FIGS. 1A-1E and 2A-2E in the drawings, a land vehicle depicted as a snowmobile is schematically illustrated and generally designated 10. Structural support for snowmobile 10 is provided by a chassis 12 that includes a forward frame assembly 14 and a longitudinally extending tunnel 18. Forward frame assembly 14 may be formed from interconnected tubular members such as round and hollow tubular members comprised of metal, metal alloy, polymeric materials, fiber reinforced polymer composites and/or combinations thereof that are coupled together by welds, bolts, pins or other suitable fastening means. In the illustrated embodiment, forward frame assembly 14 includes a right-forward spar 14*a*, a left-forward spar 14*b*, a right-aft spar 14*c*, a left-aft spar 14*d*, a right truss 14*e*, a left truss 14*f*, a right-upper beam 14*g*, a left-upper beam 14*h*, a right-lower beam 14*i*, a left-lower beam 14*j*, a steering column mount 14*k*, a lower cross member 14*l*, a nose frame assembly 14*m* including a nose rail 14*n*, a nose truss 14*o* and a pivot mount joint 14*p* (see also FIGS. 3A-3D). A right side plate member 16*a* and a left side plate member 16*b* are coupled to and preferably welded to forward frame assembly 14 such that forward frame assembly 14 and plate members 16*a*, 16*b* form a welded frame assembly. Tunnel 18 is coupled to forward frame assembly 14 and plate members 16*a*, 16*b* with welds, bolts, rivets or other suitable means. In the illustrated embodiment, tunnel 18 includes a right sidewall 18*a*, a left sidewall 18*b* and a top panel 18*c*. Tunnel 18 may be integrally formed or may consist of multiple members that are coupled together with welds, bolts, rivets or other suitable means. Plate members 16*a*, 16*b* and tunnel 18 may be formed from sheet metal, metal alloy, fiber reinforced polymer or other suitable material or combination of materials. Various components of snowmobile 10 are assembled on or around forward frame assembly 14. Snowmobile 10 has an outer body 20 formed from one or more body panels that are coupled to forward frame assembly and may be formed from polymer or other suitable material. Body 20 is configured to cover and protect the various components of snowmobile 10 from the snow and terrain as well as to protect the rider from, for example, moving components or hot components of snowmobile 10.

Figure 1B:
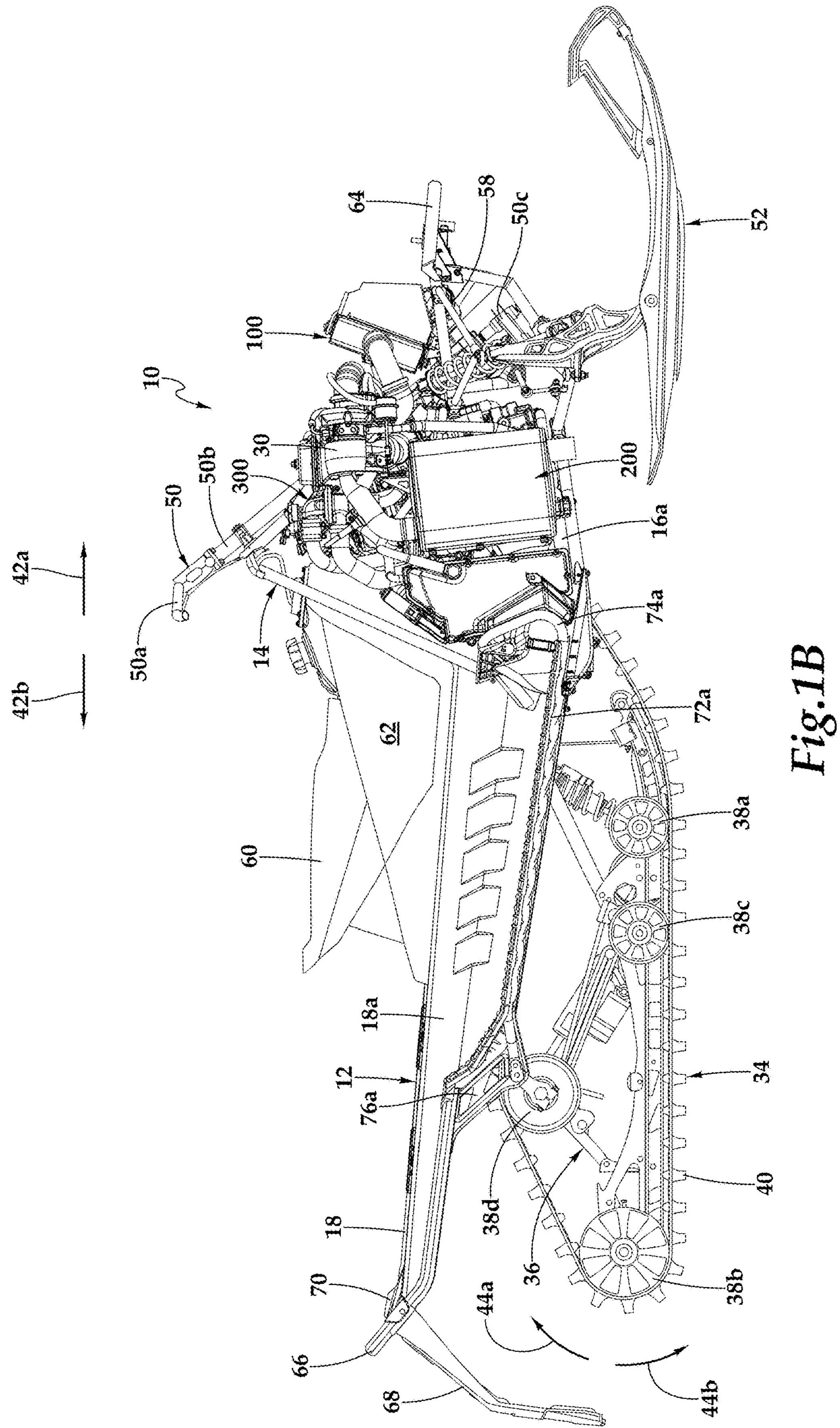
Figure 1C:
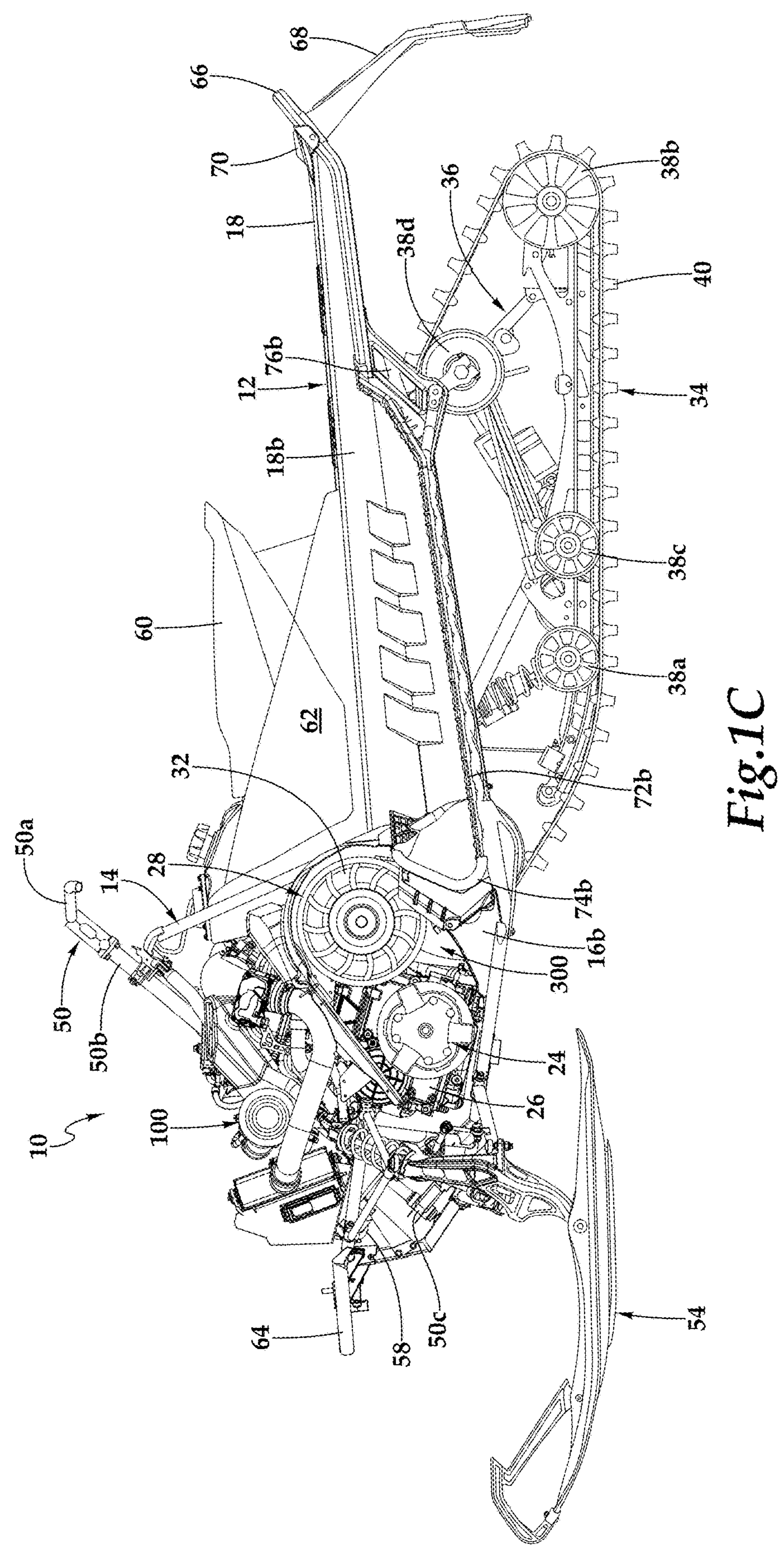
Figure 1D:
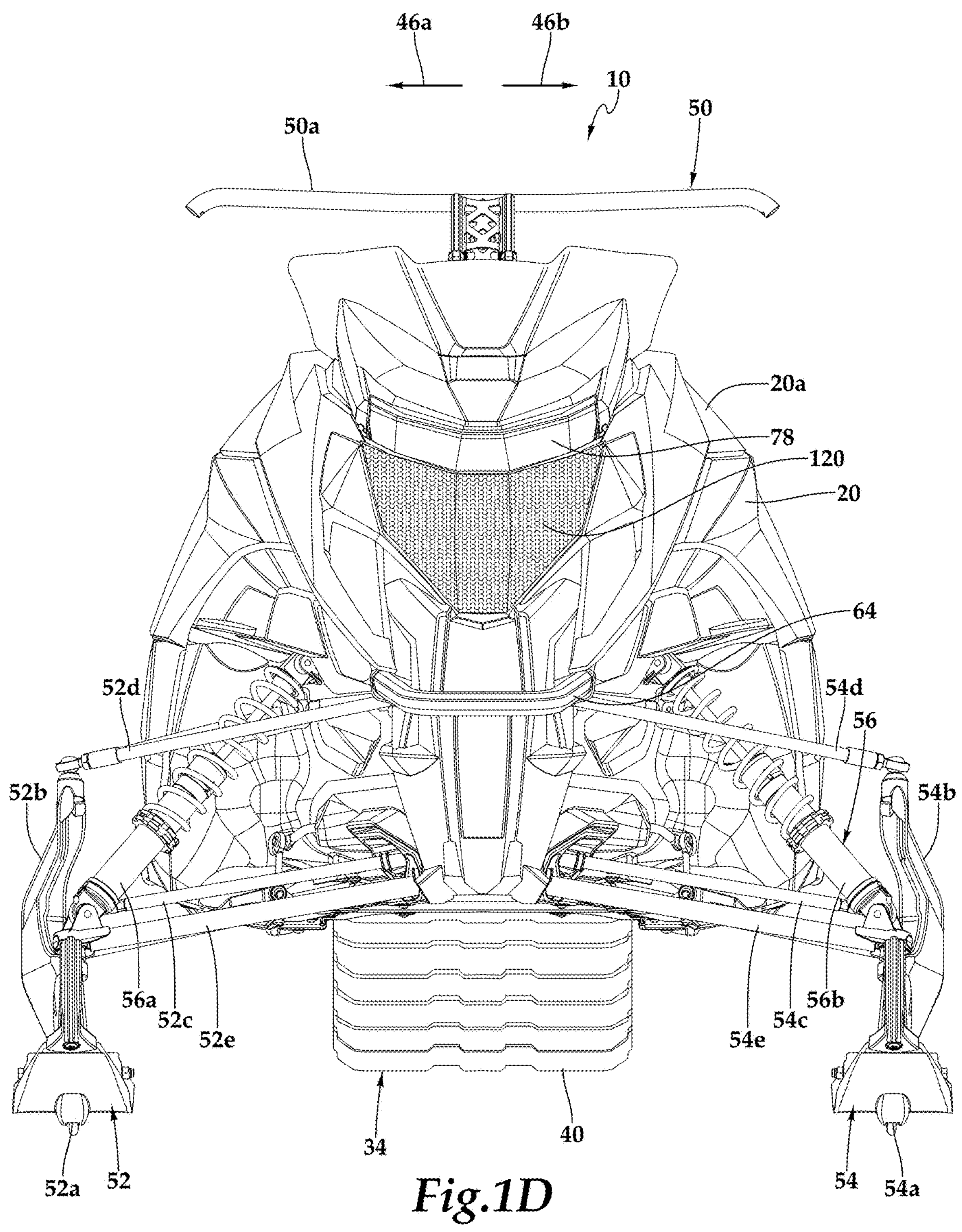
Figure 1E:
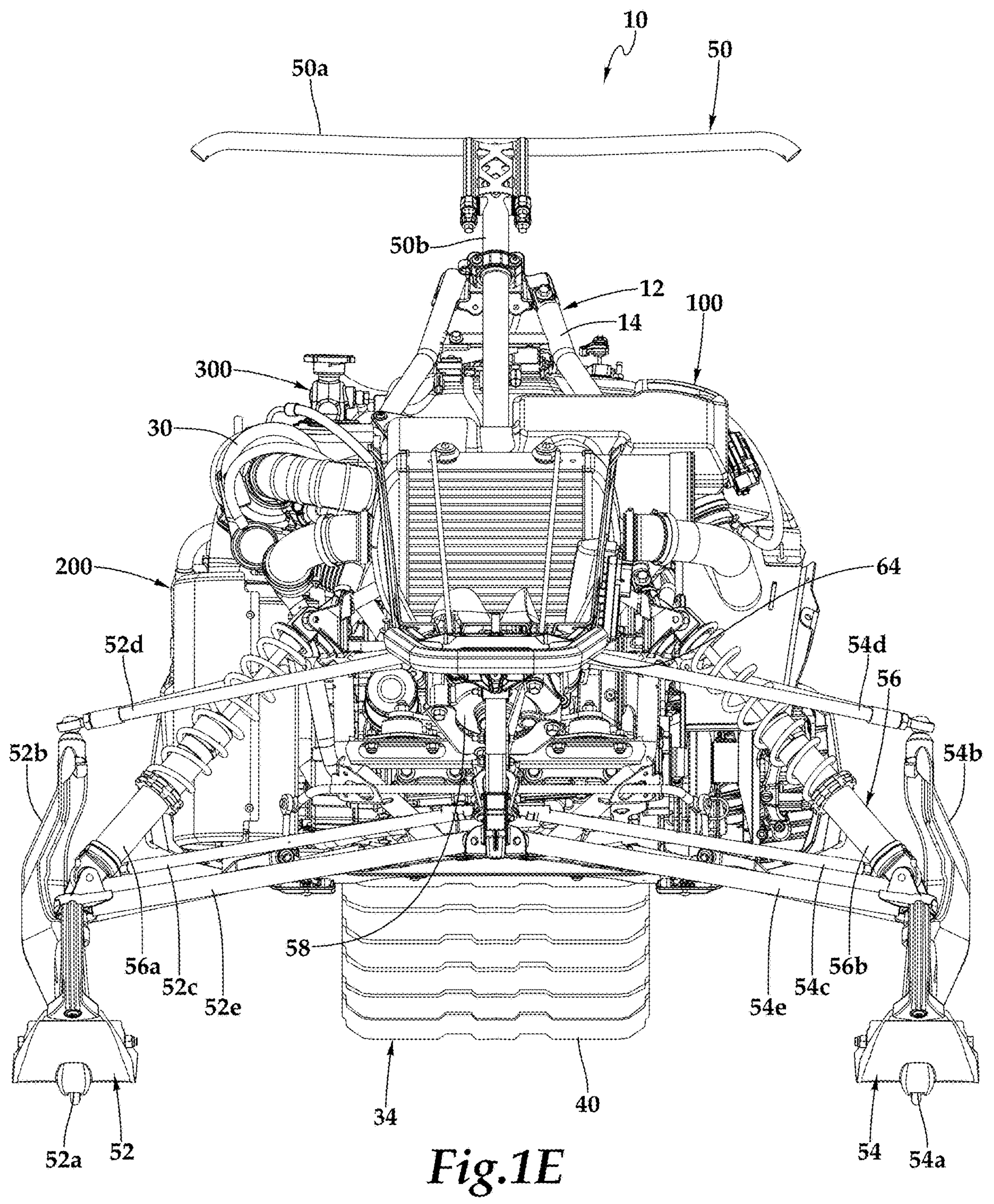
Figure 3A:
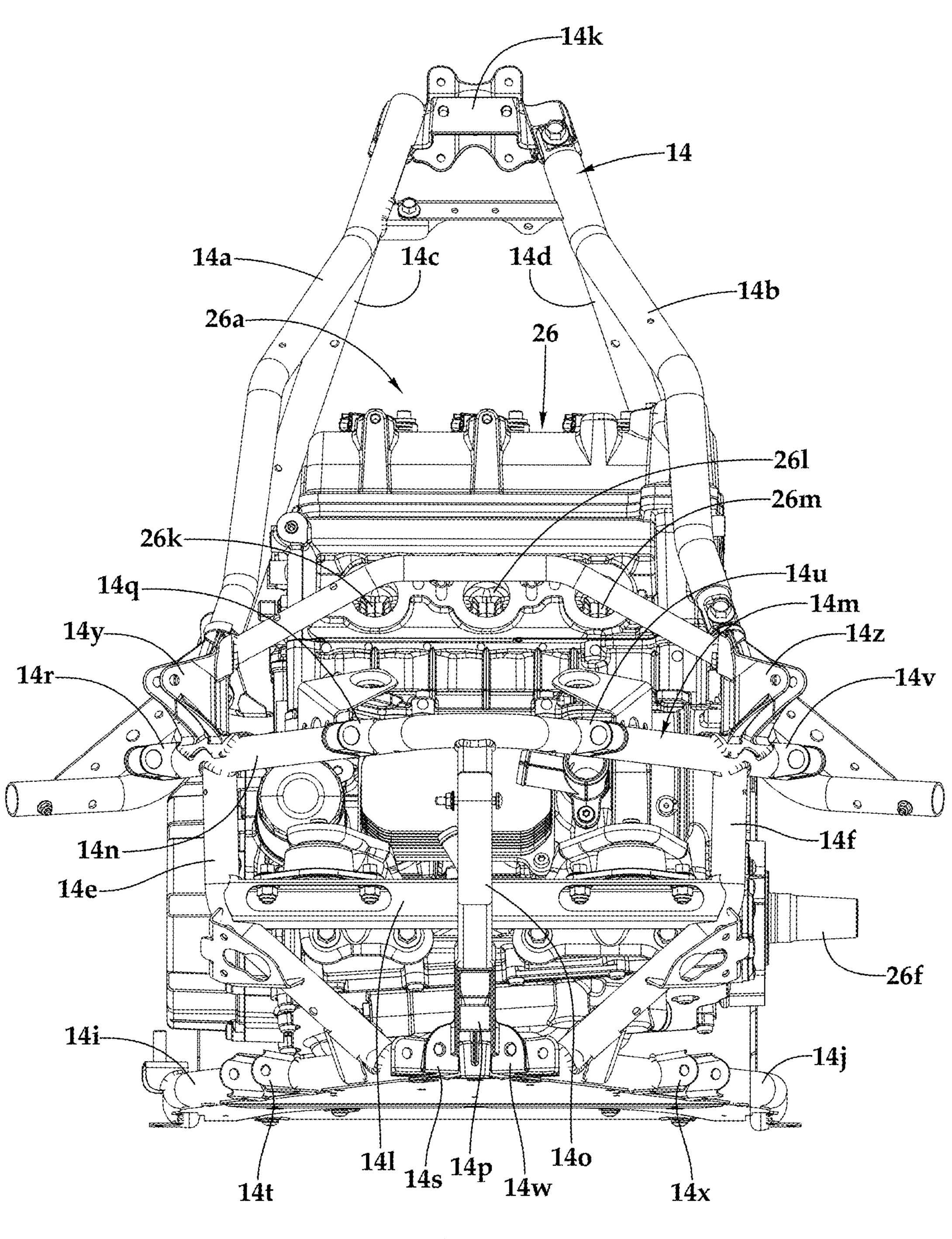
FIGS. 3A-3D are front, side and rear views of an engine positioned in an engine bay of a snowmobile in accordance with embodiments of the present disclosure.
Figure 3B:
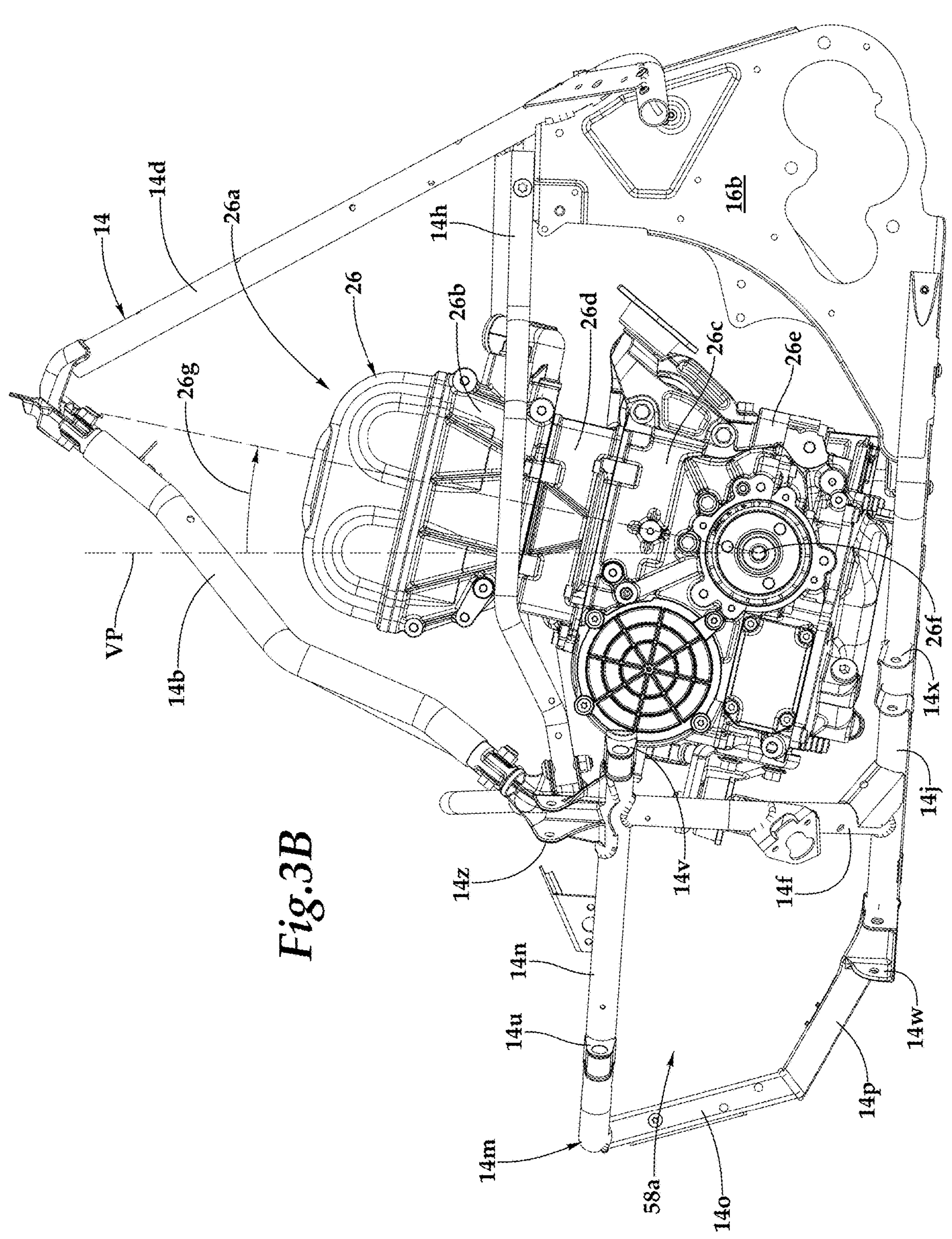
Figure 3C:
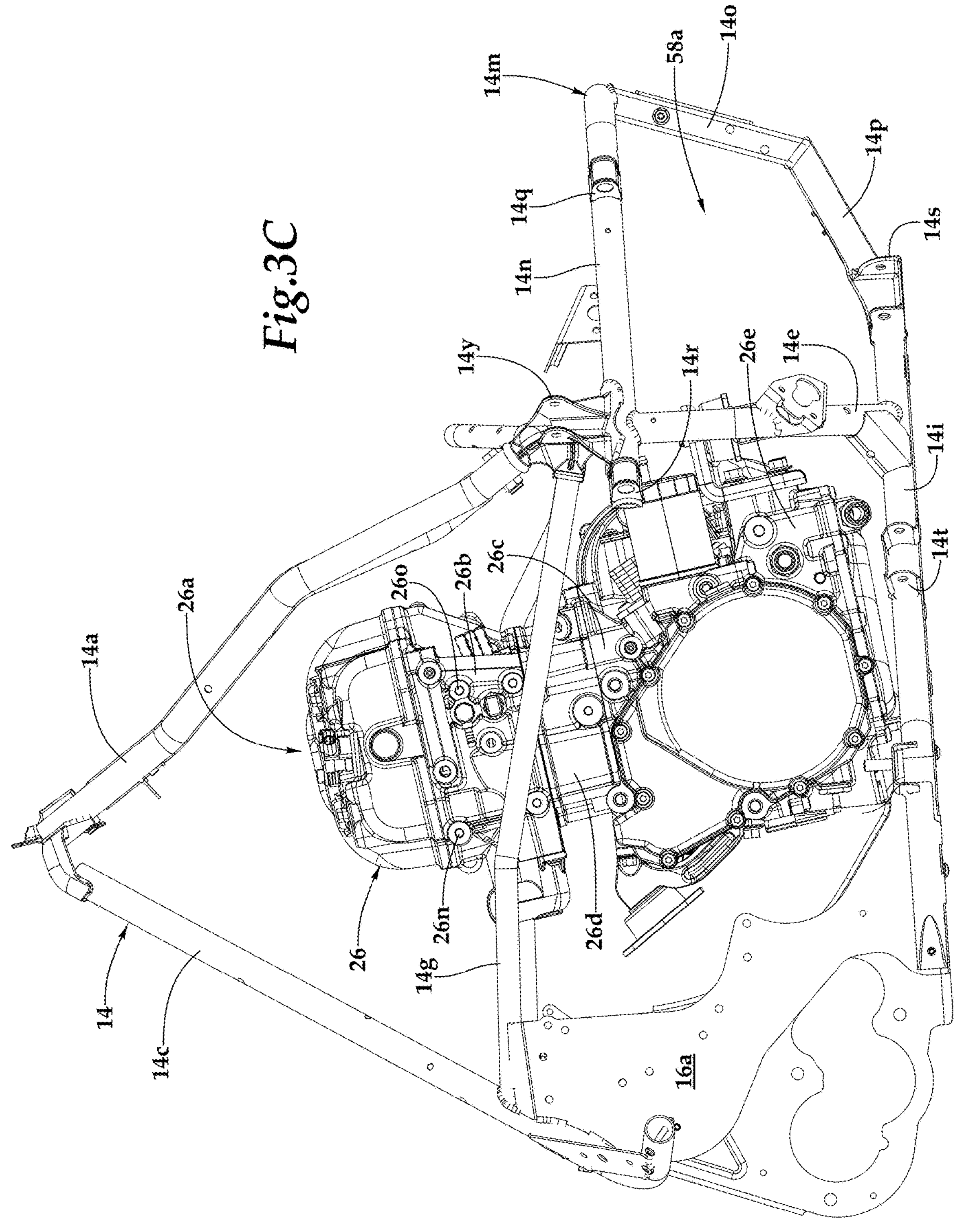

Body 20 have been removed from snowmobile 10 in FIGS. 1B-1C and 1E to reveal the underlying components of snowmobile 10. For example, snowmobile 10 has a powertrain 24 that includes an engine 26 and a drivetrain 28 both of which are coupled to forward frame assembly 14. Engine 26 resides in an engine bay 26*a* (see also FIGS. 3A-3D) formed within forward frame assembly 14. In the illustrated embodiment, engine bay 26*a* is defined by right-forward spar 14*a*, left-forward spar 14*b*, right-aft spar 14*c*, left-aft spar 14*d*, right truss 14*e*, left truss 14*f*, right-upper beam 14*g*, left-upper beam 14*h*, right-lower beam 14*i*, left-lower beam 14*j* and lower cross member 14*l*. Engine 26 may be any type of engine such as a four-stroke engine, a two-stroke engine, an electric motor or other prime mover. In the illustrated embodiment, engine 26 is a forced induction internal combustion engine that receives boost from a turbocharger 30. In other embodiments, engine 26 may operate as a naturally aspirated internal combustion engine. Engine 26 converts thermal energy into mechanical energy to drive the moving parts snowmobile 10, thereby enabling motion. As best seen in FIGS. 3A-3D, engine 26 has a cylinder head 26*b* and an engine block 26*c* that includes a cylinder block 26*d* and a crankcase 26*e* which houses crankshaft 26*f*. As best seen in FIG. 3B, when engine 26 is installed within snowmobile 10, engine 26 has an aftward tilt angle relative to a vertical plane VP, as indicated by arrow 26*g*, when snowmobile 10 is resting on a horizonal surface, as illustrated in FIGS. 1B-1C. In the illustrated embodiment, the aftward tilted angle is between five degrees and thirty degrees relative to vertical plane VP such as between ten degrees and twenty degrees relative to vertical plane VP. It should be understood by those having ordinary skill in the art that engine 26 could have other orientations including aftward tilted angles both less than five degrees and greater than thirty degrees relative to vertical plane VP, a vertical orientation or a forward tilted angle.

Figure 3D:
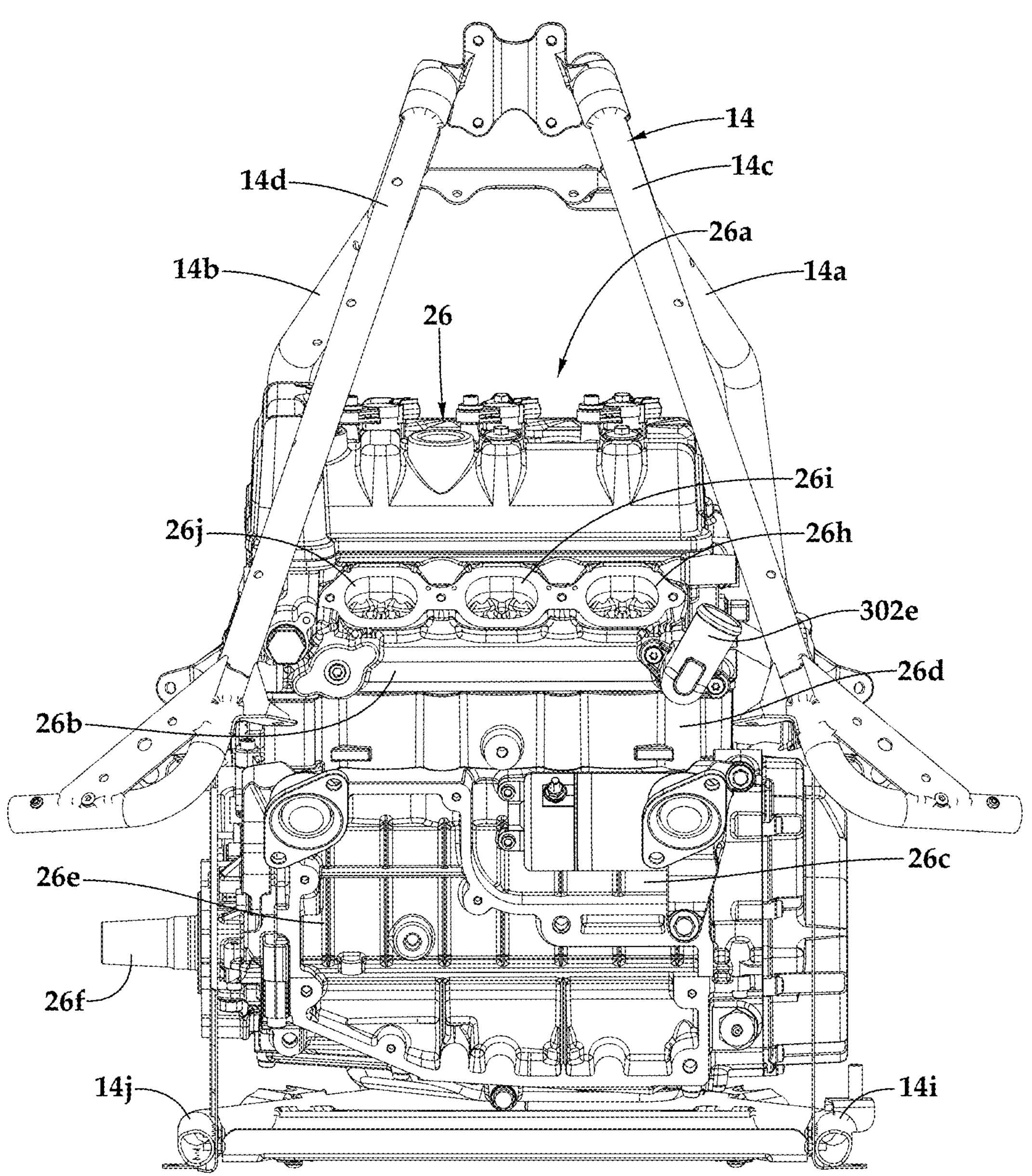

As best seen in FIG. 3D, the aft side of engine 26 include a plurality of intake ports through which a compressed air and fuel mixture enters engine 26. In the illustrated embodiment, engine 26 includes a right intake port 26*h* that supplies the air and fuel mixture to a right cylinder of engine 26, a center intake port 26*i* that supplies the air and fuel mixture to a center cylinder of engine 26 and a left intake port 26*j* that supplies the air and fuel mixture to a left cylinder of engine 26. In other embodiments, engine 26 could have less than or more than three cylinders with a corresponding number of intake ports. As best seen in FIG. 3A, the forward side of engine 26 include a plurality of exhaust ports through which high-temperature exhaust gases produced by the combustion of the air and fuel mixture are expelled. In the illustrated embodiment, engine 26 includes a right exhaust port 26*k* corresponding to the right cylinder of engine 26, a center exhaust port 26*l* corresponding to the center cylinder of engine 26 and a left exhaust port 26*m* corresponding to the left cylinder of engine 26. In embodiments with less than or more than three cylinders, the engine would include a corresponding number of exhaust ports. In the illustrated embodiment, the forward side of engine 26 is considered to be the hot side of engine 26 due to the hot temperatures associated with engine exhaust. The aft side of engine 26 is concomitantly considered the cool side of engine 26 as the hot exhaust system components are located opposite and/or remote therefrom.

In the illustrated embodiment, drivetrain 28 includes a transmission depicted as a continuously variable transmission 32 that varies the ratio of the engine output speed to the drive track input speed. In other embodiments, the transmission for snowmobile 10 may be an electrically variable transmission or other suitable transmission type. A drive track system 34 is at least partially disposed within and/or below tunnel 18 and is in contact with the ground to provide ground propulsion for snowmobile 10. Torque and rotational energy are provided to drive track system 34 from powertrain 24. Drive track system 34 includes a track frame and rear suspension assembly 36 that is coupled to tunnel 18. A plurality of idler wheel assemblies 38 are rotatably coupled to track frame and rear suspension assembly 36 including a forwardmost idler wheel assembly 38*a*, an aftmost idler wheel assembly 38*b*, an intermediate idler wheel assembly 38*c* and an uppermost idler wheel assembly 38*d*. Drive track system 34 also includes a ground-engaging endless drive track 40 that is driven by a track drive sprocket via a track driveshaft (not visible) that is rotated responsive to torque provided from powertrain 24. The track drive sprocket is considered to be a component of powertrain 24 as well as a component of drive track system 34.

Drive track 40 rotates around idler wheel assemblies 38 of track frame and rear suspension assembly 36 to propel snowmobile 10 in either the forward direction, as indicated by arrow 42*a*, or the backwards direction, as indicated by arrow 42*b*. When viewed from the right side of snowmobile 10, as best seen in FIG. 1B, drive track 40 rotates around idler wheel assemblies 38 of track frame and rear suspension assembly 36 in the clockwise direction, as indicated by arrow 44*a*, to propel snowmobile 10 in the forward direction 42*a* and in the counterclockwise direction, as indicated by arrow 44*b*, to propel snowmobile 10 in the backward direction 42*b*. The backward direction may also be referred to herein as the aftward direction. The forward and backward directions also represent the longitudinal direction of snowmobile 10 with the lateral direction of snowmobile 10 being normal thereto and represented by the rightward direction, as indicated by arrow 46*a*, and the leftward direction, as indicated by arrow 46*b* in FIG. 1D. It should be understood by those having ordinary skill in the art that the right side and the left side of snowmobile 10 will be with reference to a rider of snowmobile 10 with the right side of snowmobile 10 corresponding to the right side of the rider and the left side of snowmobile 10 corresponding to the left side of the rider.

Snowmobile 10 has a steering system 50 that includes a handlebar assembly 50*a* that is operably coupled to a right ski assembly 52 and a left ski assembly 54 by a steering column 50*b* and a steering arm assembly 50*c*. Right ski assembly 52 includes a ski 52*a*, a spindle 52*b*, a tie rod 52*c*, an upper A-arm 52*d* and a lower A-arm 52*e*. Left ski assembly 54 includes a ski 54*a*, a spindle 54*b*, a tie rod 54*c*, an upper A-arm 54*d* and a lower A-arm 54*e*. Right ski assembly 52 is pivotably coupled to forward frame assembly 14 by upper A-arm 52*d* and lower A-arm 52*e*. Likewise, left ski assembly 54 is pivotably coupled to forward frame assembly 14 by upper A-arm 54*d* and lower A-arm 54*e*. More specifically, upper A-arm 52*d* couples right ski assembly 52 to nose rail 14*n* of forward frame assembly 14 at upper A-arm mounts 14*q*, 14*r* (see also FIGS. 3A-3D). Lower A-arm 52*e* couples right ski assembly 52 to forward frame assembly 14 at lower A-arm mounts 14*s*, 14*t*. Upper A-arm 54*d* couples left ski assembly 54 to nose rail 14*n* of forward frame assembly 14 at upper A-arm mounts 14*u*, 14*v*. Lower A-arm 54*e* couples left ski assembly 54 to forward frame assembly 14 at lower A-arm mounts 14*w*, 14*x*. Upper A-arm mounts 14*q*, 14*u* may collectively be referred to herein as forward upper A-arm mounts 14*q*, 14*u*. Upper A-arm mounts 14*r*, 14*v* may collectively be referred to herein as aft upper A-arm mounts 14*r*, 14*v*. Lower A-arm mounts 14*s*, 14*w* may collectively be referred to herein as forward lower A-arm mounts 14*s*, 14*w*. Lower A-arm mounts 14*t*, 14*x* may collectively be referred to herein as aft lower A-arm mounts 14*t*, 14*x*. Right ski assembly 52 and left ski assembly 54 may be collectively referred to herein as a ski system.

Snowmobile 10 has a front suspension assembly 56 that is coupled between each of ski assemblies 52, 54 and forward frame assembly 14 to provide front end support for snowmobile 10. More specifically, a right shock absorber 56*a* couples right ski assembly 52 to forward frame assembly 14 at shock mount 14*y* and a left shock absorber 56*b* couples left ski assembly 54 to forward frame assembly 14 at shock mount 14*z* (see also FIG. 3A). Steering system 50 enables the rider to steer snowmobile 10 by rotating handlebar assembly 50*a* which causes the skis 52*a*, 54*a* to pivot. In the illustrated embodiment, the pivoting of skis 52*a*, 54*a* responsive to rotation of handlebar assembly 50*a* is assisted by an electric power steering system (EPS) depicted as electronic steering assist unit 58 which is at least partially positioned within an electronic steering assist unit bay 58*a* (see FIGS. 3B-3C) that is defined by right truss 14*e*, left truss 14*f*, a forward portion of right-lower beam 14*i*, a forward portion of left-lower beam 14*j*, lower cross member 14*l*, nose rail 14*n*, nose truss 14*o* and pivot mount joint 14*p*. As lower cross member 14*l* helps to define both engine bay 26*a* and electronic steering assist unit bay 58*a*, lower cross member 14*l* is considered to be positioned between engine bay 26*a* and electronic steering assist unit bay 58*a*.

The rider controls snowmobile 10 from a seat 60 that is positioned atop a fuel tank 62, above tunnel 18, aft of handlebar assembly 50*a* and aft of forward frame assembly 14. Snowmobile 10 has a front bumper 64 that is coupled to nose frame assembly 14*m*. Snowmobile 10 has an aft bumper 66 that is coupled to an aft end of tunnel 18 and includes a cross member positioned aft of tunnel 18 to allow a person to lift the rear end of snowmobile 10 in the event that snowmobile 10 becomes stuck or needs to be repositioned when it is not moving. A snow flap 68 is coupled to aft bumper 66 and is configured to deflect snow emitted by drive track 40. A taillight housing 70 is coupled between aft bumper 66 and the aft end of tunnel 18 and is configured to house a taillight of snowmobile 10. Snowmobile 10 includes a right side running board assembly 72*a* and a left side running board assembly 72*b*. At its forward end, running board assembly 72*a* is coupled to forward frame assembly 14 by an attachment rail 74*a*. In addition, running board assembly 72*a* is coupled to tunnel 18 via a right side tunnel bracket 76*a*. At its forward end, running board assembly 72*b* is coupled to forward frame assembly 14 by an attachment rail 74*b*. In addition, running board assembly 72*b* is coupled to tunnel 18 via a left side tunnel bracket 76*b*. Snowmobile 10 includes a headlight assembly 78.

As discussed in greater detail herein, snowmobile 10 an air intake system 100, an exhaust system 200 and an engine cooling system 300. In general, air intake system 100 draws in ambient air, filters out impurities, compresses the air, cools the compressed air and throttles the cooled air to supply clean and oxygen-rich air to engine 26. Exhaust system 200 directs high-temperature waste gases away from engine 26 and the rider of snowmobile 10 and also helps to control the emissions and reduce noise from engine 26 by damping the sound waves produced during combustion. Cooling system 300 transfers heat from a circulating coolant fluid to snow being kick up by drive track system 34 into tunnel 18 then routes the coolant fluid back through engine 26 and turbocharger 30 to absorb heat therefrom.

Figure 1F:
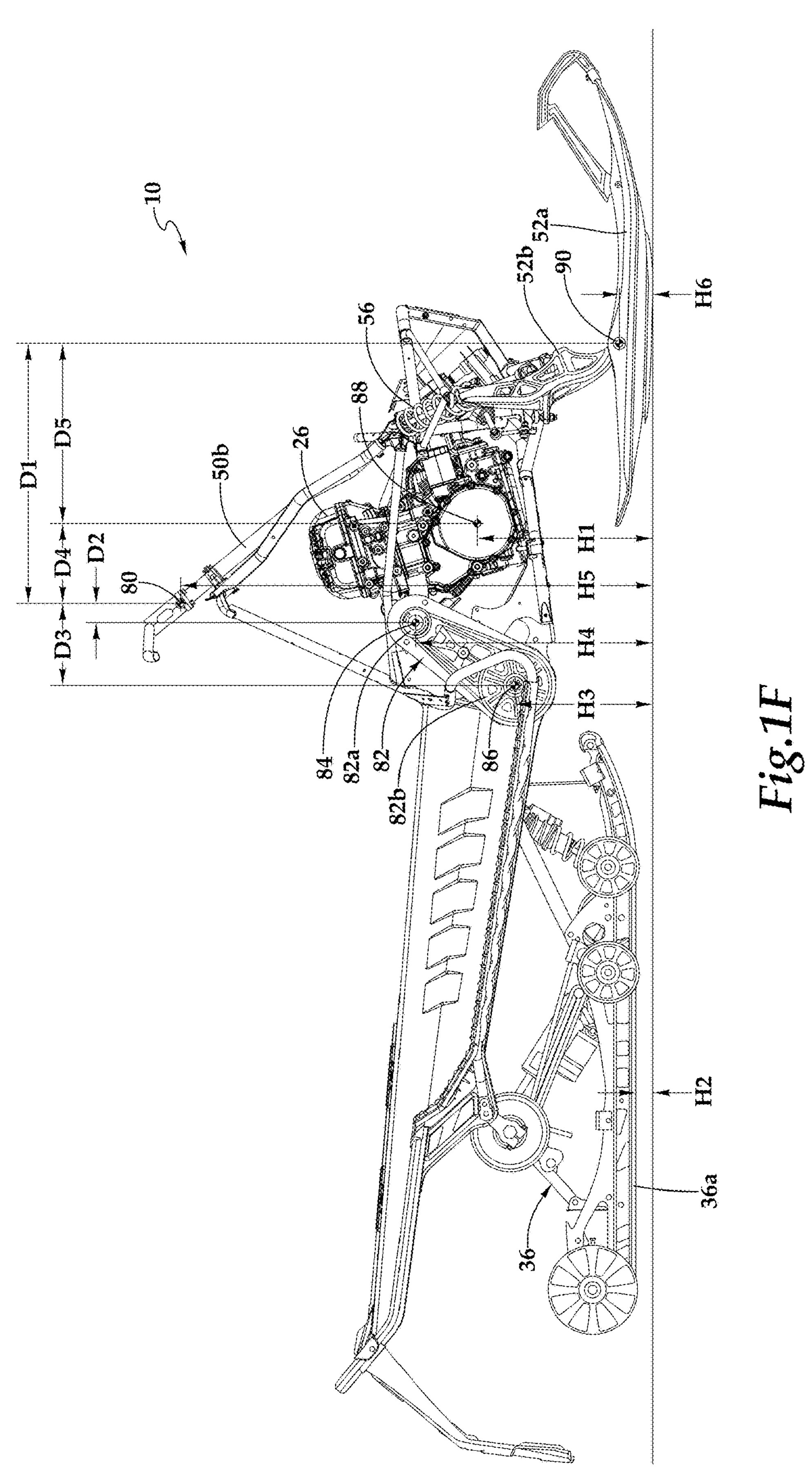
Figure 2A:
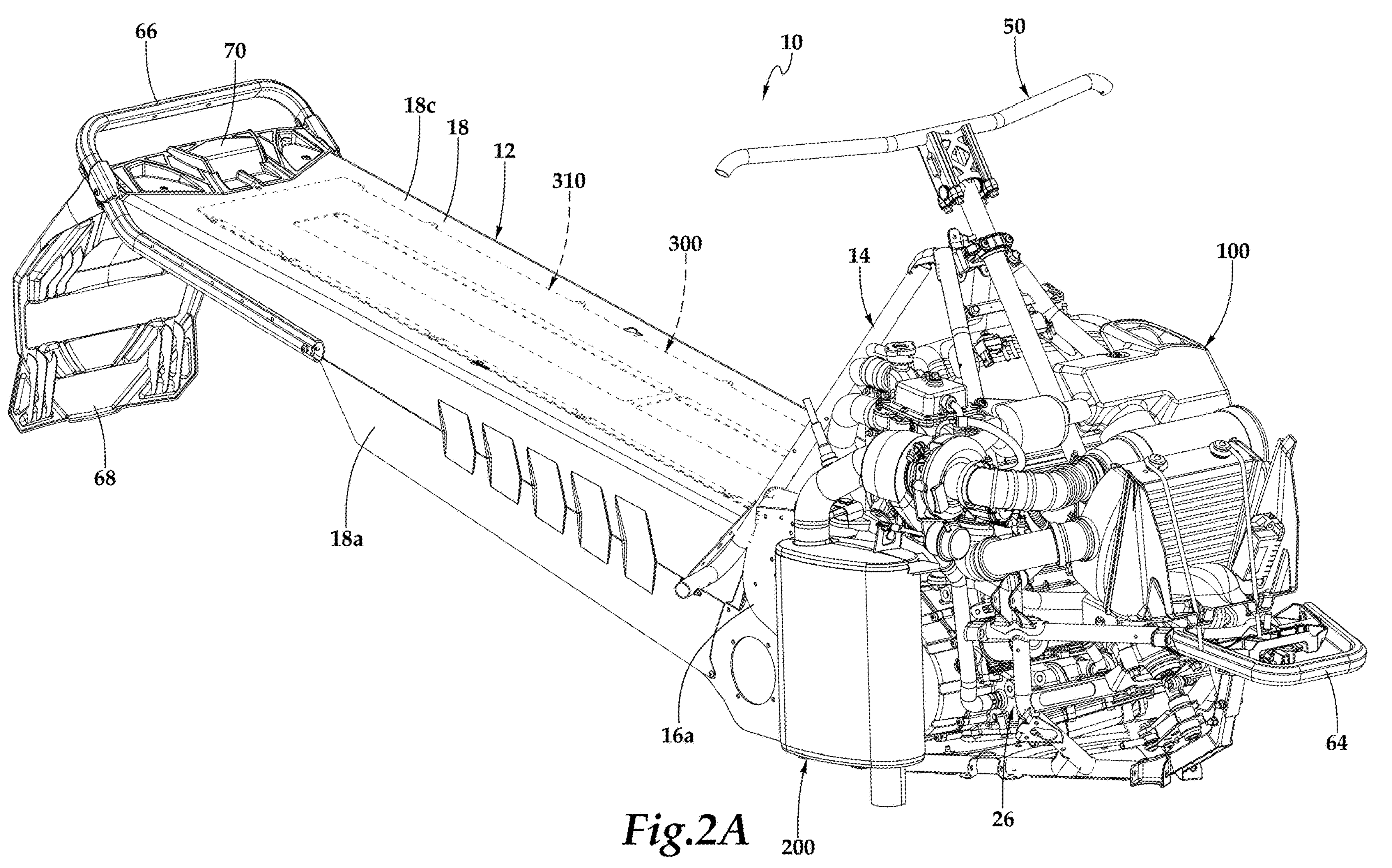
FIGS. 2A-2E are schematic illustrations of a turbocharged four-stroke internal combustion engine, an air intake system, an exhaust system and a cooling system for a snowmobile in accordance with embodiments of the present disclosure.
Figure 2B:
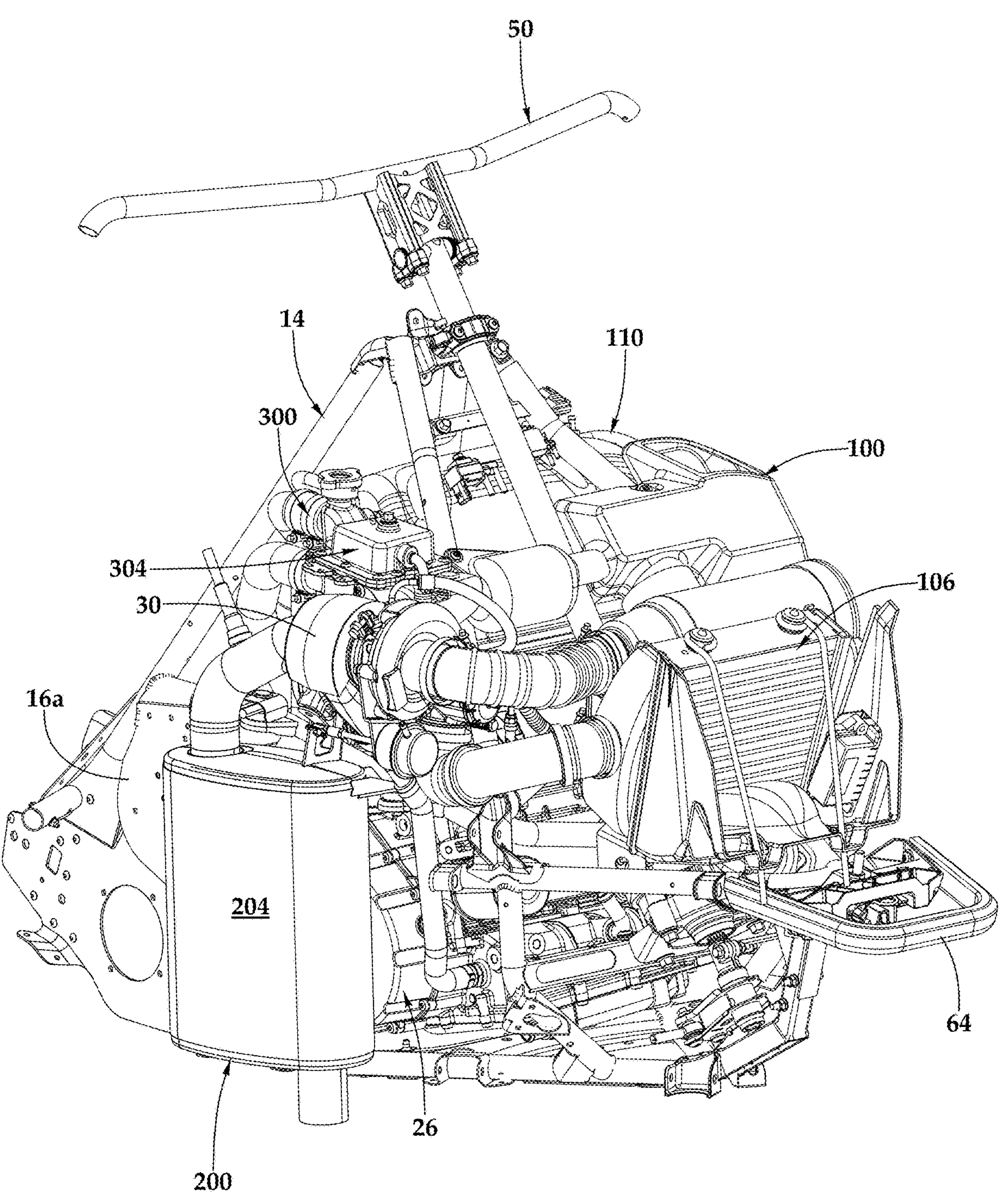
Figure 2C:
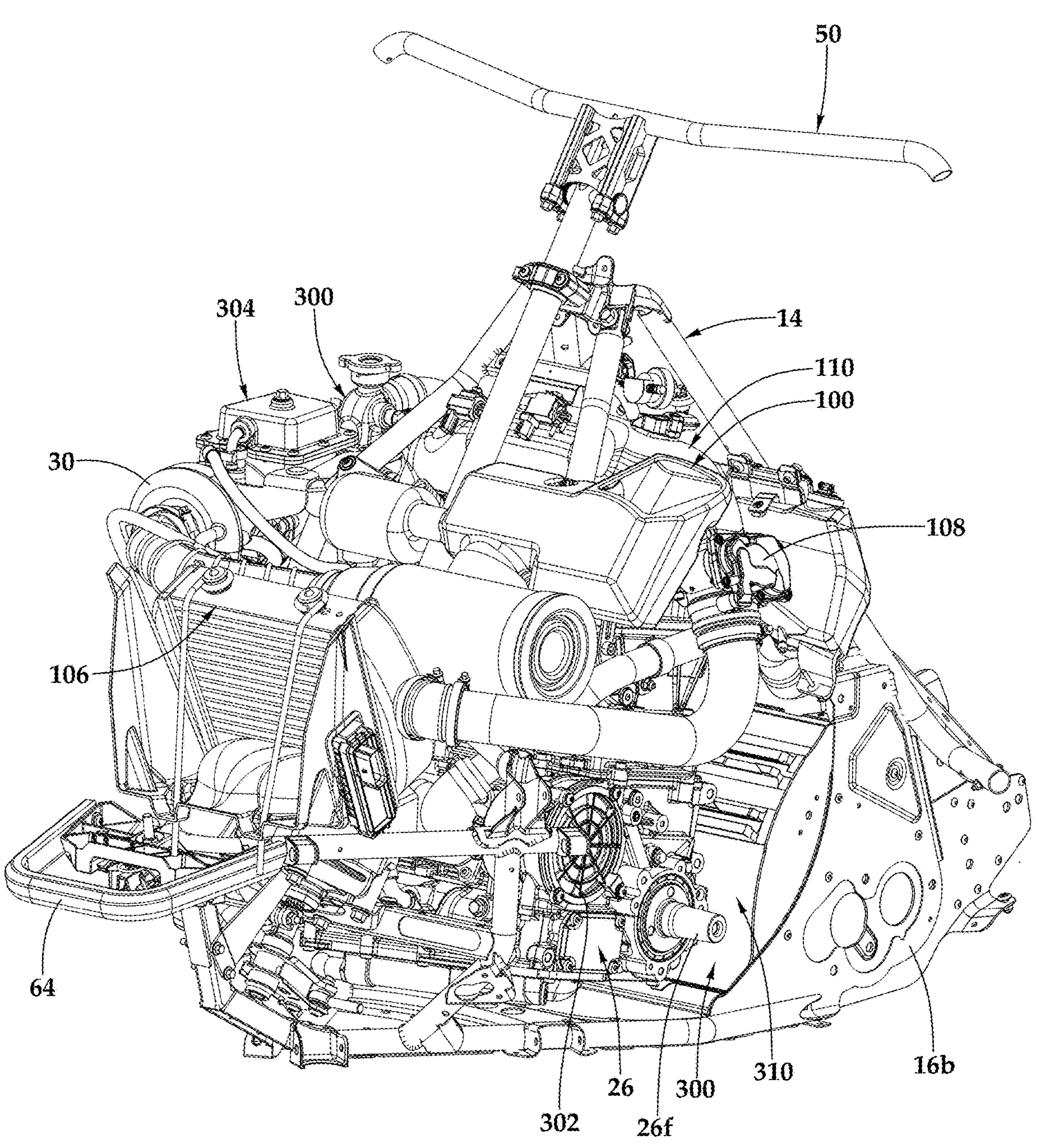
Figure 2D:
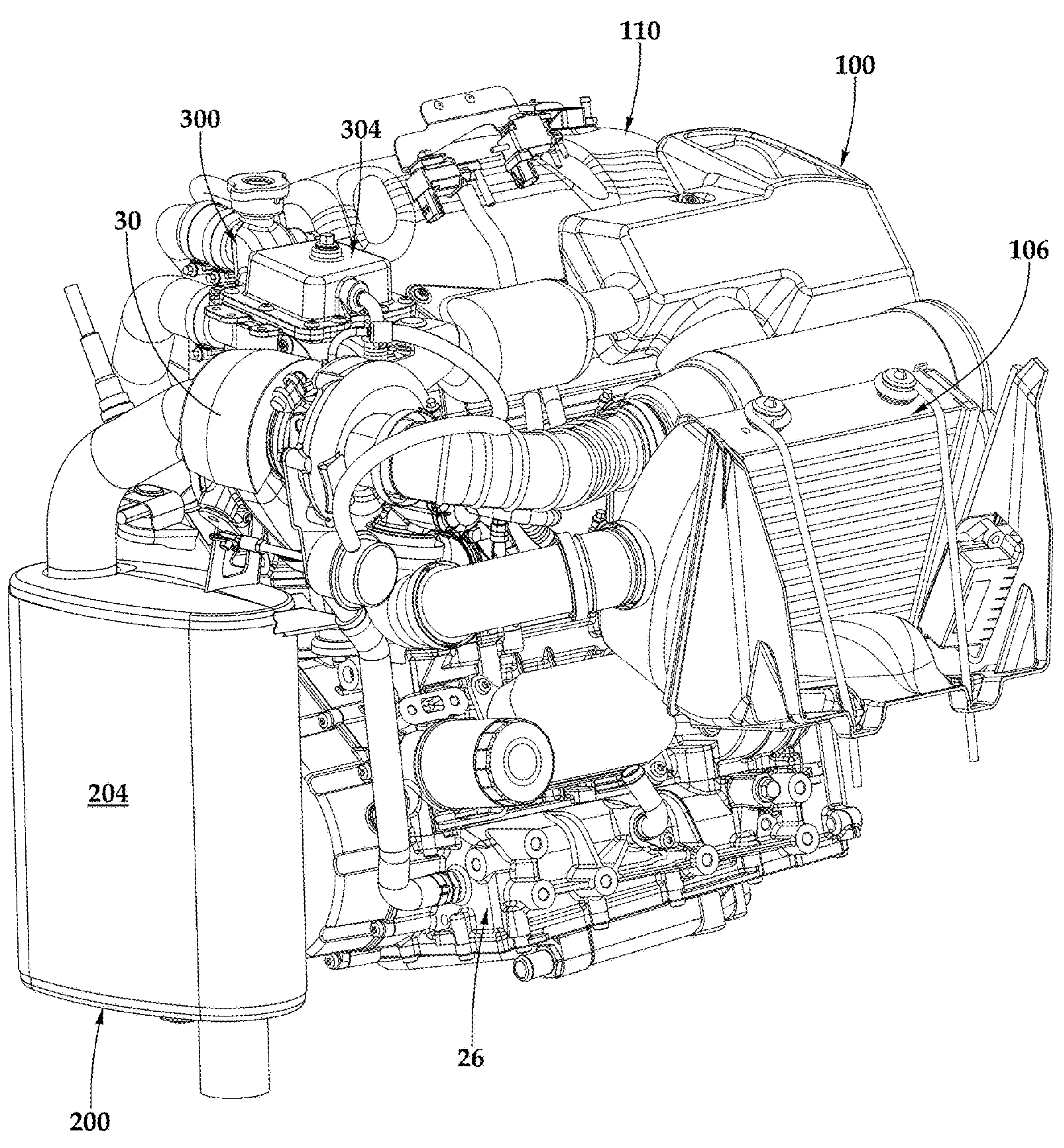
Figure 2E:
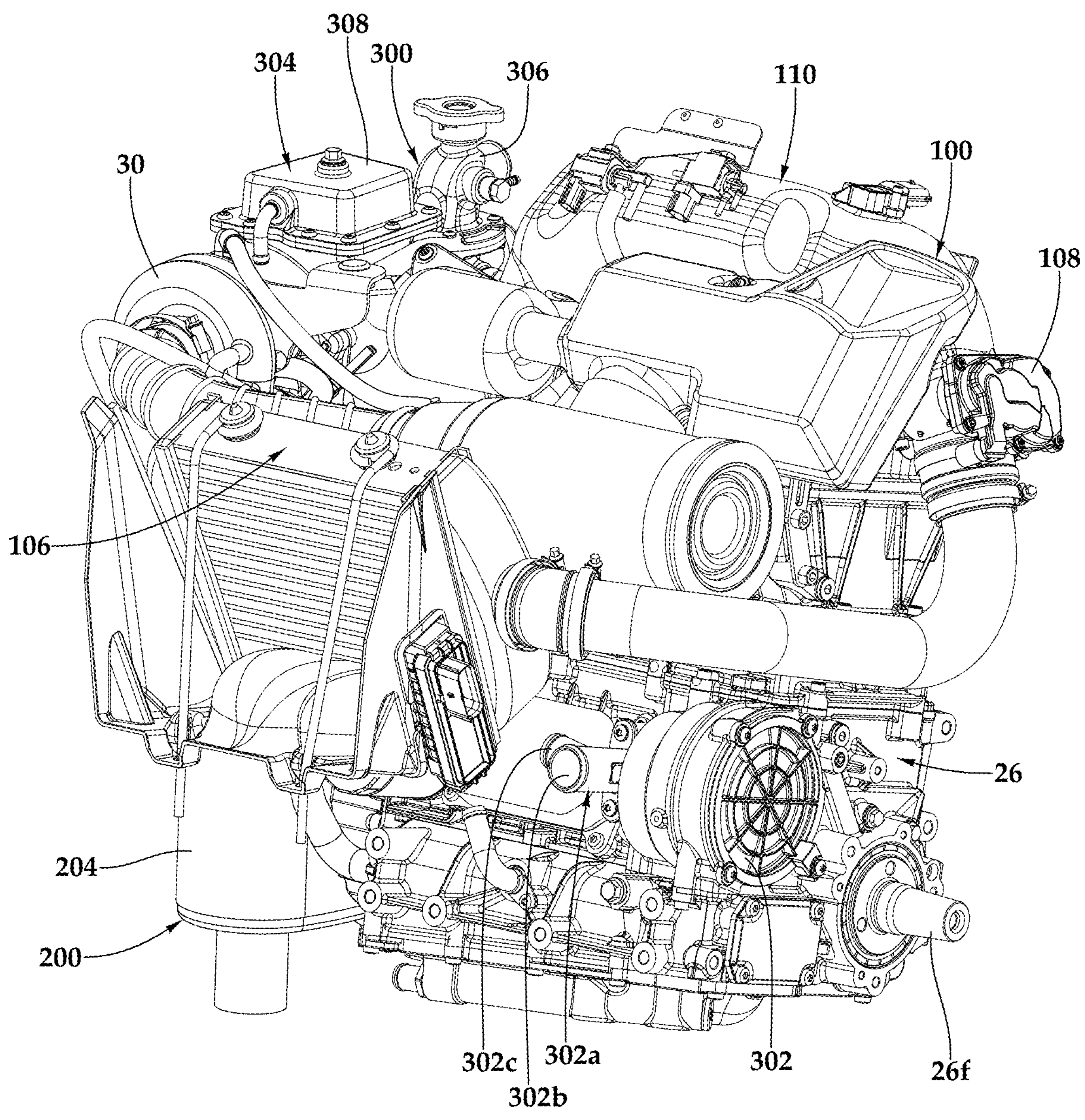

Some dimensions of snowmobile 10 will now be discussed with reference to FIG. 1F. Dimensions in the longitudinal direction of snowmobile 10 are labeled D1-D5 and dimensions in the vertical direction of snowmobile 10 are labeled H1-H6. These dimensions represent distances measured when front suspension 56 and rear suspension 36 are in a resting state. Some of the dimensions will be defined relative to a reference point that is located at the uppermost fixed point of steering column 50*b* which is denoted as target 80. In the illustrated embodiment, drivetrain 28 includes a drive assembly 82 that couples continuously variable transmission 32 to drive track system 34 (see also FIG. 1C). Drive assembly 82 includes a drive sprocket 82*a* and a driven sprocket 82*b*. The axis of rotation of drive sprocket 82*a* is denoted by target 84 and the axis of rotation of driven sprocket 82*b* is denoted by target 86. The axis of rotation of crankshaft 26*f* of engine 26 is denoted as target 88. The ski mount axis of ski 52*a* to spindle 52*b* as well as ski 54*a* to spindle 54*b* is denoted as target 90. In the illustrated embodiment, ski mount axis 90 is positioned forward of reference point 80 by a distant D1. Axis of rotation 84 of drive sprocket 82*a* is positioned aft of reference point 80 by a distant D2. Axis of rotation 86 of driven sprocket 82*b* is positioned aft of reference point 80 by a distant D3. Axis of rotation 88 of crankshaft 26*f* is positioned forward of reference point 80 by a distant D4 and is positioned aft of ski mount axis 90 by a distant D5. Axis of rotation 88 of crankshaft 26*f* is positioned above the ground at a distance H1. A skid rail 36*a* of track frame and rear suspension assembly 36 is positioned above the ground at a distance H2. Axis of rotation 86 of driven sprocket 82*b* is positioned above the ground at a distance H3. Axis of rotation 84 of drive sprocket 82*a* is positioned above the ground at a distance H4. Reference point 80 is positioned above the ground at a distance H5. Ski mount axis 90 is positioned above the ground at a distance H6.

A comparison of various distances will now be discussed. In the illustrated embodiment, distance D2 is between five and ten percent of distance D1 such as between seven and eight percent of distance D1. Distance D3 is between twenty-five and forty percent of distance D1 such as between thirty-one and thirty-three percent of distance D1. Distance D4 is between twenty-five and forty percent of distance D1 such as between twenty-nine and thirty-two percent of distance D1. Distance D5 is between sixty and eighty percent of distance D1 such as between sixty-eight and seventy percent of distance D1. In the illustrated embodiment, D2<D4<D3<D5<D1. In other embodiments, distances D1-D5 could vary, for example, distance D3 could be less than distance D4. It should be noted that distance D1 between ski mount axis 90 and reference point 80 may be shorter than that of a conventional snowmobile which positions front suspension 56 and/or engine 26 closer to the rider which may provide for a more responsive ride. In the illustrated embodiment, distance H2 is between five and fifteen percent of distance H1 such as between eight and eleven percent of distance H1. Distance H3 is between seventy and eighty-five percent of distance H1 such as between seventy-seven and seventy-nine percent of distance H1. Distance H4 is between one hundred thirty and one hundred forty percent of distance H1 such as between one hundred thirty-four and one hundred thirty-six percent of distance H1. Distance H5 is between two hundred sixty and two hundred eighty percent of distance H1 such as between two hundred sixty-five and two hundred seventy-one percent of distance H1. Distance H6 is between fifteen and twenty-five percent of distance H1 such as between seventeen and twenty-three percent of distance H1. In the illustrated embodiment, H2<H6<H3<H1<H4<H5. In other embodiments, distances H1-H6 could vary.

It should be appreciated that snowmobile 10 is merely illustrative of a variety of vehicles that can implement the embodiments disclosed herein. Other vehicle implementations can include motorcycles, snow bikes, all-terrain vehicles (ATVs), utility vehicles, recreational vehicles, scooters, automobiles, mopeds, straddle-type vehicles and the like. As such, those skilled in the art will recognize that the embodiments disclosed herein can be integrated into a variety of vehicle configurations. It should be appreciated that even though ground-based vehicles are particularly well-suited to implement the embodiments of the present disclosure, airborne vehicles and devices such as aircraft can also implement the embodiments.

Figure 4A:
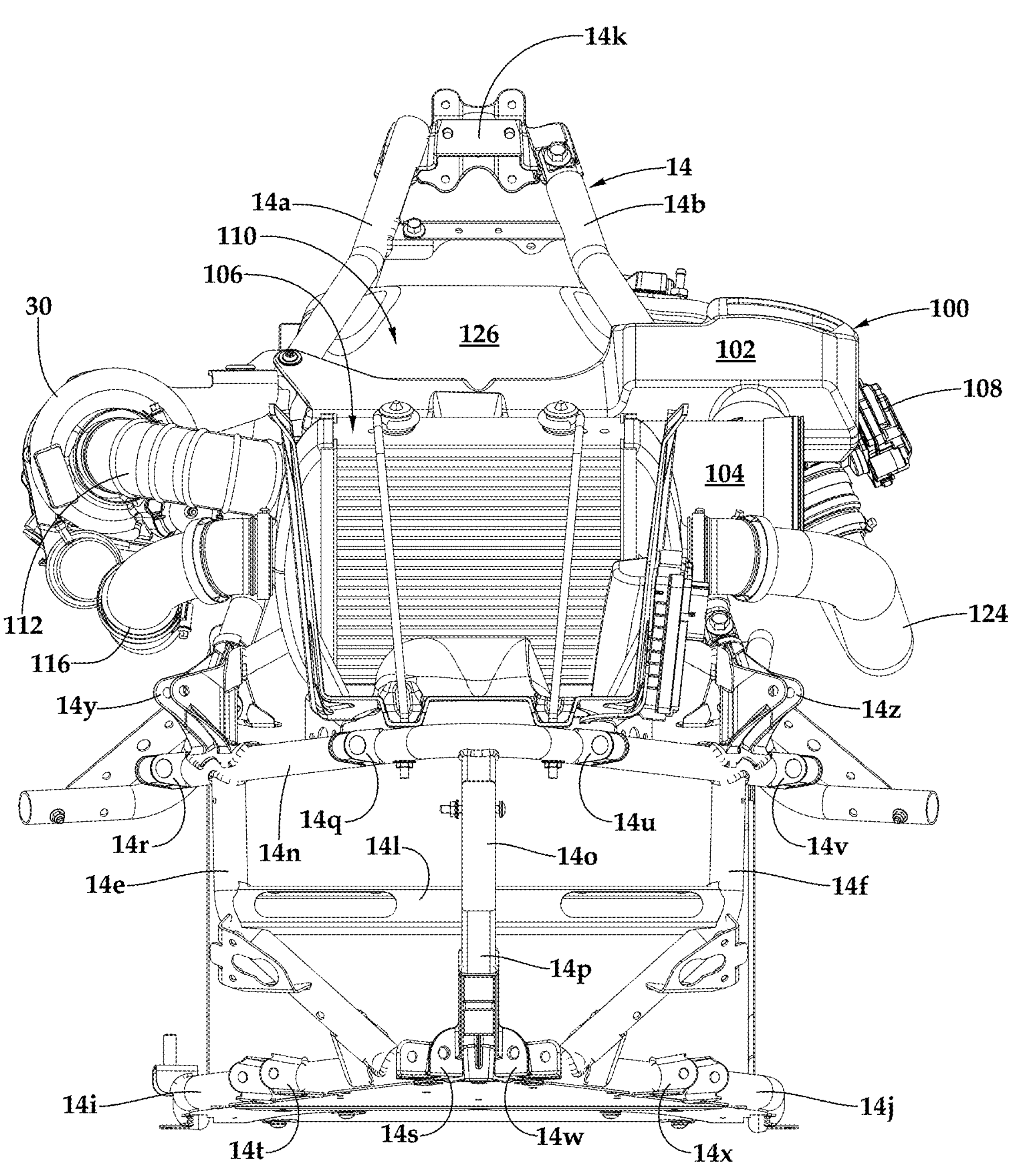
FIGS. 4A-4K are front, side, assembly, cross sectional, exploded and component views of an air intake system for a snowmobile in accordance with embodiments of the present disclosure.
Figure 4B:
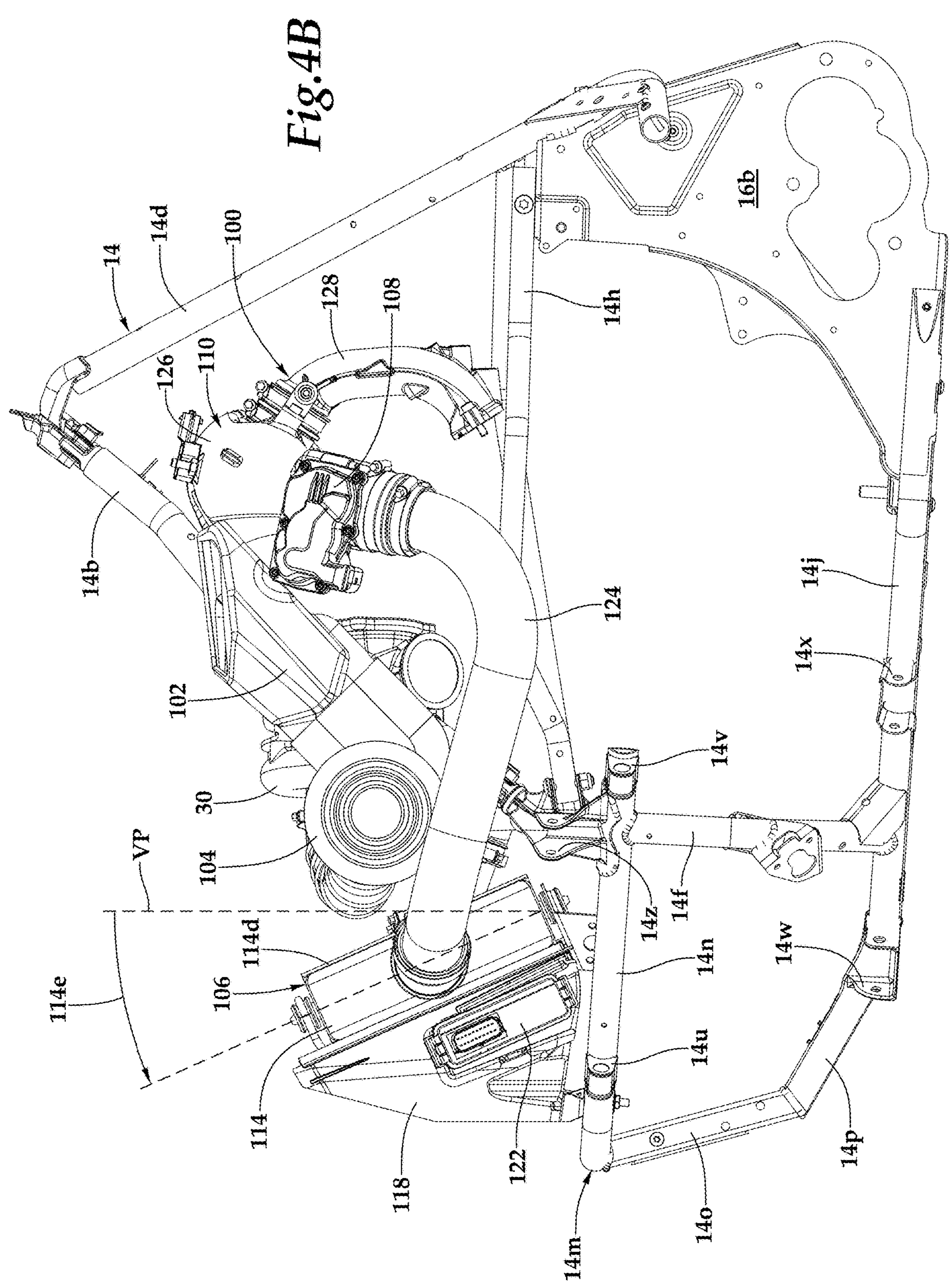
Figure 4C:
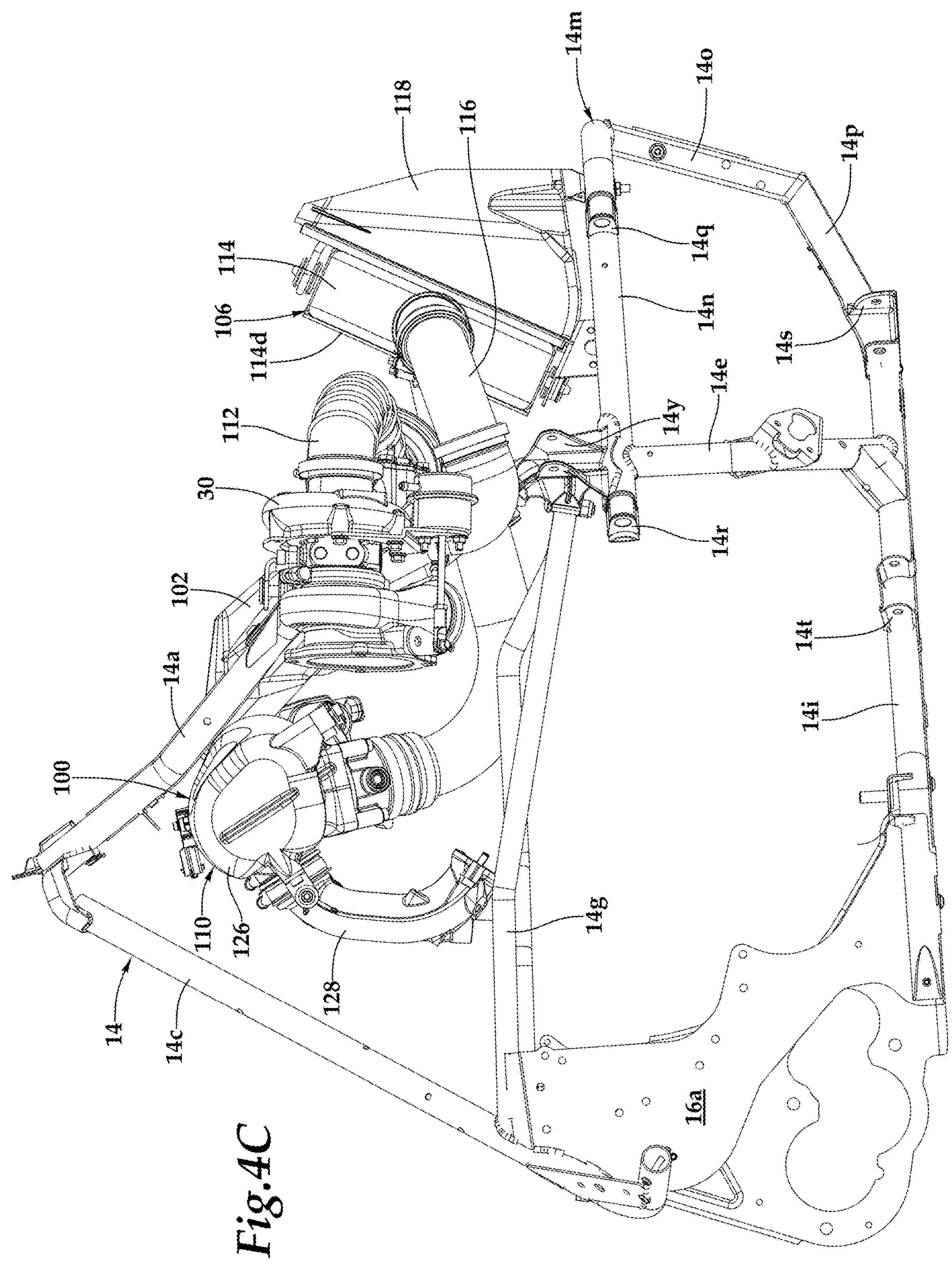
Figure 4D:
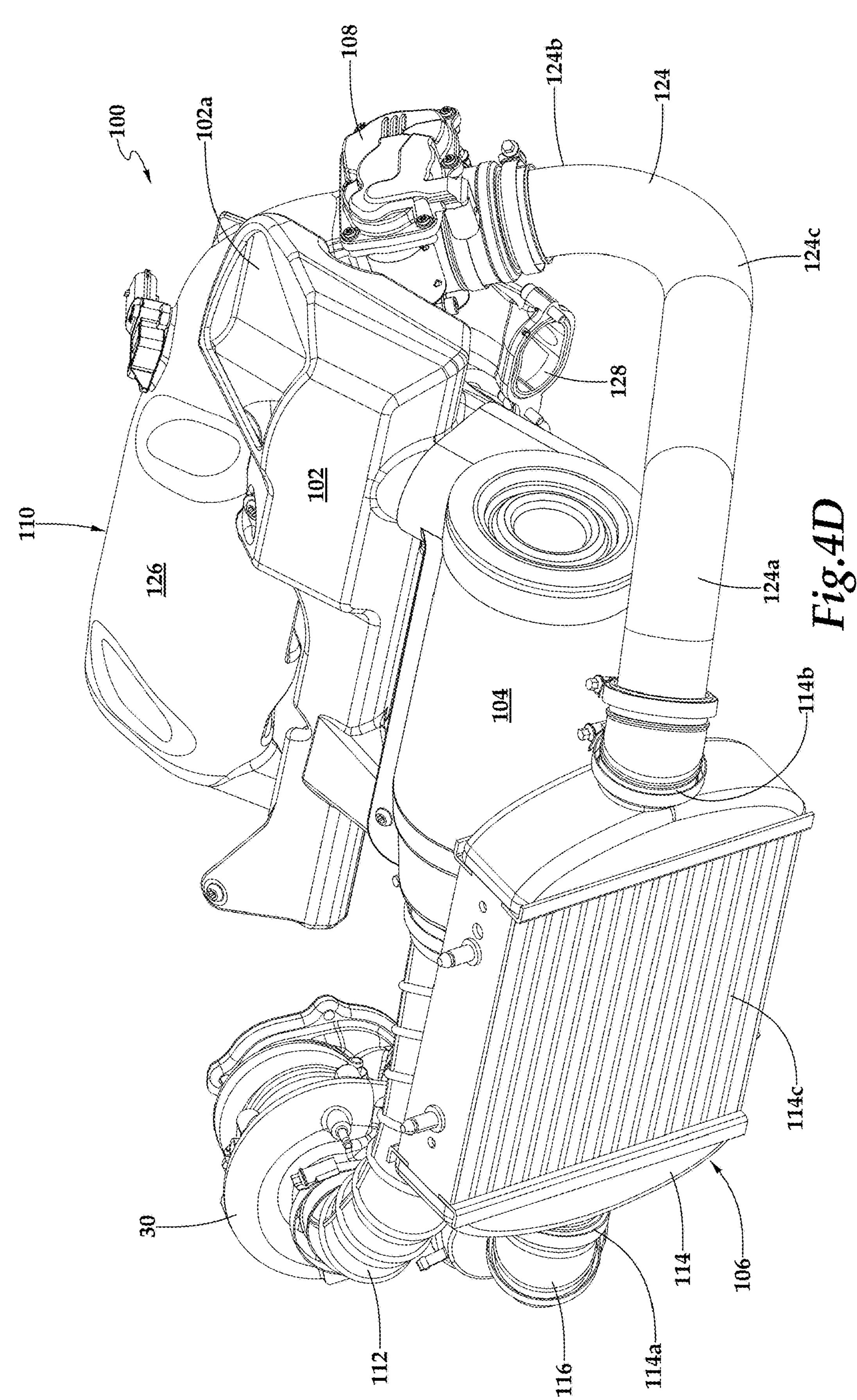
Figure 4E:
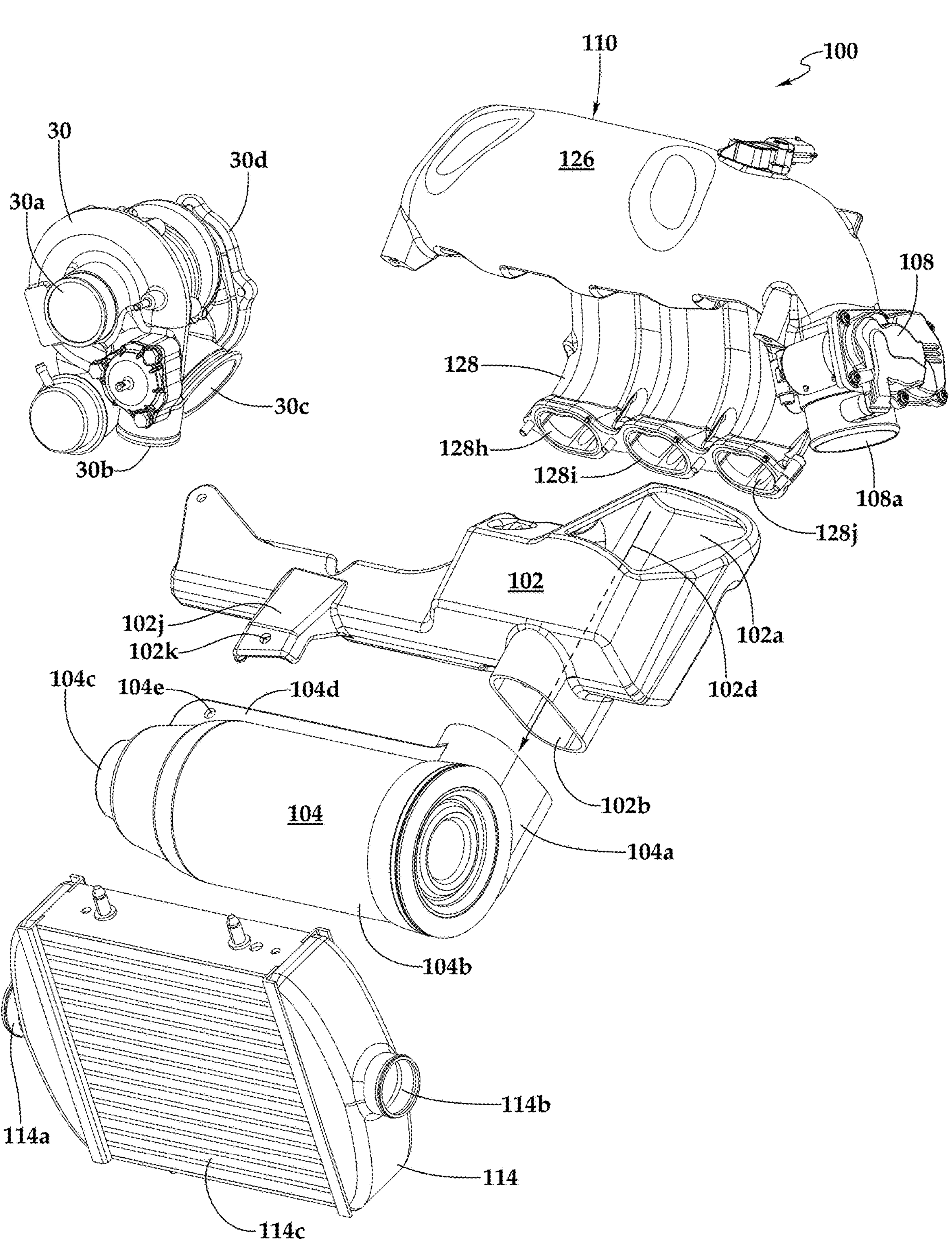

Referring additionally to FIGS. 4A-4J in the drawings, air intake system 100 of snowmobile 10 will be discussed in greater detail. In the illustrated embodiment, air intake system 100 includes an airbox 102, an air filter assembly 104, turbocharger 30, an air cooling system 106, a throttle valve assembly 108 and a manifold assembly 110. As best seen in FIG. 4D, the airflow path for air intake system 100 includes an air inlet 102*a* that configured to receive ambient air for into airbox 102. Air filter assembly 104 is in downstream fluid communication with airbox 102 and is configured to filter the ambient air received from airbox 102. Turbocharger 30 is in downstream fluid communication with air filter assembly 104 and is configured to compress the filtered ambient air received from air filter assembly 104. Air cooling system 106 is in downstream fluid communication with turbocharger 30 and is configured to cool the compressed air from turbocharger 30. Throttle valve assembly 108 is in downstream fluid communication with air cooling system 106 and is configured to regulate airflow. Manifold assembly 110 is in downstream fluid communication with throttle valve assembly 108 and is in upstream fluid communication with of engine 26. It should be understood by those having ordinary skill in the art that the terms "downstream fluid communication" and "upstream fluid communication" describe the position of components relative to the flow direction of a fluid. For example, if component A is in "downstream fluid communication" with component B, the direction of fluid flow is from component B to component A, noting that one or more other components, systems or assemblies may be physically positioned between component A and component B, such as a conduit that provides a flow path for the fluid. Likewise, if component C is in "upstream fluid communication" with component D, the direction of fluid flow is from component C to component D, noting that one or more other components, systems or assemblies may be physically positioned between component C and component D.

Figure 4F:
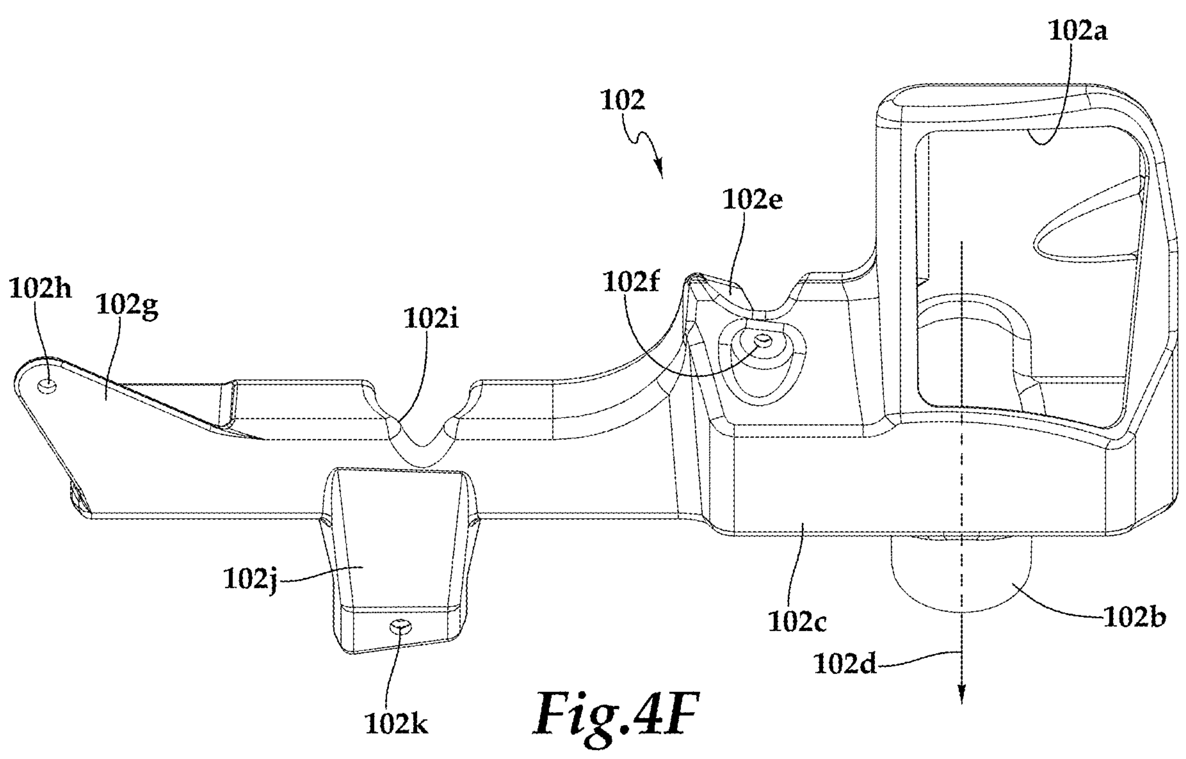
Figure 4G:
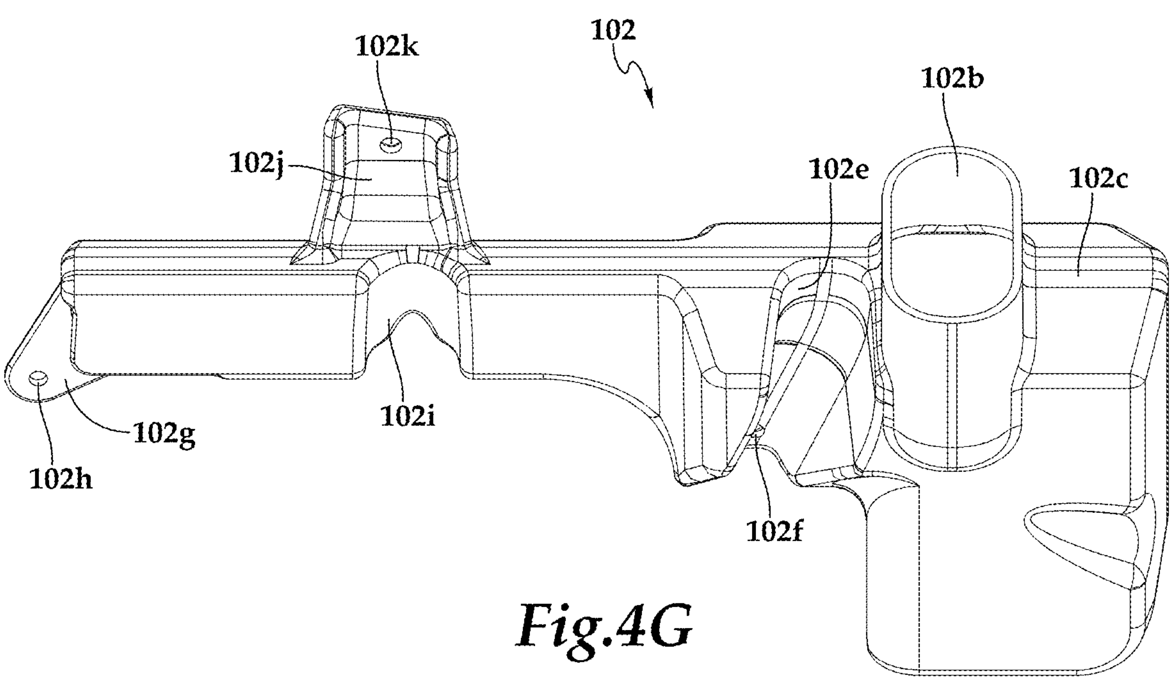

As best seen in FIGS. 4F-4G, airbox 102 includes air inlet 102*a* which is aligned with and interfaces with an air draw opening 20*a* of body 20 (see also FIG. 1D). Air inlet 102 is the location through which all ambient air enters air intake system 100. Airbox 102 includes air outlet 102*b* that is at least partially aligned with and, in the illustrated embodiment, fully aligned with air inlet 102*a* such that air has a direct path through body 102*c* of airbox 102, as indicated by airflow arrow 102*d*. In other embodiments, the air inlet and the air outlet of an airbox for a snowmobile may be offset from one another, see for example, the airbox in FIGS. 2D-2E. Airbox 102 is coupled to a forward side of forward frame assembly 14 such that at least a portion of airbox 102 is positioned outside of engine bay 26*a* and such that airbox 102 is positioned above and forward of at least a portion of engine 26. On an underside thereof, airbox 102 has a spar groove 102*e* that is configured to receive left-forward spar 14*b* therein such that a fastener extending through aperture 102*f* may be used to couple airbox 102 to left-forward spar 14*b*. Airbox 102 includes a flange 102*g* that is configured to be positioned on right-forward spar 14*a* such that a fastener extending through aperture 102*h* may be used to couple airbox 102 to right-forward spar 14*a*. To provide suitable passage for steering column 50*b*, the underside of airbox 102 has a steering column groove 102*i* that is configured to receive steering column 50*b* therein. Steering column groove 102*i* is positioned between spar groove 102*e* and flange 102*g*. In the illustrated embodiment, airbox 102 is positioned forward of intake ports 26*h*, 26*i*, 26*j* of engine 26. In addition, at least a portion of airbox 102 is positioned forward of exhaust ports 26*k*, 26*l*, 26*m* of engine 26. Also, airbox 102 positioned aft of shock mounts 14*y*, 14*z*.

Air outlet 102*b* of airbox 102 is ductlessly coupled to an air inlet 104*a* of air filter assembly 104. Air inlet 104*a* of air filter assembly 104 is at least partially aligned with and, in the illustrated embodiment, fully aligned with air inlet 102*a* of airbox 102 such that air has a direct path from air inlet 102*a* to air inlet 104*a* through body 102*c* of airbox 102, as indicated by airflow arrow 102*d* in FIG. 4E. In other embodiments, the air inlet of an airbox and the inlet of an air filter assembly for a snowmobile may be offset from one another, see for example, the airbox and the air filter assembly in FIGS. 2D-2E. Air filter assembly 104 includes a filter housing 104*b* and an air outlet 104*c*. Filter housing 104*b* contains an air filter therein such as a paper filter or other suitable filter type that is configured to remove dirt and debris from the ambient air. In addition to the ductlessly coupled between air outlet 102*b* of airbox 102 and air inlet 104*a* of air filter assembly 104, filter housing 104*b* has a flange 104*d* that extends therefrom that is configured to be positioned on a forwardly extending brace 102*j* of airbox 102 such that a fastener extending through aperture 104*e* of flange 104*d* and aperture 102*k* of brace 102*j* may be used to couple air filter assembly 104 to airbox 102. In the illustrated embodiment, air inlet 104*a* of air filter assembly 104 is positioned forward of and below air inlet 102*a* of airbox 102. In addition, air filter assembly 104 is positioned forward of engine bay 26.

Air outlet 104*c* of air filter assembly 104 is coupled to an air inlet 30*a* of turbocharger 30 with a flexible conduit 112. The upstream end of flexible conduit 112 is coupled to air outlet 104*c* of air filter assembly 104 using one or more hose clamps or other suitable connection means. Likewise, the downstream end of flexible conduit 112 is coupled to air inlet 30*a* of turbocharger 30 using one or more hose clamps or other suitable connection means. Flexible conduit 112 not only provides a conduit for filter air to travel from air filter assembly 104 to turbocharger 30, but also inhibits vibrations from engine 26 and/or forward frame assembly 14 from being transferred to turbocharger 30 from air filter assembly 104, thereby isolating turbocharger 30 from such vibrations along this portion of the air path. In other embodiments, the vibration isolation functionality may be provided using vibration isolation couplings positioned at the connection point between air filter assembly 104 and a flexible or rigid conduit and/or at the connection point between a flexible or rigid conduit and turbocharger 30. In operation, turbocharger 30 receives exhaust gases exiting engine 26 that drive a turbine which in turn drives a compressor used to compress the filtered ambient air received from air filter assembly 104. It should be noted that operating engine 26 with a forced induction system, such as turbocharger 30, rather than as a naturally aspirated engine, results in a more efficient and more powerful combustion process, thereby improving the performance and efficiency of engine 26. In the illustrated embodiment, turbocharger 30 is positioned outboard of engine bay 26*a* on the right side of engine 26.

As turbocharger 30 compresses the filtered ambient air, temperature of the air increases. In the illustrated embodiment, the heated compressed air from turbocharger 30 is then routed to air cooling system 106 that cools the heated compressed air which results in an increase in the density of the compressed air, thereby allowing more oxygen molecules to enter the combustion chamber. More specifically, an air outlet 30*b* of turbocharger 30 is coupled to an air inlet 114*a* of an intercooler 114, with a flexible conduit 116. The upstream end of flexible conduit 116 is coupled to air outlet 30*b* of turbocharger 30 using one or more hose clamps or other suitable connection means. Likewise, the downstream end of flexible conduit 116 is coupled to air inlet 114*a* of intercooler 114 using one or more hose clamps or other suitable connection means. Flexible conduit 116 not only provides a conduit for compressed air to travel from turbocharger 30 to intercooler 114, but also inhibits vibrations from engine 26 and/or forward frame assembly 14 from being transferred to turbocharger 30 from intercooler 114, thereby isolating turbocharger 30 from such vibrations along this portion of the air path. In other embodiments, the vibration isolation functionality may be provided using vibration isolation couplings positioned at the connection point between turbocharger 30 and a flexible or rigid conduit and/or at the connection point between a flexible or rigid conduit and intercooler 114.

Figures 4H, 4I, 4J:
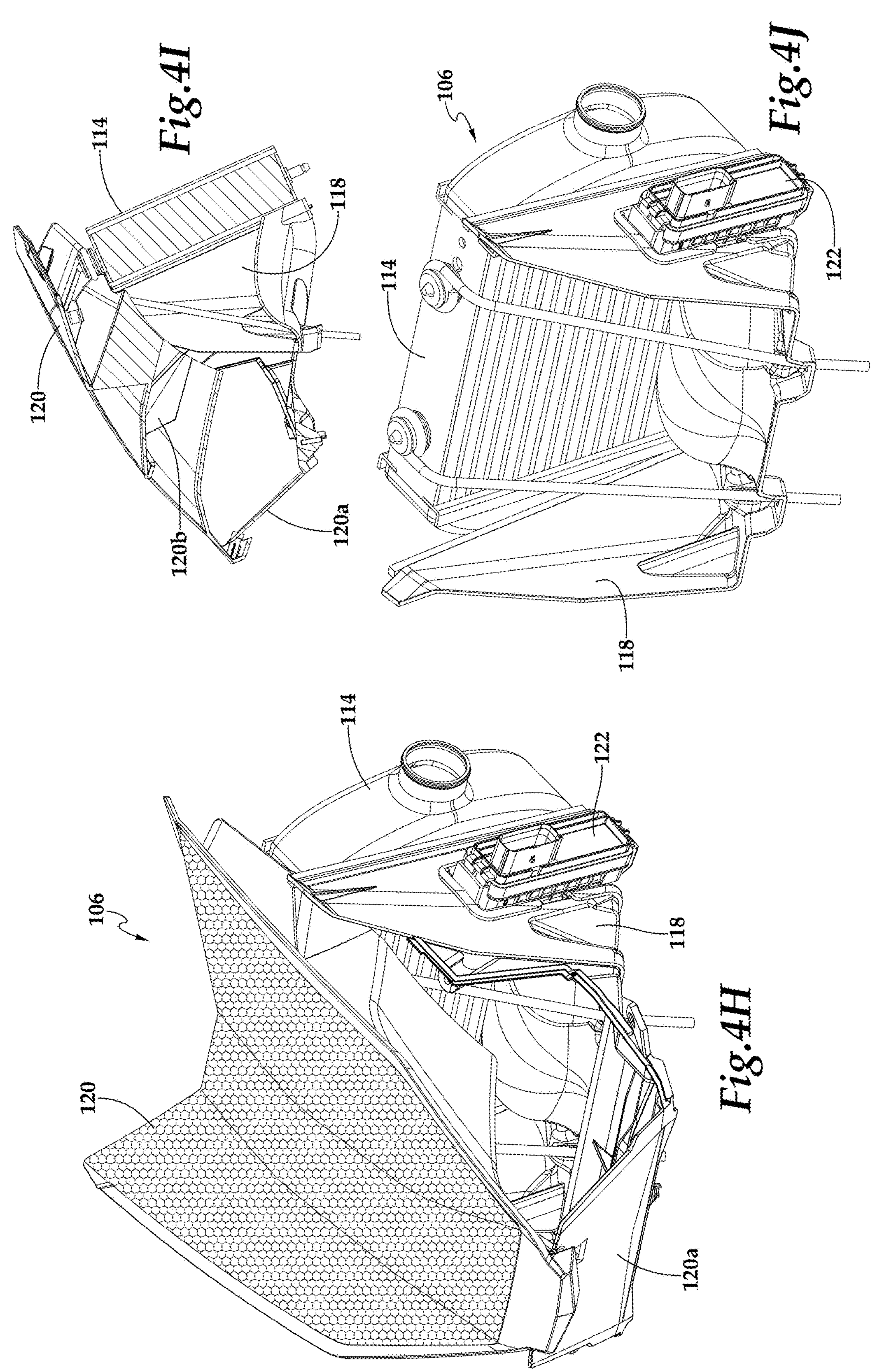
Figure 4K:
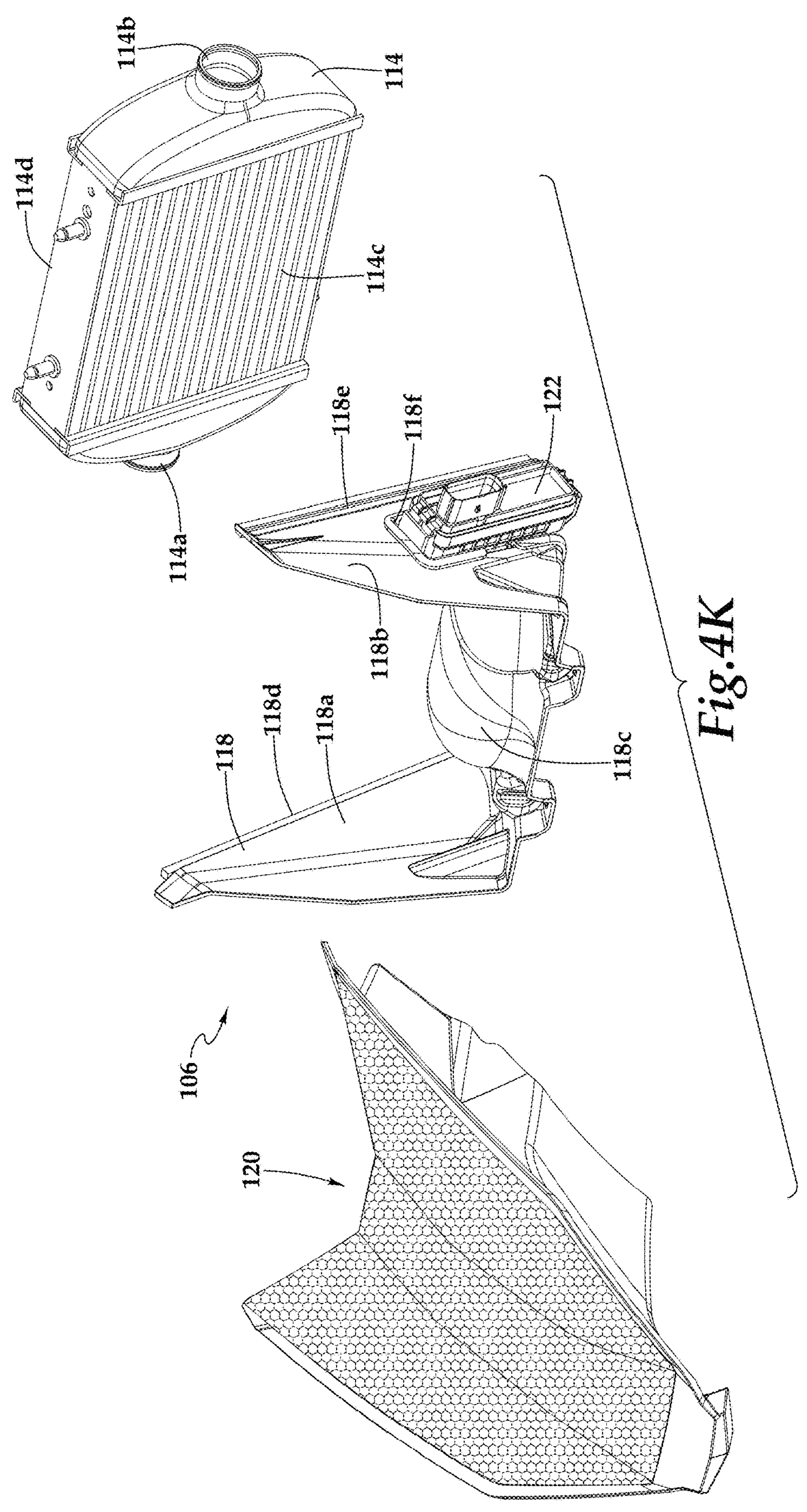

As best seen FIGS. 4H-4J, in addition to intercooler 114, air cooling system 106 includes an air channel 118 and an air grill 120. Air channel 118 has a pair of oppositely disposed side walls 118*a*, 118*b* and a lower wall 118*c* that together direct ambient ram air into intercooler 114 such that heat transfers from the compressed air in intercooler 114 to the ambient ram air passing through intercooler 114 from the front side 114*c* to the aft side 114*d* of intercooler 114 such that intercooler 114 operations as an air-to-air heat exchanger. The air discharged from the aft side 114*d* of intercooler 114 provides additional cooling functionality as it enters engine bay 26*a* and passes over exhaust manifold 202 (see also FIG. 5A). As detailed in FIG. 4B, side walls 118*a*, 118*b* are substantially vertically oriented and are substantially parallel with each other. In addition, side walls 118*a*, 118*b* extend above the top of intercooler 114. In the illustrated embodiment, intercooler 114 is tilted forward by a forward tilt angle 114*e* relative to a vertical plane VP such that an upper portion of intercooler 114 is forward of a lower portion of intercooler 114. Likewise, side walls 118*a*, 118*b* respectively have aft surfaces 118*d*, 118*e* that are tilted forward by the forward tilt angle such that upper portions of aft surfaces 118*d*, 118*e* are forward of lower portions of aft surfaces 118*d*, 118*e*. The corresponding forward tilt orientation of side walls 118*a*, 118*b* relative to intercooler 114, enable side walls 118*a*, 118*b* to direct the ambient ram air into front side 114*c* of intercooler 114 with minimal leakage.

In the illustrated embodiment, lower wall 118*c* of air channel 118 has a contoured surface that is configured to accommodate a snowmobile component such as electronic steering assist unit 58. In addition, side wall 118*b* includes an opening 118*f* that is configured to receive and support a snowmobile component therein depicted as an electronic component 122 such as a controller for front suspension assembly 56. Air channel 118 may be formed from a polymeric material using, for example, an injection molding process. Intercooler 114 and air channel 118 are positioned above and coupled to nose rail 14*n*. In this location, intercooler 114 and air channel 118 are positioned forward of engine bay 26*a* and forward of turbocharger 30. Air grill 120 is positioned at least partially forward and at least partially above intercooler 114 and air channel 118. Air grill 120 is received within an opening in body 20 of snowmobile 10 and located between headlight assembly 78 and front bumper 64. Air grill 120 is coupled to forward frame assembly 14 using a support bracket 120*a*. Air grill 120 has a plurality of veins 120*b* that are configured to direct the ambient ram air aftwardly and downwardly into air channel 118 and toward front side 114*c* of intercooler 114. Air grill 120 may be formed from a polymeric material using, for example, an injection molding process.

The cooled compressed air from intercooler 114 is then routed to throttle valve assembly 108. More specifically, an air outlet 114*b* of intercooler 114 is coupled to an air inlet 108*a* of throttle valve assembly 108 with a compressed air duct 124. The upstream end of compressed air duct 124 is coupled to air outlet 114*b* of intercooler 114 using one or more hose clamps or other suitable connection means. Likewise, the downstream end of compressed air duct 124 is coupled to air inlet 108*a* of throttle valve assembly 108 using one or more hose clamps or other suitable connection means. Throttle valve assembly 108 includes a valve such as a butterfly valve that opens and closes to control the movement of compressed air therethrough in response to operation of the throttle input by the driver. In the illustrated embodiment, a throttle-by-wire design is used in which an engine control unit 130 (see also FIG. 6A-6D) communicates throttle commands to throttle valve assembly 108, with engine control unit 130 controlling or modulating the throttle signal based on a set of operational parameters. In addition to throttle control, engine control unit 130 controls a variety of other engine operations including fuel delivery to engine 26 from fuel tank 62 via a fuel pump and fuel rail. In the illustrated embodiment, engine control unit 130 is coupled to an aft surface of expansion tank 316 such that at least a portion of engine control unit 130 is inboard of expansion tank 316, such that at least a portion of engine control unit 130 is outboard of engine bay 26 and such that engine control unit 130 is aft of and on the left side of engine 26. In this location, engine control unit 130 is positioned on the cool side of engine 26 away from the heat associated with exhaust system 200. In addition, by locating engine control unit 130 close to engine 26, the wiring harness (not shown) for snowmobile 10 is generally centrally located which reduces the overall length and weight of the wiring harness. In the illustrated embodiment, throttle valve assembly 108 is positioned outboard of engine bay 26*a* on the left side of engine 26.

The cooled compressed air from throttle valve assembly 108 enters manifold assembly 110 for routing intake ports 26*h*, 26*i*, 26*j* of engine 26. Manifold assembly 110 includes an air plenum 126 and air runners 128. Air plenum 126 is configured to dampen air flow prior to distribution to the cylinders in engine 26. Air runners 128 are coupled between the downstream side of air plenum 126 and an aft side of engine 26. In the illustrated embodiment, air runners 128 includes three individual air paths and three air outlets 128*h*, 128*i*, 128*j* that respectively deliver compressed air to intake ports 26*h*, 26*i*, 26*j* of engine 26 and thus to the cylinders of engine 26. Fuel for engine 26 is supplied from fuel tank 62 via a fuel rail (not visible) that is coupled to the downstream end of air runners 128 and may include a multi-point fuel injector system that is configured to inject fuel into each cylinder of engine 26 for combustion together with the cooled compressed air. Air plenum 126 may be made from metal, metal alloy, polymeric materials, fiber reinforced polymer composites and/or combinations thereof. Air runners 128 may be formed from the same or a different material as compared to air plenum 126, and may be made from metal, metal alloy, polymeric materials, fiber reinforced polymer composites and/or combinations thereof. In the illustrated embodiment, air plenum 126 and air runner assembly 128 are separate components coupled to one another, although in other embodiments air plenum 126 and air runners 128 may integrally form manifold assembly 110. In the illustrated embodiment, manifold assembly 110 is positioned at least partially within engine bay 26 and is at least partially above and at least partially aft of engine 26. More specifically, air plenum 126 is positioned at least partially within engine bay 26 and above engine 26. Air runners 128 are positioned within engine bay 26 and at least partially above and at least partially aft of engine 26.

An air path followed by the air within air intake system 100 will now be described. The air path sequentially includes a forward and downward portion from airbox 102 to air filter assembly 104, an outboard and aftward portion from air filter assembly 104 to turbocharger 30, a downward, forward and inboard portion from turbocharger 30 to intercooler 106, an outboard, aftward and upward portion from intercooler 106 to throttle valve assembly 108 and an inboard, aftward and downward portion from throttle valve assembly 108 through manifold assembly 110 to engine 26.

In addition to the spatial relationships of the various components of air intake system 100 described above, further spatial relationships will now be described. In the illustrated embodiment, airbox 102 is positioned aft of intercooler 114, aft of air filter assembly 104, at least partially above engine 26, at least partially forward of manifold assembly 110 and at least partially between turbocharger 30 and throttle valve assembly 108. In addition, airbox 102 is positioned at least partially between intercooler 114 and manifold assembly 110. Further, airbox 102 is positioned at least partially between air filter assembly 102 and manifold assembly 110. Air filter assembly 104 is positioned between engine 26 and intercooler 114. In addition, air filter assembly 104 is positioned between turbocharger 30 and throttle valve assembly 108. In the illustrated embodiment, compressed air duct 124 has a forward portion 124*a* that is positioned forward of airbox 102, an aft portion 124*b* that is positioned aft of airbox 102 and an outboard portion 124*c* that is positioned outboard of airbox 102.

Figure 5A:
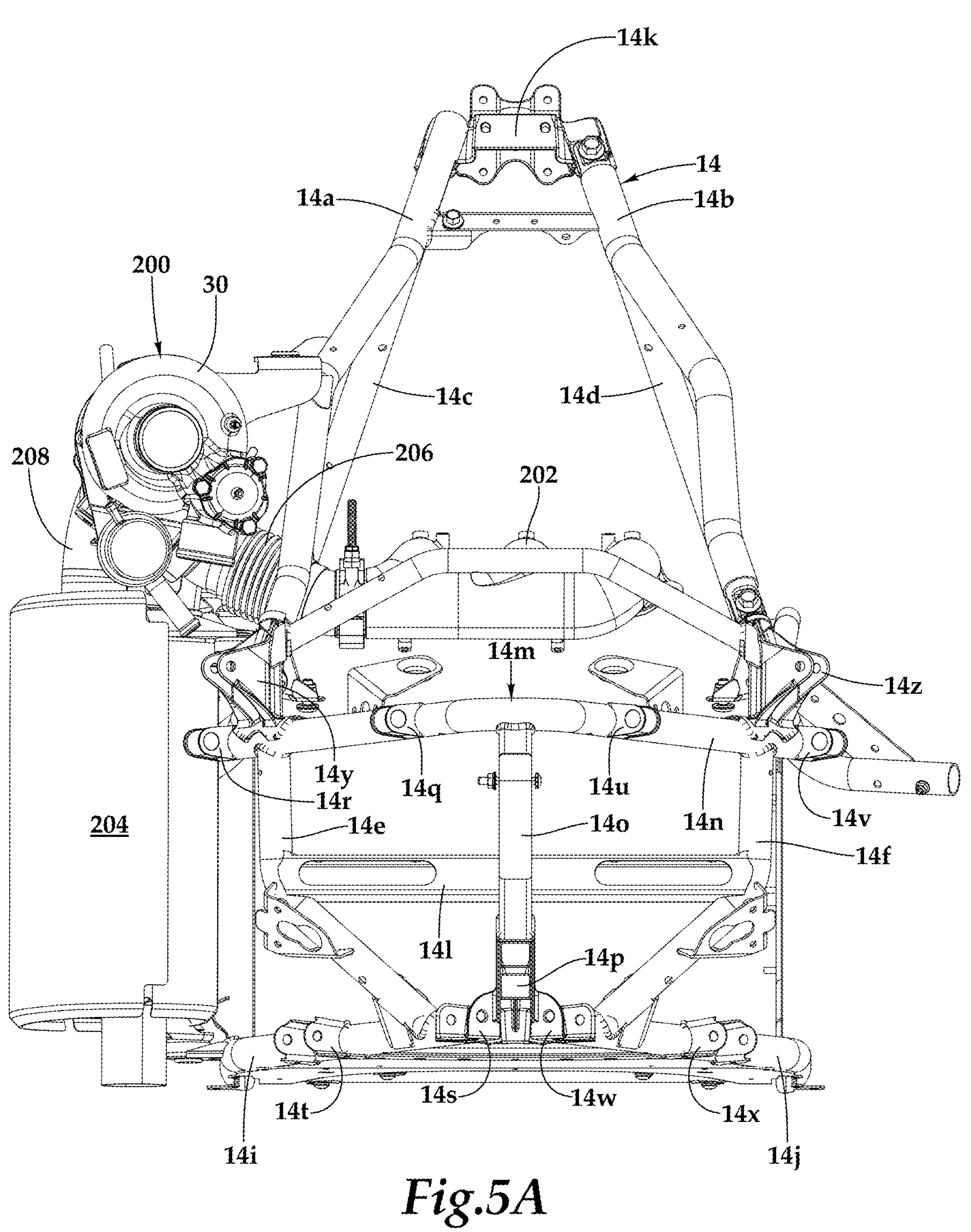
FIGS. 5A-5Q are front, side, assembly, exploded and component views of an exhaust system for a snowmobile in accordance with embodiments of the present disclosure.
Figure 5B:
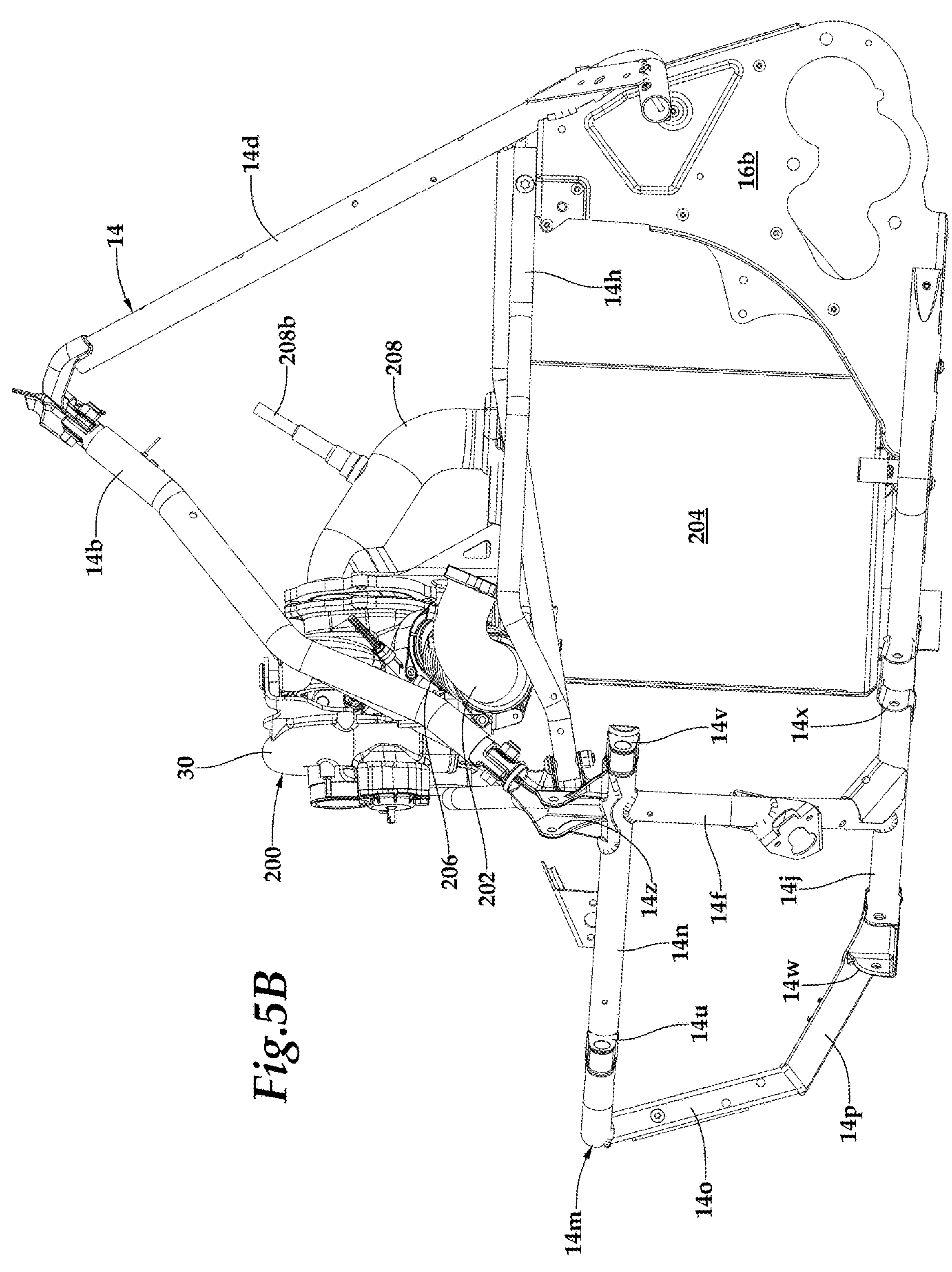
Figure 5C:
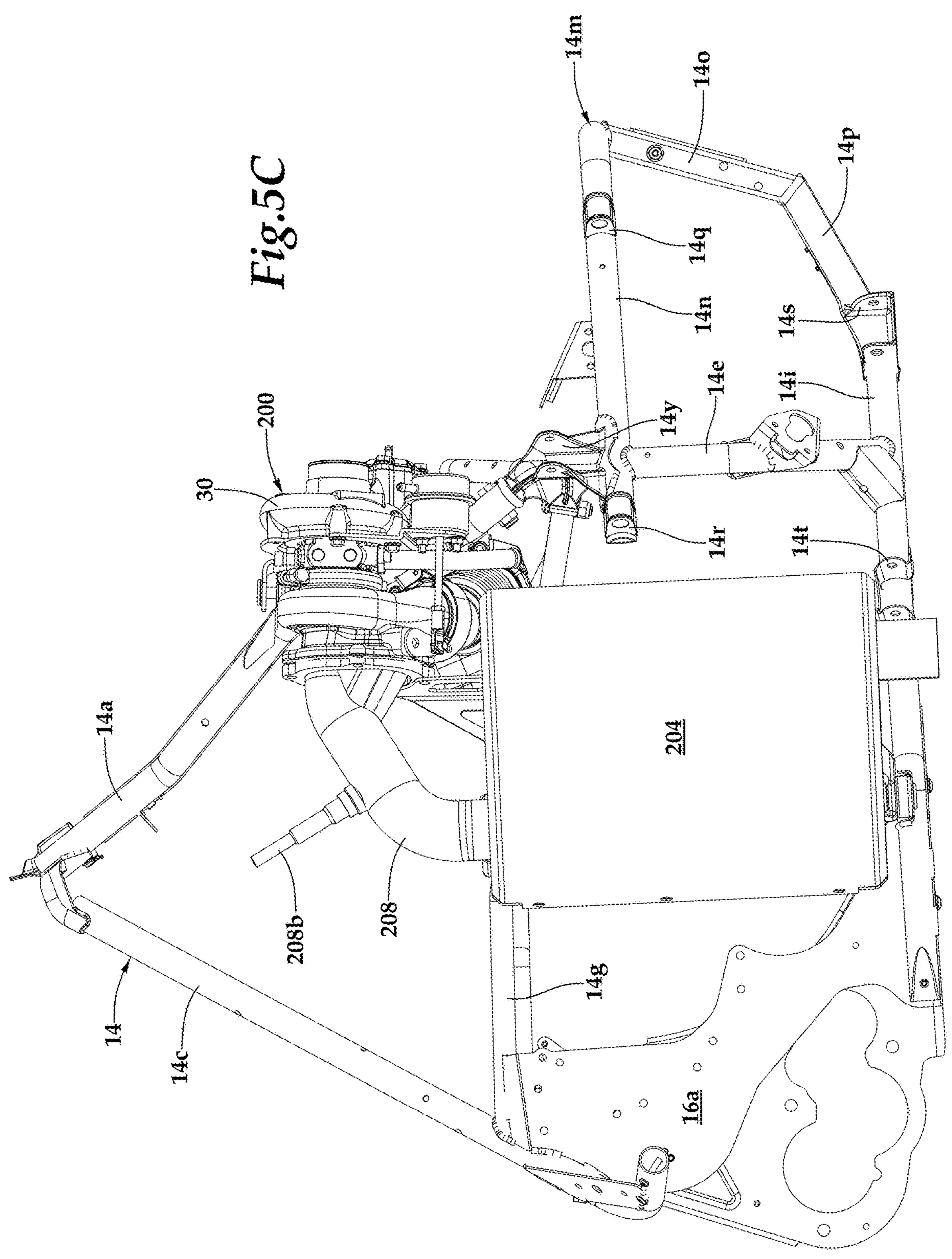
Figure 5D:
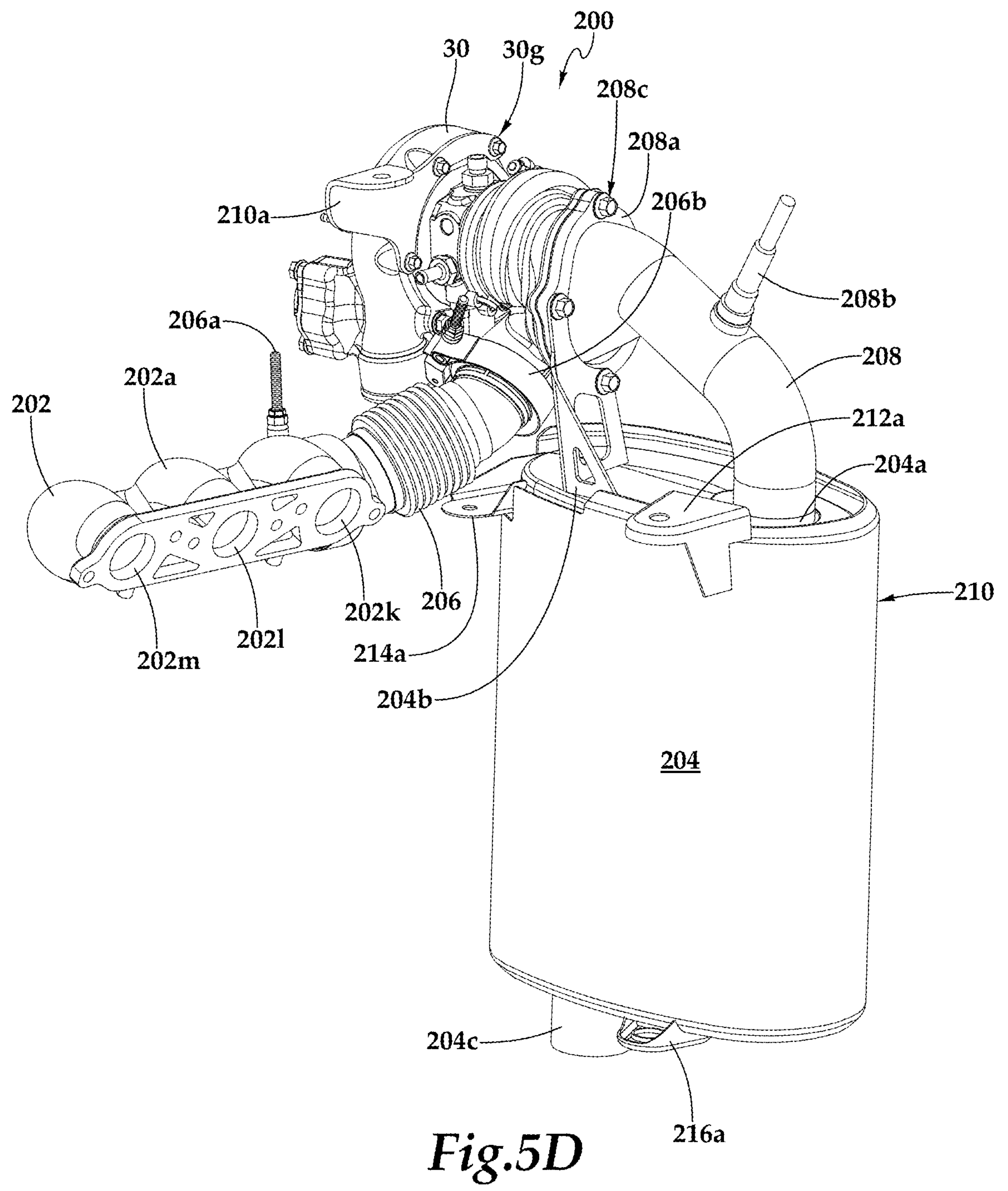
Figure 5E:
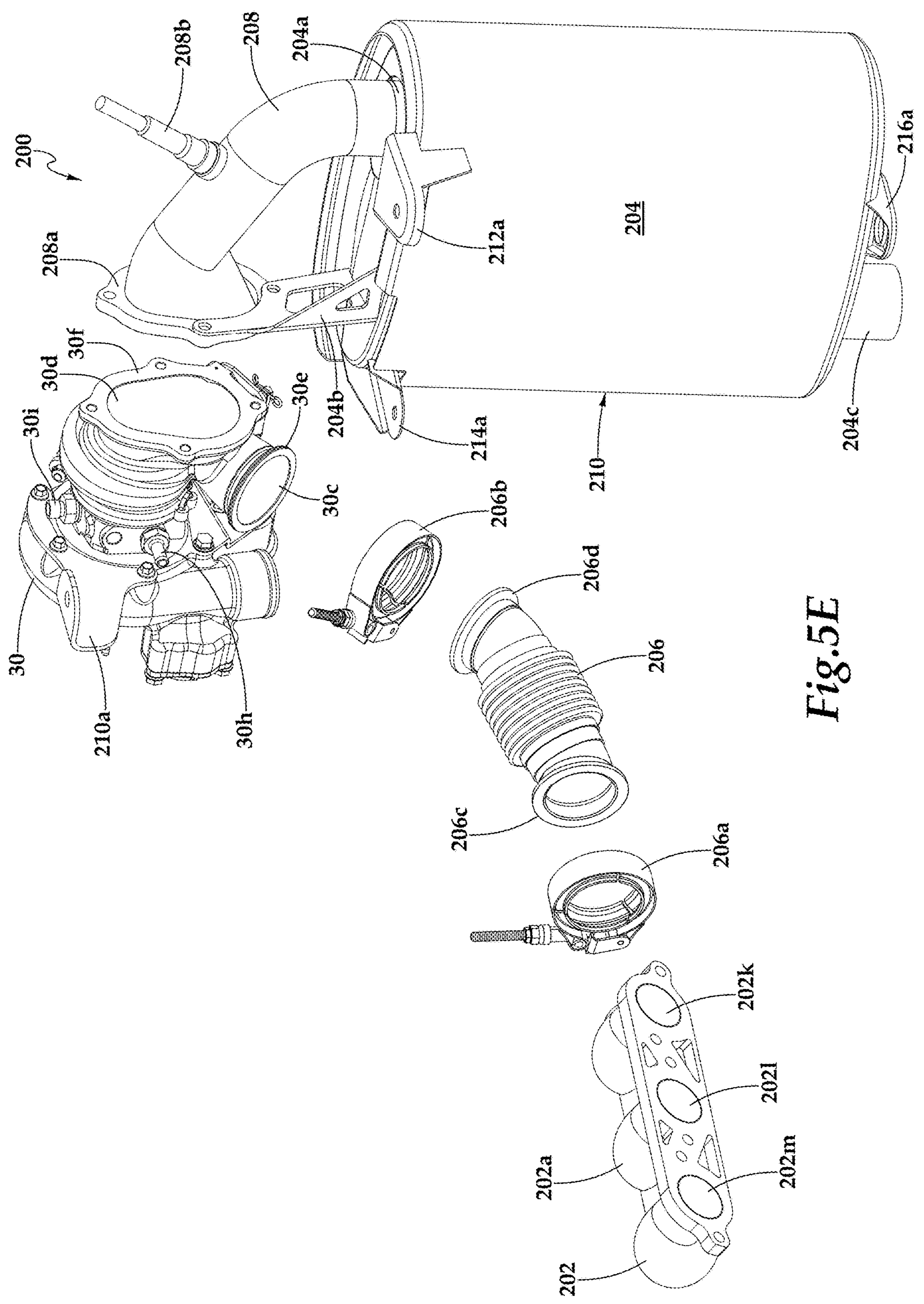
Figure 5F:
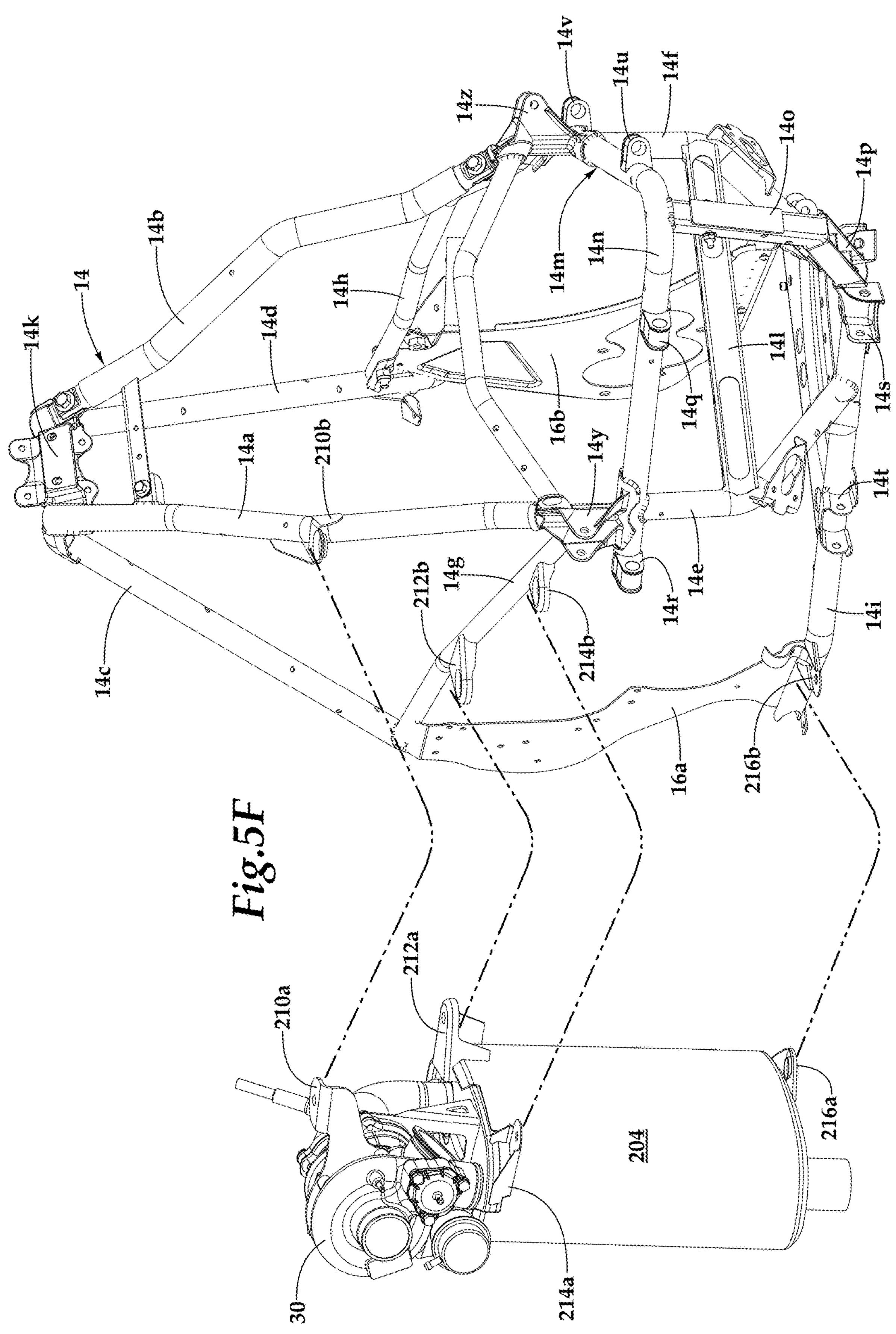
Figures 5G, 5H, 5I, 5J:
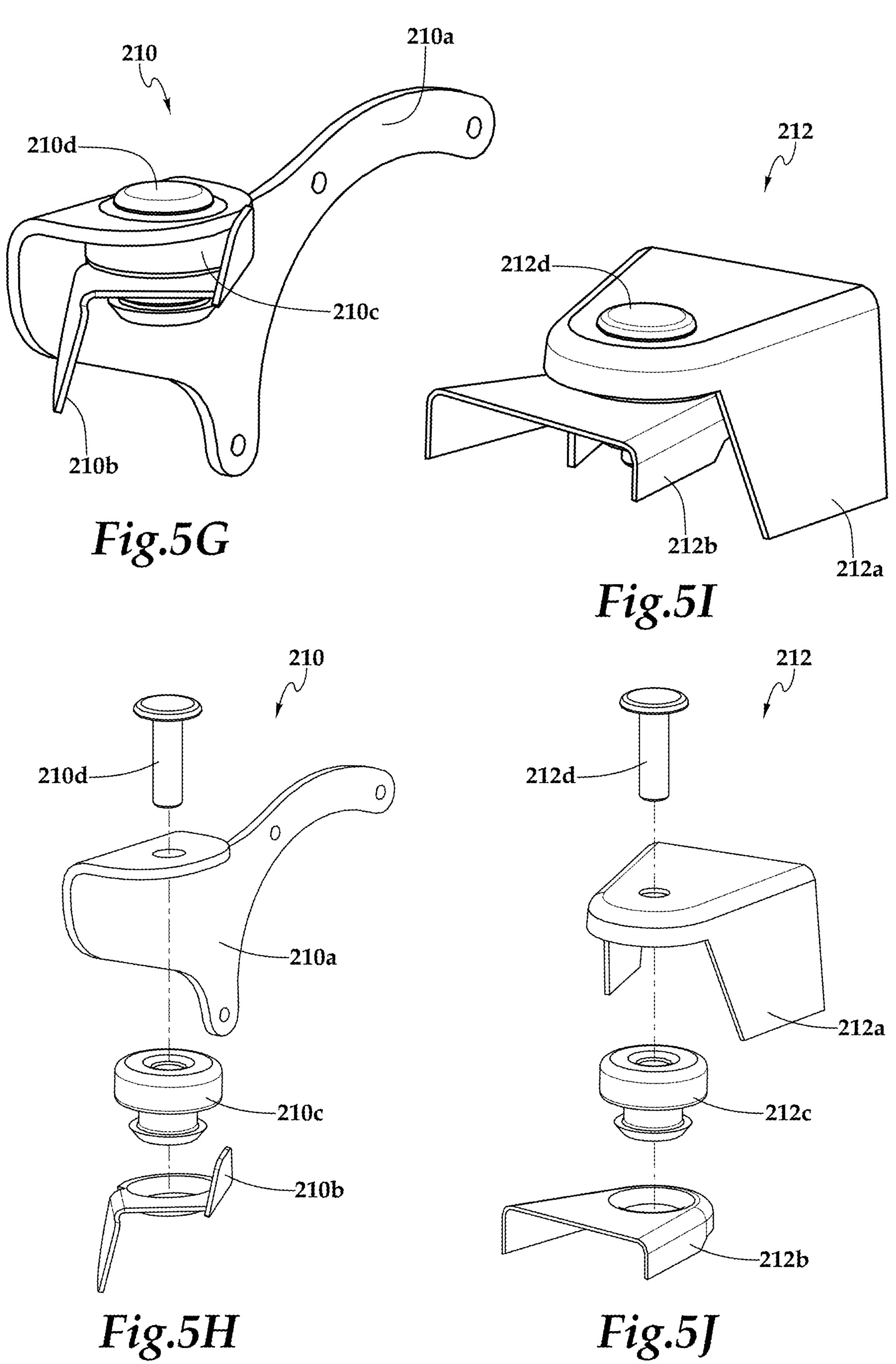
Figure 5K:
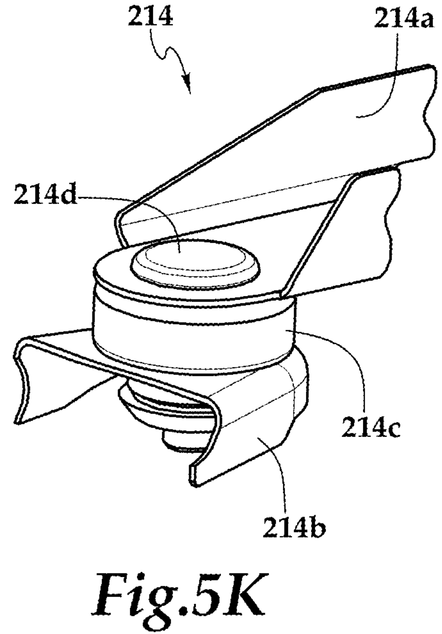
Figure 5M:
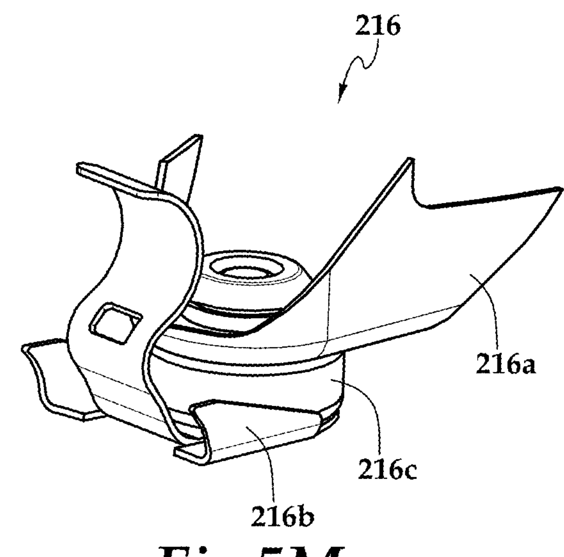
Figure 5L:
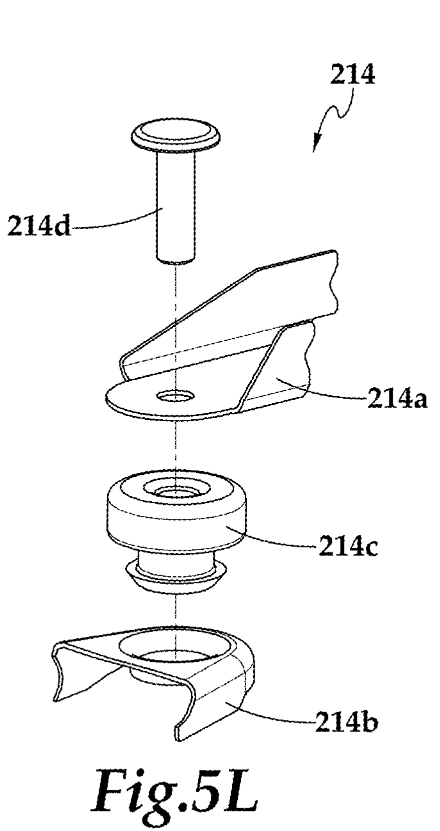
Figure 5N:
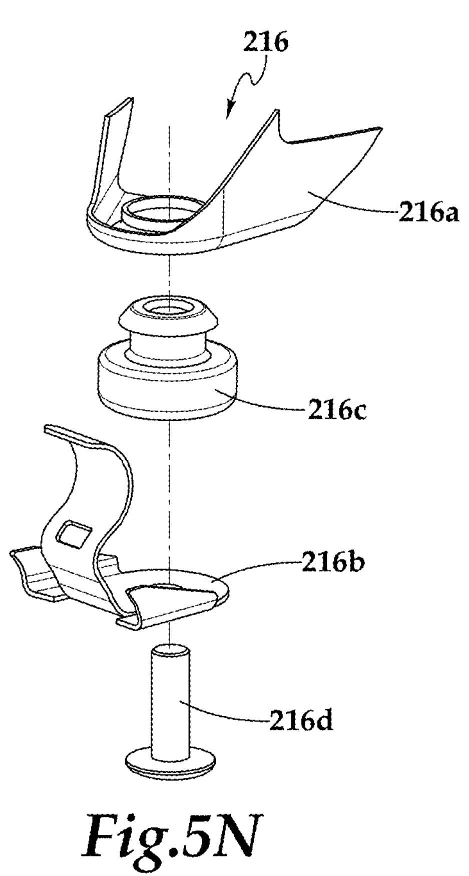

Referring now to FIGS. 5A-5N in the drawings, exhaust system 200 of snowmobile 10 will be discussed in greater detail. In the illustrated embodiment, exhaust system 200 includes an exhaust manifold 202, turbocharger 30 and a muffler 204. As best seen in FIG. 5D-5E, the exhaust flow path for exhaust system 200 includes a plurality of exhaust inlets 202*k*, 202*l*, 202*m* of exhaust manifold 202 that correspond to exhaust ports 26*k*, 26*l*, 26*m* located on the forward side of engine 26 (see also FIG. 3A). Exhaust manifold 202 includes a body 202*a* in which the exhaust gases entering exhaust manifold 202 from exhaust inlets 202*k*, 202*l*, 202*m* are allowed to mix. As best seem in FIGS. 5O-5Q, exhaust manifold 202 includes an exhaust outlet 202*b* which is in upstream fluid communicating with an exhaust inlet 30*c* of turbocharger 30. More specifically, exhaust outlet 202*b* of exhaust manifold 202 is coupled to exhaust inlet 30*c* of turbocharger 30 with a flexible exhaust conduit 206. The upstream end of flexible exhaust conduit 206 is coupled to exhaust outlet 202*b* of exhaust manifold 202 using a V-band clamp 206*a* or other suitable connection means. Likewise, the downstream end of flexible exhaust conduit 206 is coupled to exhaust inlet 30*c* of turbocharger 30 using a V-band clamp 206*b* or other suitable connection means. Flexible exhaust conduit 206 not only provides a path for exhaust gases to travel from exhaust manifold 202 to turbocharger 30, but also inhibits vibrations from engine 26 to be transferred to turbocharger 30, thereby isolating turbocharger 30 from such vibrations along the exhaust flow path. In other embodiments, the vibration isolation functionality may be provided using vibration isolation couplings positioned at the connection point between exhaust manifold 202 and a flexible or rigid conduit and/or at the connection point between a flexible or rigid conduit and turbocharger 30.

Figure 5O:
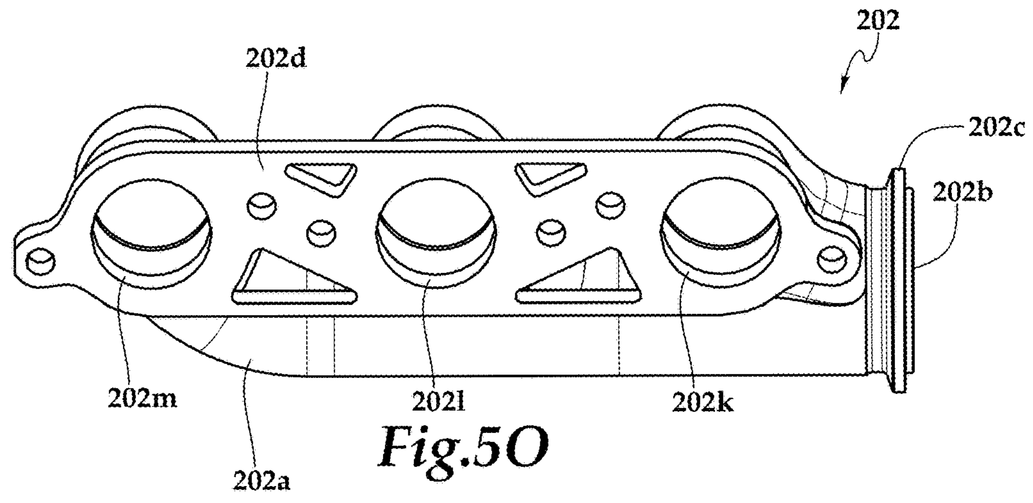
Figure 5P:
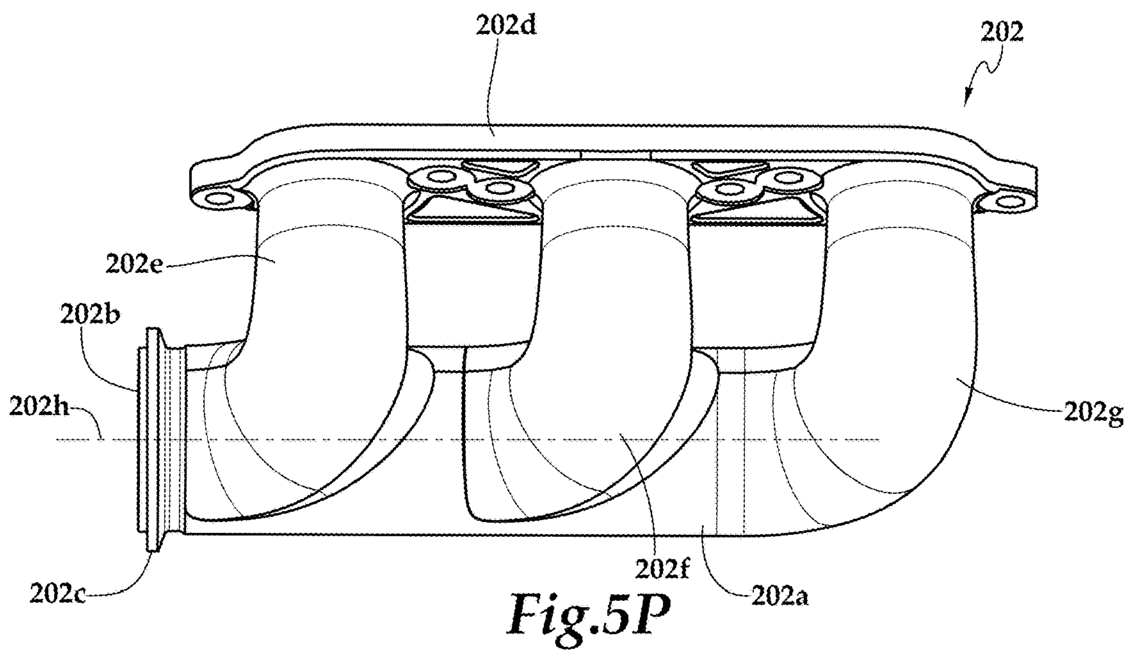
Figure 5Q:
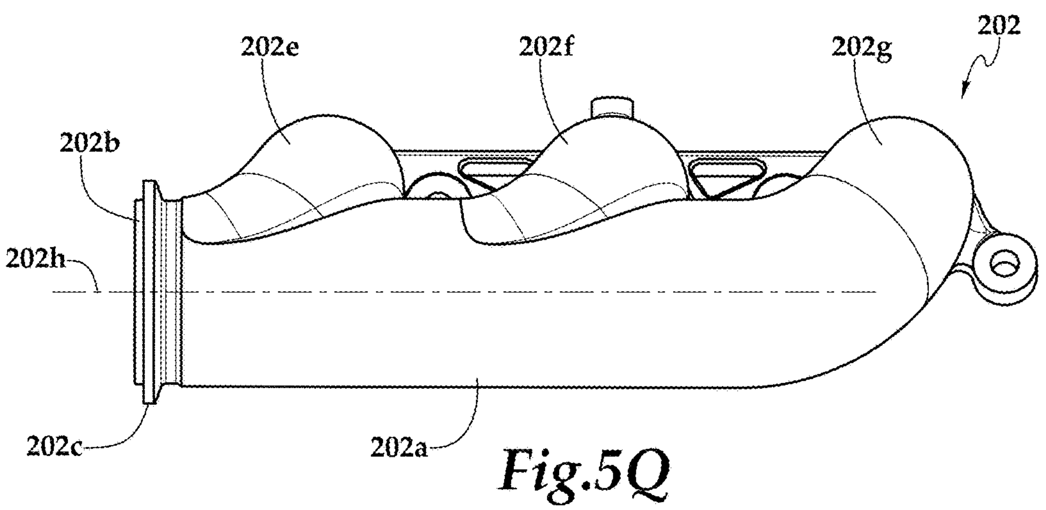

In the illustrated embodiment, V-band clamps 206*a*, 206*b* provide high-strength couplings that ensure strong and leak-free seals between exhaust manifold 202, flexible exhaust conduit 206 and turbocharger 30. For example, as best seen in FIG. 5E, V-band clamp 206*a* includes an internal V-shaped groove that fits around a flange 202*c* (see also FIGS. 5O-5Q) of exhaust outlet 202*b* and a flange 206*c* of flexible exhaust conduit 206. Likewise, V-band clamp 206*b* includes an internal V-shaped groove that fits around a flange 206*d* of flexible exhaust conduit 206 and a flange 30*e* of exhaust inlet 30*c*. V-band clamps 206*a*, 206*b* provide an efficient and secure way to connect flanged joints, particularly in high-temperature, high-pressure applications such exhaust system 200. In other embodiments, a flexible exhaust conduit could be welded to exhaust outlet 202*b* of exhaust manifold 202 or to exhaust inlet 30*c* of turbocharger 30 with the coupling on the other end being formed, for example, by a V-band clamp. In further embodiments, an exhaust conduit may be routed from exhaust outlet 202*b* of exhaust manifold 202 directly to a muffler with the exhaust conduit coupled to exhaust outlet 202*b* of exhaust manifold 202 using one or more hose clamps when exhaust manifold 202 is being used with a naturally aspirated internal combustion implementation of engine 26 such as the exhaust system described in commonly owned U.S. patent application Ser. No. 18/745,703, filed Jun. 17, 2024, the entire contents of which are incorporated by reference herein for all purposes. As best seen in FIGS. 5O-5Q, exhaust manifold 202 includes a flange 202*d* that has a bolt pattern that matches a socket pattern on the forward side of engine 26 such that exhaust manifold 202 may be bolted on engine 26. Exhaust manifold 202 includes three branches 202*e*, 202*f*, 202*g* that respectively communicate exhaust gases entering exhaust manifold 202 via exhaust inlets 202*k*, 202*l*, 202*m* to body 202*a* of exhaust manifold 202. In the illustrated embodiment, body 202*a* of exhaust manifold 202 extends substantially in the lateral direction of snowmobile 10 along an axis 202*h* which is located at or near the center of exhaust outlet 202*b*. In this configuration, exhaust gases have a straight path from body 202*a* through exhaust outlet 202*b*.

As discussed herein, turbocharger 30 uses the exhaust gases exiting engine 26 to drive a turbine which in turn drives a compressor used to compress the filtered ambient air received by turbocharger 30 from air filter assembly 104. The exhaust gases exit turbocharger 30 at exhaust outlet 30*d* which is in upstream fluid communicating with an exhaust inlet 204*a* of muffler 204. More specifically, exhaust outlet 30*d* of turbocharger 30 is coupled to exhaust inlet 204*a* of muffler 204 with an exhaust conduit 208. The upstream end of an exhaust conduit 208 includes a flange 208*a* that is coupled to a flange 30*f* surrounding exhaust outlet 30*d* of turbocharger 30 using a plurality of bolts that are generally designated 208*c*. The downstream end of exhaust conduit 208 is welded to exhaust inlet 204*a* of muffler 204. This forms a rigid connection between turbocharger 30 and muffler 204. In the illustrated embodiment, exhaust conduit 208 includes an oxygen sensor 208*b* that monitors the oxygen content of the exhaust gases passing therethrough. To further enhance the rigid connection between turbocharger 30 and muffler 204, a brace 204*b* in the form of an angle iron is welded at its lower end to an upper surface of muffler 204 and is welded at its upper end to flange 208*a* such that muffler 204, exhaust conduit 208 and brace 204*b* form a weldment 210. Muffler 204 discharges the exhaust gases via exhaust outlet 204*c*.

Previous turbochargers have been rigidly or hard mounted to the forward frame assembly of a snowmobile, causing vibrations emanating from the engine to be transferred to the turbocharger. To prevent such vibrations from impacting the longevity of the coupling between the turbocharger and the muffler, a flexible exhaust conduit was required to be positioned between the turbocharger and the muffler. Using such a flexible exhaust conduit in this location, however, adds a pair of potential leak paths at the connections between the flexible exhaust conduit and each of the turbocharger and the muffler as well as an addition maintenance item requiring periodic inspection and replacement. To avoid the need for this additional flexible exhaust conduit, as described herein, the present embodiments rigidly couple turbocharger 30 to muffler 204 using exhaust conduit 208 and brace 204*c* to accomplish the rigid connection. To inhibit engine vibrations from transferring to turbocharger 30 and muffler 204, a plurality of vibration isolating mounting assemblies non-rigidly couple turbocharger 30 and muffler 204 to forward frame assembly 14. By decoupling turbocharger 30 and muffler 204 from the vibrations generated by engine 26, turbocharger 30 and muffler 204 as well as the connections therebetween are protected from potential damage.

As best seen in FIGS. 5F-5N, the vibration isolating mounting assemblies of exhaust system 200 will now be discussed. A vibration isolating mounting assembly 210 is used to couple turbocharger 30 to forward frame assembly 14. More specifically, vibration isolating mounting assembly 210 includes a turbocharger bracket 210*a* that is rigidly coupled to the body of turbocharger 30 using a plurality of bolts that are generally designated 30*g* (see FIG. 5D), a frame bracket 210*b* that is welded or otherwise rigidly coupled to right-forward spar 14*a* of forward frame assembly 14 and a vibration isolator 210*c* that is interposed between turbocharger bracket 210*a* and frame bracket 210*b*. In the illustrated embodiment, a lower plug end of vibration isolator 210*c* is closely received with a central socket of frame bracket 210*b* coupling vibration isolator 210*c* to frame bracket 210*b*. A pin 210*d* is preferably welded to turbocharger bracket 210*a* such that pin 210*d* extends through an opening of turbocharger bracket 210*a* and into vibration isolator 210*c* coupling vibration isolator 210*c* to turbocharger bracket 210*a* and thus securably positioning vibration isolator 210*c* between turbocharger bracket 210*a* and frame bracket 210*b*.

A vibration isolating mounting assembly 212 is used to couple muffler 204 to forward frame assembly 14. More specifically, vibration isolating mounting assembly 212 includes an upper-aft muffler bracket 212*a* that is welded or otherwise rigidly coupled to an upper portion of muffler 204, a frame bracket 212*b* that is welded or otherwise rigidly coupled to right-upper beam 14*g* of forward frame assembly 14 and a vibration isolator 212*c* that is interposed between upper-aft muffler bracket 212*a* and frame bracket 212*b*. In the illustrated embodiment, a lower plug end of vibration isolator 212*c* is closely received within a central socket of frame bracket 212*b* coupling vibration isolator 212*c* to frame bracket 212*b*. A pin 212*d* is preferably welded to upper-aft muffler bracket 212*a* such that pin 212*d* extends through an opening of upper-aft muffler bracket 212*a* and into vibration isolator 212*c* to couple vibration isolator 212*c* to upper-aft muffler bracket 212*a* and thus securably positioning vibration isolator 212*c* between upper-aft muffler bracket 212*a* and frame bracket 212*b*.

A vibration isolating mounting assembly 214 is also used to couple muffler 204 to forward frame assembly 14. More specifically, vibration isolating mounting assembly 214 includes an upper-forward muffler bracket 214*a* that is welded or otherwise rigidly coupled to an upper portion of muffler 204, a frame bracket 214*b* that is welded or otherwise rigidly coupled to right-upper beam 14*g* of forward frame assembly 14 and a vibration isolator 214*c* that is interposed between upper-forward muffler bracket 214*a* and frame bracket 214*b*. In the illustrated embodiment, a lower plug end of vibration isolator 214*c* is closely received within a central socket of frame bracket 214*b* coupling vibration isolator 214*c* to frame bracket 214*b*. A pin 214*d* is preferably welded to upper-forward muffler bracket 214*a* such that pin 214*d* extends through an opening of upper-forward muffler bracket 214*a* and into vibration isolator 214*c* to couple vibration isolator 214*c* to upper-forward muffler bracket 214*a* and thus securably positioning vibration isolator 214*c* between upper-forward muffler bracket 214*a* and frame bracket 214*b*.

A vibration isolating mounting assembly 216 is further used to couple muffler 204 to forward frame assembly 14. More specifically, vibration isolating mounting assembly 216 includes a lower muffler bracket 216*a* that is welded or otherwise rigidly coupled to a lower portion of muffler 204, a frame bracket 216*b* that is welded or otherwise rigidly coupled to right-lower beam 14*i* of forward frame assembly 14 and a vibration isolator 216*c* that is interposed between lower-aft muffler bracket 216*a* and frame bracket 216*b*. In the illustrated embodiment, an upper plug end of vibration isolator 216*c* is closely received within a central socket of lower muffler bracket 216*a* coupling vibration isolator 216*c* to lower muffler bracket 216*a*. A pin 216*d* is preferably welded to frame bracket 216*b* such that pin 216*d* extends through an opening of frame bracket 216*b* and into vibration isolator 216*c* to couple vibration isolator 216*c* to frame bracket 216*b* and thus securably positioning vibration isolator 216*c* between lower-aft muffler bracket 216*a* and frame bracket 216*b*.

In the illustrated embodiment, each of vibration isolators 210*c*, 212*c*, 214*c*, 216*c* is a vibration isolator grommet that has a generally cylindrical shape and is formed from an elastomeric material such as rubber enabling vibration isolators 210*c*, 212*c*, 214*c*, 216*c* to absorb shocks and other vibrations as well as to provide certain tolerances to compensate for differences in the thermal expansion of components of exhaust system 200 and forward frame assembly 14. In other embodiments, vibration isolators 210*c*, 212*c*, 214*c*, 216*c* could have other shapes and/or could be formed from other materials. By interposing vibration isolator 210*c* between turbocharger bracket 210*a* and frame bracket 210*b*, the transfer of vibration from engine 26 to turbocharger 30 via forward frame assembly 14 is inhibited, thus reducing the vibrations experienced by turbocharger 30 and components attached thereto such as muffler 204. Likewise, by interposing vibration isolator 212*c* between upper-aft muffler bracket 212*a* and frame bracket 212*b*, by interposing vibration isolator 214*c* between upper-forward muffler bracket 214*a* and frame bracket 214*b* and by interposing vibration isolator 216*c* between lower muffler bracket 216*a* and frame bracket 216*b*, the transfer of vibration from engine 26 to muffler 204 via forward frame assembly 14 is inhibited, thus reducing the vibrations experienced by muffler 204 and components attached thereto such as turbocharger 30.

Even though the vibration isolating mounting assemblies of the present disclosure have been positioned in a particular arrangement with one vibration isolating mounting assembly associated with the turbocharger and three vibration isolating mounting assemblies (two upper and one lower) associated with the muffler, it should be understood by those having ordinary skill in the art that the vibration isolating mounting assemblies of the present disclosure could have different arrangements including using different numbers of vibration isolating mounting assemblies in association with the turbocharger and/or the muffler and/or positioning vibration isolating mounting assemblies in different locations relative to the turbocharger, the muffler and/or the forward frame assembly so long as the vibration isolating mounting assemblies are arranged such that the transfer of vibration from engine 26 to turbocharger 30 and muffler 204 via forward frame assembly 14 is inhibited. In the illustrated embodiment, turbocharger 30 and muffler 204 are positioned outboard of engine bay 26*a* on the right side of engine 26. In addition, turbocharger 30 and muffler 204 are positioned aft of shock mounts 14*y*, 14*z*.

Referring additionally to FIGS. 6A-6F in the drawings, cooling system 300 of snowmobile 10 will be discussed in greater detail. In the illustrated embodiment, cooling system 300 includes a coolant pump 302 (see also FIG. 2E), a coolant distribution assembly 304 that includes a thermostat 306 and a vapor tank 308, a heat exchanger assembly 310 that includes an arcuate heat exchanger 312 and longitudinal heat exchanger 314, and an expansion tank 316. The coolant path for cooling system 300 includes a compound pump inlet 302*a* positioned on a forward side of engine 26 that includes a primary inlet 302*b* and a bypass inlet 302*c* (see also FIG. 2E). The coolant from coolant inlet 302*a* enters pump 302 and is pressurized such that the coolant can move through cooling system 300. In the illustrated embodiment, pump 302 is driven by crankshaft 26*f* of engine 26 via a drive chain and is an integral component of engine 26 nonetheless, pump 302 will be considered to be in upstream fluid communication with engine 26 as pump 302 is in upstream fluid communication with the coolant loop of engine 26. In addition, pump 302 is in upstream fluid communication turbocharger 30. Pressurized coolant from pump 302 passes through a coolant loop within engine 26 to extract heat from engine 26. Thermostat 306 is in downstream fluid communication with engine 26 and receives heated coolant therefrom. Thermostat 306 is configured to selectively be in upstream fluid communication with pump 302 during a warmup phase of engine operations or in upstream fluid communication with heat exchanger assembly 310 after the warmup phase of engine operations is complete.

During the warmup phase of engine operations, coolant from thermostat 306 flows to bypass inlet 302*c* for recirculation through engine 26. After the warmup phase of engine operations, coolant from thermostat 306 flows to arcuate heat exchanger 312 that is coupled to a forward portion of tunnel 18. Arcuate heat exchanger 312 is configured to remove heat from the coolant circulating therethrough responsive to snow in tunnel 18. For example, during operation of snowmobile 10, endless track 40 kicks snow toward an inner surface of arcuate heat exchanger 312 which is configured to retain at least a portion of this snow. Heat from the coolant circulating through arcuate heat exchanger 312 is transferred to the retained snow causing the retained snow to melt. Coolant from arcuate heat exchanger 312 flows to longitudinal heat exchanger 314 that is coupled to top panel 18*c* of tunnel 18. Longitudinal heat exchanger 314 is configured to remove heat from the coolant circulating therethrough responsive to snow in tunnel 18. For example, during operation of snowmobile 10, endless track 40 kicks snow toward an upper surface of tunnel 18, a portion of which sticks to this surface which is in thermal communication with longitudinal heat exchanger 314. Heat from the coolant circulating through longitudinal heat exchanger 314 is transferred to the retained snow causing the retained snow to melt. It should be noted that snow flap 68 helps to retain snow in tunnel 18 which aids in the snow sticking to the upper surface of tunnel 18. Coolant from longitudinal heat exchanger 314 flows to primary inlet 302*b* for recirculation through engine 26.

In addition, the coolant path of cooling system 300 includes a branch that communicates pressurized fluid from pump 302 to turbocharger 30 via a coolant outlet (not visible) that is in fluid communication with the coolant loop in engine 26. Pressurized coolant from pump 302 passes through a coolant loop within turbocharger 30 to extract heat from turbocharger 30. Vapor tank 308 is in downstream fluid communication with turbocharger 30 and receives heated coolant therefrom. Thermostat 306 is in downstream fluid communication with vapor tank 308 and, depending upon the temperature of the coolant from engine 26, circulates the coolant from engine 26 and the coolant from vapor tank 308 to either bypass inlet 302*c* or arcuate heat exchanger 312 as discussed herein.

Figure 6A:
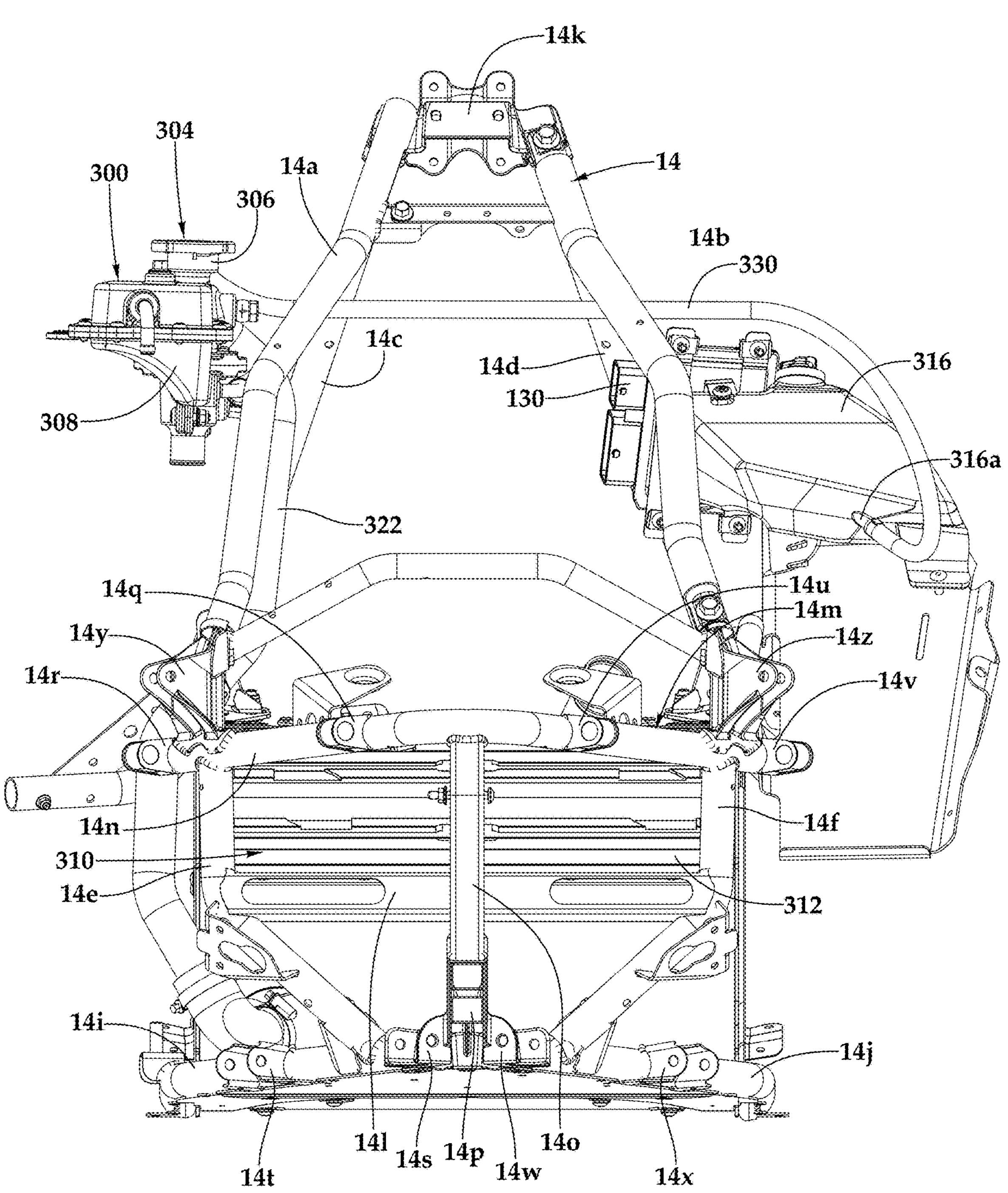
FIGS. 6A-6G are front, side and assembly views of a cooling system for a snowmobile in accordance with embodiments of the present disclosure.
Figure 6B:
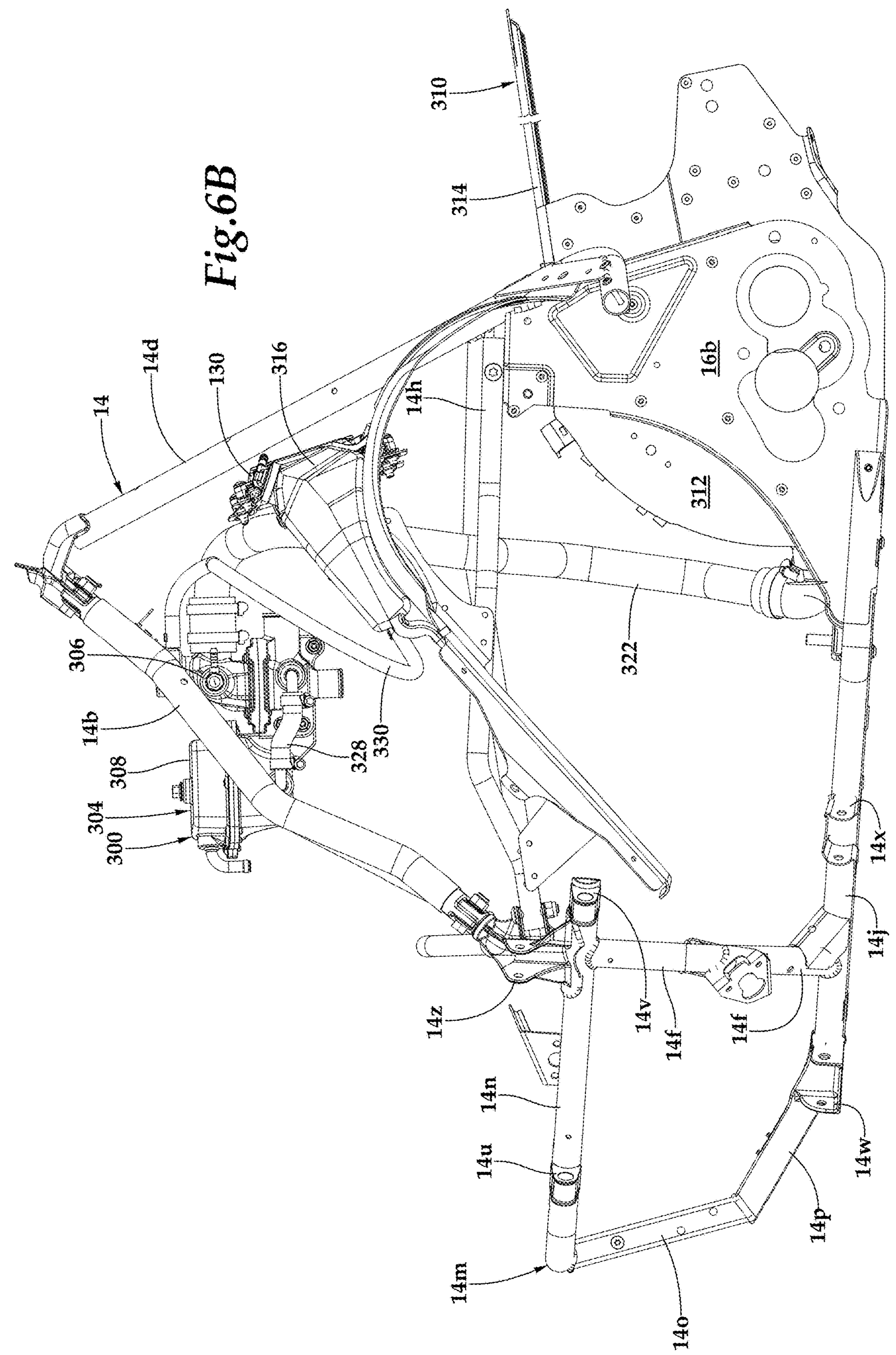
Figure 6C:
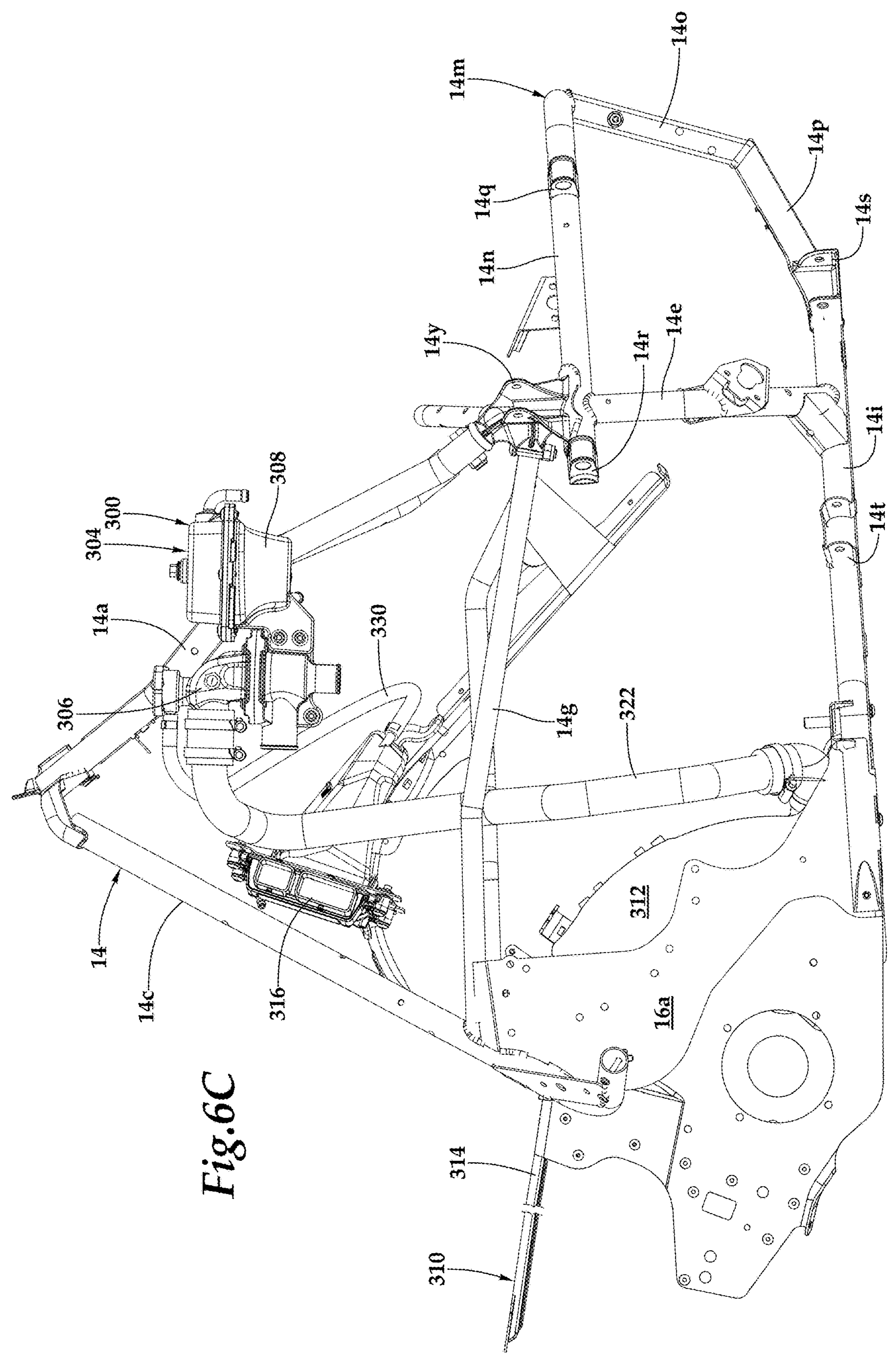
Figure 6D:
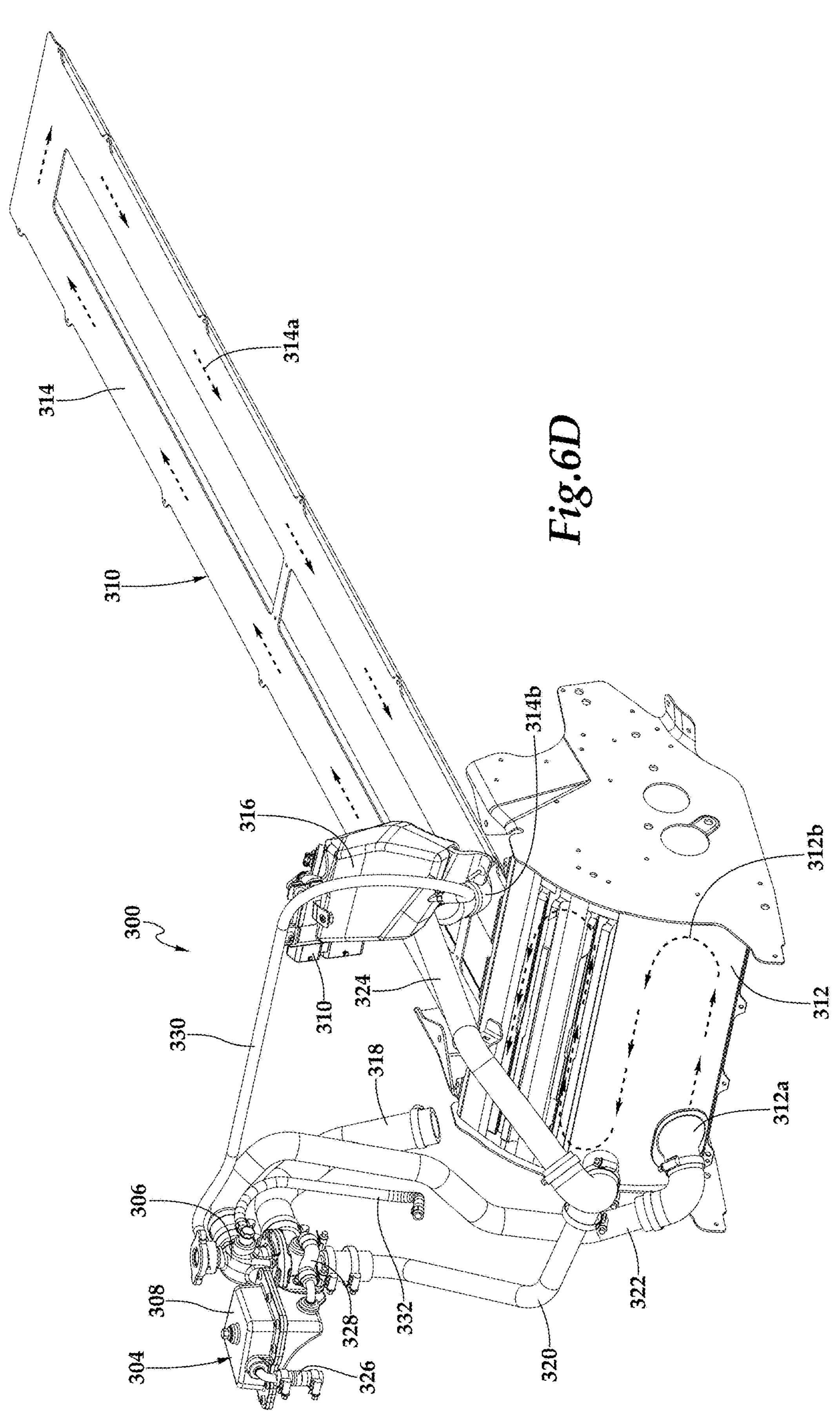
Figure 6E:
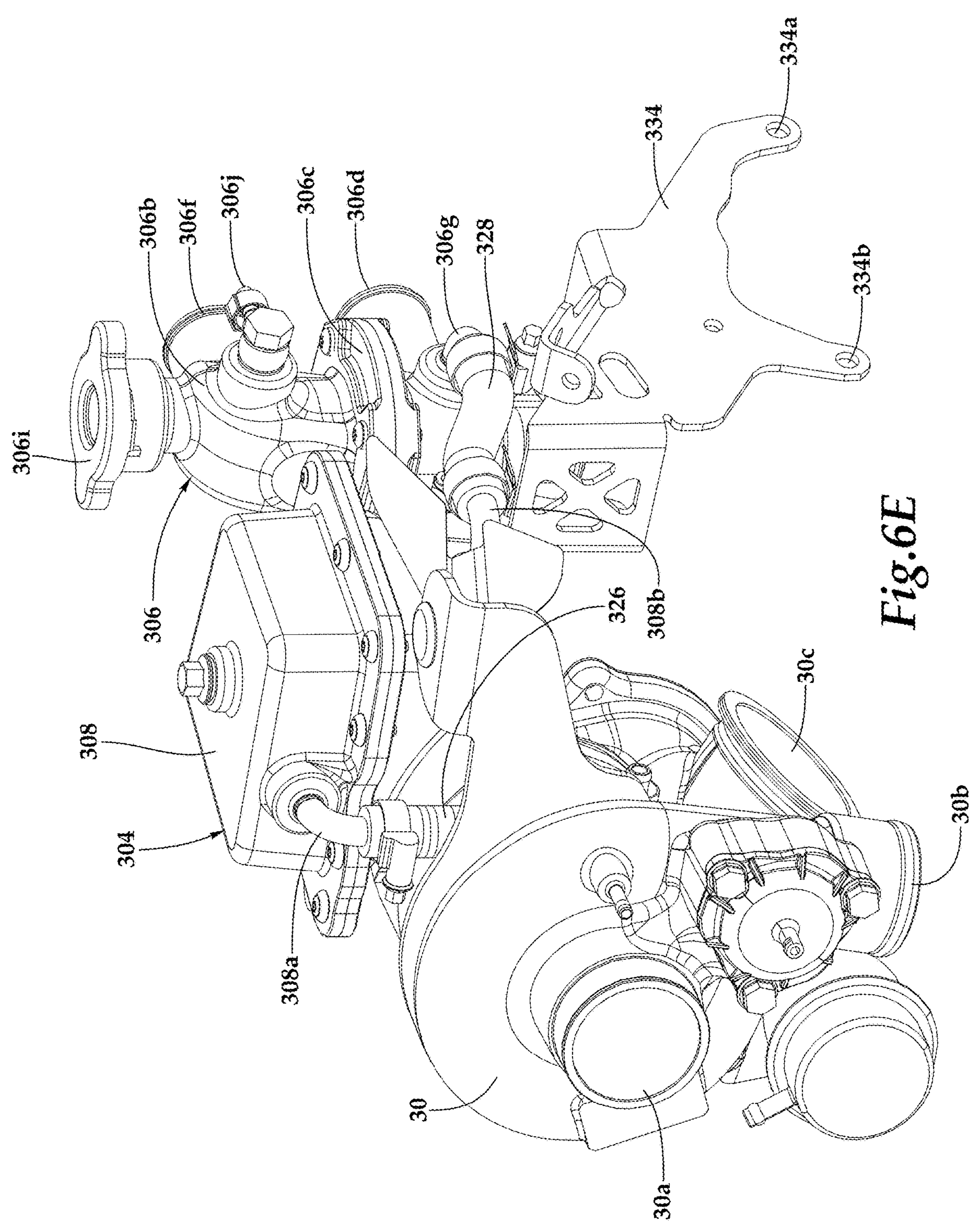
Figures 6F, 6G:
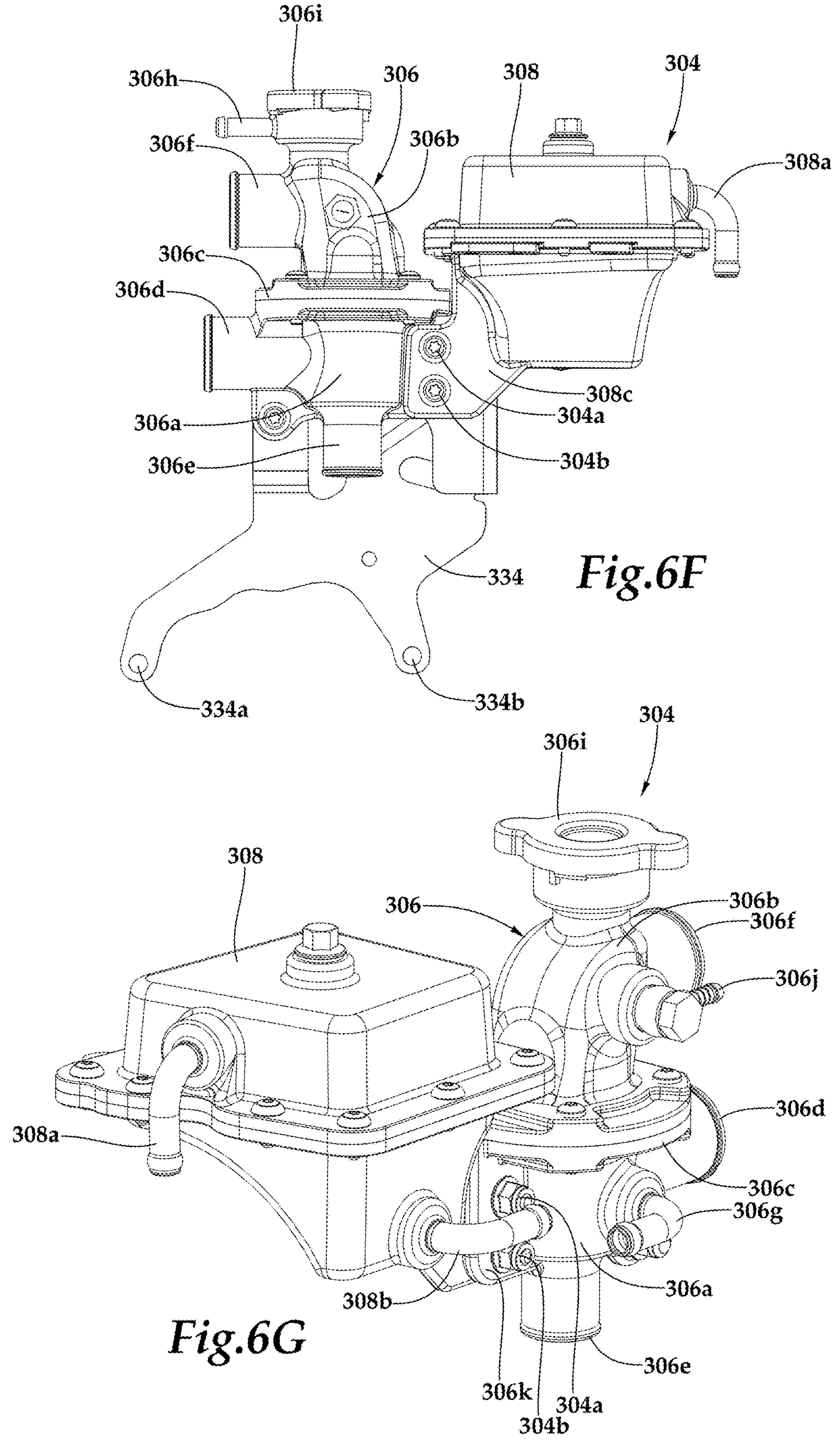

As best seen in FIGS. 6F-6G, thermostat 306 includes a lower chamber 306*a* and an upper chamber 306*b* with a valve housing 306*c* positioned therebetween. Lower chamber 306 receives coolant via primary inlet 306*d* that is in downstream fluid communication with a coolant outlet 302*e* positioned on the aft side engine 26 (see also FIG. 3D) which is downstream of the cooling loop within engine 26. More specifically, coolant outlet 302*e* of engine 26 is coupled to primary inlet 306*d* of thermostat 306 with a coolant conduit 318, as best seen in FIG. 6D. The upstream end of coolant conduit 318 is coupled to coolant outlet 302*e* of engine 26 using one or more hose clamps or other suitable connection means. Likewise, the downstream end of coolant conduit 318 is coupled to primary inlet 306*d* of thermostat 306 using one or more hose clamps or other suitable connection means. During the warmup phase of engine operations when the temperature of the coolant is below a predetermined threshold temperature, the valve with valve housing 306*c* remains closed such that fluid from lower chamber 306*a* exits thermostat 306 via a bypass outlet 306*e* which is in upstream fluid communication with bypass inlet 302*c* of pump 302. More specifically, bypass outlet 306*e* of thermostat 306 is coupled to bypass inlet 302*c* of pump 302 with a coolant conduit 320. The upstream end of coolant conduit 320 is coupled to bypass outlet 306*e* of thermostat 306 using one or more hose clamps or other suitable connection means. Likewise, the downstream end of coolant conduit 320 is coupled to bypass inlet 302*c* of pump 302 using one or more hose clamps or other suitable connection means.

After the warmup phase of engine operations when the temperature of the coolant is above a predetermined threshold temperature, the valve with valve housing 306*c* is operated to the open position such that fluid from lower chamber 306*a* enters upper chamber 306*b* of thermostat 306. Coolant in upper chamber 306*b* exit thermostat 306 via a primary outlet 306*f* which is in upstream fluid communication with coolant inlet 312*a* of arcuate heat exchanger 312. More specifically, primary outlet 306*f* of thermostat 306 is coupled to coolant inlet 312*a* of arcuate heat exchanger 312 with a coolant conduit 322. The upstream end of coolant conduit 322 is coupled to primary outlet 306*f* of thermostat 306 using one or more hose clamps or other suitable connection means. Likewise, the downstream end of coolant conduit 322 is coupled to coolant inlet 312*a* of arcuate heat exchanger 312 using one or more hose clamps or other suitable connection means. A coolant outlet (not visible) of arcuate heat exchanger 312 is directly coupled to a coolant inlet (not visible) of longitudinal heat exchanger 314 enabling the coolant that has traveled through arcuate heat exchanger 312, as represented by arrows 312*b* in FIG. 6D, to enter longitudinal heat exchanger 314 and travel therethrough as represented by arrows 314*a*. Coolant exits longitudinal heat exchanger 314 via a coolant outlet 314*b* which is in upstream fluid communication with primary inlet 302*b* of pump 302. More specifically, coolant outlet 314*b* of longitudinal heat exchanger 314 is coupled to primary inlet 302*b* of pump 302 with a coolant conduit 324. The upstream end of coolant conduit 324 is coupled to coolant outlet 314*b* of longitudinal heat exchanger 314 using one or more hose clamps or other suitable connection means. Likewise, the downstream end of coolant conduit 324 is coupled to primary inlet 302*b* of pump 302 using one or more hose clamps or other suitable connection means.

Turbocharger 30 includes a coolant inlet 30*h* (see also FIG. 5E) that is in downstream fluid communication with a coolant outlet (not visible) of engine 26 positioned along the engine cooling loop. More specifically, coolant inlet 30*h* of turbocharger 30 is coupled to the coolant outlet with a coolant conduit (not pictured). The upstream end of the coolant conduit is coupled to the coolant outlet using one or more hose clamps or other suitable connection means. Likewise, the downstream end of the coolant conduit is coupled to coolant inlet 30*h* of turbocharger 30 using one or more hose clamps or other suitable connection means. Coolant exits turbocharger 30 via a coolant outlet 30*i* which is in upstream fluid communication with coolant inlet 308*a* of vapor tank 308. More specifically, coolant outlet 30*i* of turbocharger 30 is coupled to coolant inlet 308*a* of vapor tank 308 with a coolant conduit 326. The upstream end of coolant conduit 326 is coupled to coolant outlet 30*i* of turbocharger 30 using one or more hose clamps or other suitable connection means. Likewise, the downstream end of coolant conduit 326 is coupled to coolant inlet 308*a* of vapor tank 308 using one or more hose clamps or other suitable connection means. Coolant exits vapor tank 308 via a coolant outlet 308*b* which is in upstream fluid communication with a secondary inlet 306*g* of lower chamber 306*a* of thermostat 306. More specifically, coolant outlet 308*b* of vapor tank 308 is coupled to secondary inlet 306*g* of thermostat 306 with a coolant conduit 328. The upstream end of coolant conduit 328 is coupled to coolant outlet 308*b* of vapor tank 308 using one or more hose clamps or other suitable connection means. Likewise, the downstream end of coolant conduit 328 is coupled to secondary inlet 306*g* of thermostat 306 using one or more hose clamps or other suitable connection means.

Cooling system 300 has an expansion system which allows for the thermal expansion and thermal contraction of the coolant in cooling system 300 as the temperature of the coolant increase and decreases. In the illustrated embodiment, thermostat 306 has an expansion port 306*h* which is in bidirectional fluid communication with an expansion port 316*a* of expansion chamber 316, as best seen in FIG. 6A. More specifically, expansion port 306*h* of thermostat 306 is coupled to expansion port 316*a* of expansion chamber 316 with a coolant conduit 330. One end of coolant conduit 330 is coupled to expansion port 306*h* of thermostat 306 using one or more hose clamps or other suitable connection means. Likewise, the other end of coolant conduit 330 is coupled to expansion port 316*a* of expansion chamber 316 using one or more hose clamps or other suitable connection means. Thermostat 306 includes a removeable filler cap 306*i* that is used to add coolant to cooling system 300. Cooling system 300 has a bleed system which allows air within cooling system 300 to escape during coolant filling operations. Thermostat 306 has a bleed port 306*j* that is in fluid communication with a bleed port (not visible) of engine 26 that is in fluid communication with an uppermost location of the coolant loop within engine 26. More specifically, bleed port 306*j* of thermostat 306 is coupled to the bleed port of engine 26 with a coolant conduit 332. The upstream end of coolant conduit 332 is coupled to the bleed port of engine 26 using one or more hose clamps or other suitable connection means. Likewise, the downstream end of coolant conduit 332 is coupled to bleed port 306*j* of thermostat 306 using one or more hose clamps or other suitable connection means.

In the illustrated embodiment, coolant distribution assembly 304 is formed by coupling thermostat 306 to vapor tank 308. Thermostat 306 includes a flange 306*k* and vapor tank 308 includes a flange 308*c* that have complementary bolt patterns the received bolts 304*a*, 304*b* therethrough to couple thermostat 306 and vapor tank 308 together. In other embodiments, one or more components of thermostat 306 could be integrally formed with one or more components of vapor tank 308. Coolant distribution assembly 304 is coupled to engine 26 using a mount bracket 334 that is bolted to coolant distribution assembly 304. Mount bracket 334 include a pair of bolt apertures 334*a*, 334*b* that align with mounting bosses 26*n*, 26*o* on the right side of engine 26 (see also FIG. 3C) that received bolts therethrough to couple coolant distribution assembly 304 directly to engine 26.

Certain spatial relationships of the various components of cooling system 300 will now be described. Coolant distribution assembly 304 is coupled to the right side of engine 26 and is positioned outboard of engine bay 26*a*. At least a portion of coolant distribution assembly 304 is positioned above engine 26. At least a portion of coolant distribution assembly 304 is positioned above turbocharger 30. At least a portion of coolant distribution assembly 304 is positioned aft of turbocharger 30. At least a portion of coolant distribution assembly 304 is positioned inboard of turbocharger 30. Upper chamber 306*b* of thermostat 306 is positioned above lower chamber 306*a* of thermostat 306. Filler cap 306*i* is positioned at an uppermost location of cooling system 300. Upper chamber 306*b* and lower chamber 306*a* of thermostat 306 are positioned aft of vapor tank 308. In the illustrated embodiment, primary inlet 306*d* of thermostat 306 is positioned on an aft side of lower chamber 306*a* and primary outlet 306*f* is positioned on an aft side of upper chamber 306*b*. In other embodiments, upper chamber 306*b* of thermostat 306 may be rotated 180 degrees relative to lower chamber 306*a* which would enable, for example, primary outlet 306*f* is positioned on a forward side of upper chamber 306*b* and such that primary outlet 306*b* is in upstream fluid communication with a radiator associated with a naturally aspirated internal combustion engine such as the thermostat described in commonly owned U.S. patent application Ser. No. 18/666,651, filed May 16, 2024, the entire contents of which are incorporated by reference herein for all purposes. In further embodiments, upper chamber 306*b* of thermostat 306 may be rotated 90 degrees relative to lower chamber 306*a* which would enable alternate configurations of the cooling system. Bypass outlet 306*e* is positioned on a bottom end of lower chamber 306*a*. Coolant inlet 308*a* of vapor tank 308 is positioned above turbocharger 30. Coolant inlet 308*a* of vapor tank 308 is positioned above coolant outlet 308*b* of vapor tank 308. Coolant outlet 308*b* of vapor tank 308 is positioned forward and above secondary inlet 306*g* of lower chamber 306*a*.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. For example, numerous combinations of the features disclosed herein will be apparent to persons skilled in the art including the combining of features described in different and diverse embodiments, implementations, contexts, applications and/or figures. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An air cooling system for a snowmobile having a forward frame assembly defining an engine bay, an engine positioned in the engine bay and a turbocharger positioned outboard of the engine bay, the air cooling system comprising:

an intercooler in downstream fluid communication with the turbocharger, the intercooler configured to cool compressed air from the turbocharger, wherein the intercooler is arranged at a first forward tilt angle relative to a vertical plane; and an air channel positioned forward of the intercooler, the air channel having a lower wall, a first side wall, and a second side wall that direct ambient ram air into the intercooler such that heat transfers from the compressed air to the ambient ram air in the intercooler, thereby cooling the compressed air and increasing the density of the compressed air before the compressed air enters the engine, wherein the first side wall and the second side wall are oppositely disposed, and wherein the first side wall includes a first aft surface positioned adjacent to the intercooler and the second side wall includes a second aft surface positioned adjacent to the intercooler, and wherein both the first aft surface and the second aft surface are oriented at a second forward tilt angle relative to the vertical plane, wherein the first forward tilt angle and the second forward tilt angle are substantially the same.

2. The air cooling system as recited in claim 1 wherein, the intercooler and the air channel are positioned above and coupled to a nose portion of the forward frame assembly.

3. The air cooling system as recited in claim 1 wherein, the intercooler and the air channel are positioned forward of the engine bay.

4. The air cooling system as recited in claim 1 wherein, the intercooler and the air channel are positioned forward of the turbocharger.

5. The air cooling system as recited in claim 1 wherein, the first side wall and the second side wall both extend above the top of the above an upper portion of the intercooler.

6. The air cooling system as recited in claim 1 wherein, the intercooler is tilted forward by the first forward tilt angle such that an upper portion of the intercooler is forward of a lower portion of the intercooler.

7. The air cooling system as recited in claim 1 wherein, the lower wall has a contoured surface configured to accommodate a snowmobile component.

8. The air cooling system as recited in claim 1 wherein, the first side wall includes an opening configured to receive a snowmobile component.

9. The air cooling system as recited in claim 1 further comprising an air grill positioned at least partially forward of and at least partially above the air channel, the air grill having a plurality of veins that direct the ambient ram air aftwardly and downwardly into the air channel and toward the intercooler.

10. The air cooling system as recited in claim 9 wherein, the intercooler is positioned at least partially below the air grill.

11. An air intake system for a snowmobile having a forward frame assembly defining an engine bay and an engine positioned in the engine bay, the air intake system comprising:

an airbox having an air inlet configured to receive ambient air;

an air filter assembly in downstream fluid communication with the airbox and positioned forward of the engine bay, the air filter assembly configured to filter the ambient air from the airbox;

a turbocharger in downstream fluid communication with the air filter assembly and positioned outboard of a first side of the engine bay, the turbocharger configured to compress the ambient air from the air filter assembly;

an intercooler in downstream fluid communication with the turbocharger and positioned forward of the engine bay, the intercooler configured to cool the compressed air from the turbocharger;

a throttle valve assembly in downstream fluid communication with the intercooler and positioned outboard of a second side of the engine bay that is opposite of the first side, the throttle valve assembly configured to regulate airflow from the intercooler to the engine;

a manifold assembly in downstream fluid communication with the throttle valve assembly and in upstream fluid communication with the engine;

an air channel positioned forward of the intercooler, the air channel having a lower wall and a pair of oppositely disposed side walls that direct ambient ram air into the intercooler such that heat transfers from the compressed air to the ambient ram air in the intercooler, thereby cooling the compressed air and increasing the density of the compressed air before the compressed air enters the engine; and an air grill positioned at least partially forward of and at least partially above the air channel, the air grill having a plurality of veins that direct the ambient ram air aftwardly and downwardly into the air channel and toward the intercooler.

12. The air intake system as recited in claim 11 wherein, the airbox is positioned above and forward of at least a portion of the engine.

13. The air intake system as recited in claim 11 wherein, the air filter assembly is positioned between the engine and the intercooler.

14. The air intake system as recited in claim 11 wherein, the manifold assembly is positioned at least partially above and at least partially aft of the engine.

15. A snowmobile comprising:

a forward frame assembly defining an engine bay;

a steering system including a steering column and a steering component, wherein the steering column is coupled to the forward frame assembly;

an engine positioned in the engine bay;

a turbocharger coupled to the forward frame assembly and positioned outboard of the engine bay;

an intercooler in downstream fluid communication with the turbocharger, the intercooler configured to cool compressed air from the turbocharger; and an air channel positioned forward of the intercooler, the air channel having a lower wall and a pair of oppositely disposed side walls that direct ambient ram air into the intercooler such that heat transfers from the compressed air to the ambient ram air in the intercooler, thereby cooling the compressed air and increasing the density of the compressed air before the compressed air enters the engine, wherein the lower wall has a contoured surface and the steering component is positioned adjacent to the lower wall.

16. The snowmobile as recited in claim 15 further comprising an air grill positioned at least partially forward of and at least partially above the air channel, the air grill having a plurality of veins that direct the ambient ram air aftwardly and downwardly into the air channel and toward the intercooler.

17. The snowmobile as recited in claim 16 further comprising a front bumper and a headlight assembly coupled to the forward frame assembly;

wherein, the air grill is positioned between the front bumper and the headlight assembly.

18. The snowmobile as recited in claim 15 wherein, the engine is a four-stroke engine, and wherein the steering component is an electronic steering assist unit.

* * * * *